(12) United States Patent
Pena et al.

(10) Patent No.: US 7,970,944 B2
(45) Date of Patent: *Jun. 28, 2011

(54) SYSTEM AND METHOD FOR PLATFORM AND LANGUAGE-INDEPENDENT DEVELOPMENT AND DELIVERY OF PAGE-BASED CONTENT

(75) Inventors: Armando Pena, Los Angeles, CA (US); Leslie Spring, Los Angeles, CA (US); Andreas Hjelming, Los Angeles, CA (US); Galvin Hsui, Los Angeles, CA (US); Todd Hollenback, Los Angeles, CA (US); Omar Hamoui, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/348,815

(22) Filed: Jan. 5, 2009

(65) Prior Publication Data

US 2009/0254611 A1 Oct. 8, 2009

Related U.S. Application Data

(62) Division of application No. 10/262,600, filed on Sep. 30, 2002, now Pat. No. 7,490,167.

(60) Provisional application No. 60/383,338, filed on May 22, 2002.

(51) Int. Cl.
*G06F 15/173* (2006.01)
*G06F 15/16* (2006.01)

(52) U.S. Cl. ............ 709/246; 709/223; 709/224
(58) Field of Classification Search .......... 709/223, 709/224, 246
See application file for complete search history.

(56) References Cited

U.S. PATENT DOCUMENTS

| 6,119,078 | A  | * | 9/2000 | Kobayakawa et al. | 704/3 |
| 6,347,316 | B1 | * | 2/2002 | Redpath | 1/1 |
| 6,360,273 | B1 | * | 3/2002 | Beurket et al. | 709/244 |
| 6,421,733 | B1 | * | 7/2002 | Tso et al. | 709/246 |
| 6,604,101 | B1 | * | 8/2003 | Chan et al. | 707/706 |
| 6,748,569 | B1 | * | 6/2004 | Brooke et al. | 715/207 |
| 7,016,977 | B1 | * | 3/2006 | Dunsmoir et al. | 709/246 |

* cited by examiner

*Primary Examiner* — Hussein A Elchanti
(74) *Attorney, Agent, or Firm* — Samuel S. Lee; Procopio, Cory, Hargreaves & Savitch LLP

(57) ABSTRACT

A system and method for platform and language-independent delivery of page-based content. Content defined in a relatively abstract format is rendered into multiple platform formats in client-side applications' user interfaces in multiple human languages. The relatively abstract format is a subset of XML and is used to define user interface elements to be displayed on a page. A Model-View-Controller architecture is implemented comprising a plurality of servlet filters, a servlet pipeline and a plurality of rendering processors for client detection, client tracking, relatively abstract format preprocessing, relatively abstract format processing and validating, and transforming and rendering of the relatively abstract format into multiple platform formats in client-side applications' user interfaces in multiple human languages. A creation, modification and management tool is also disclosed for creating, modifying and managing platform and language-independent page-based content.

28 Claims, 27 Drawing Sheets

SYSTEM AND METHOD FOR PLATFORM AND LANGUAGE-INDEPENDENT DEVELOPMENT AND DELIVERY OF PAGE-BASED CONTENT

CROSS-REFERENCE TO RELATED APPLICATIONS

This application is a divisional application of co-pending U.S. patent application Ser. No. 10/262,600, entitled "System and Method for Platform and Language-Independent Development and Delivery of Page-based Content", filed Sep. 30, 2002, which claims the benefit of priority of U.S. Provisional Patent Application Ser. No. 60/383,338, entitled "System and Method for Platform and Language-Independent Development and Delivery of Page-based Content", filed May 22, 2002. The disclosures of the above-referenced applications are incorporated herein by reference.

BACKGROUND OF THE INVENTION

1. Field of the Invention

The present invention relates generally to transfer of content between a server and multiple network enabled client devices operating on different platforms over a network such as the Internet, and more particularly to rendering content in a relatively abstract format into multiple platform formats in client-side applications' user interfaces in multiple human languages.

2. Description of Related Art

The popularity of the Internet has engendered a number of devices having a capability for providing access to the Internet. As illustrated in FIG. 1, such devices include desktop and laptop computers, cellular phones and personal digital assistants ("PDAs"). The various different types of network enabled devices ("NEDs") may each operate with a different platform format ("platform"), for example by operating with different web-based or non-web-based browser types.

The term "content" is used herein to refer to all forms of electronic content (i.e., content that may be read or processed in an electronic form), including, but not limited to, digital video, audio, photos, graphics, text and animation. When a provider of content desires to provide to different platforms access to the content, the provider may be required to build, for example, custom web pages or other content containing pages for each specific platform format. That is, the provider would need to provide pages or other content resources formatted in HyperText Markup Language ("HTML"), Wireless Markup Language ("WML"), compact HTML ("cHTML"), and so on, to conform to the device/browser display capabilities. This is both labor intensive to initially setup and difficult to maintain as changes are made to the site's data and services.

Therefore, it can be seen that there is a need for a system and method for accepting content defined in a relatively abstract format and transforming the relatively abstract format input into a specific recognized platform format for a particular device.

SUMMARY OF THE DISCLOSURE

Therefore, embodiments of the present invention provide a system and method for platform and language-independent delivery of page-based content.

Embodiments of the present invention provide a system and method for accepting content defined in a relatively abstract format and transforming the relatively abstract format input into a specific recognized platform format for a particular device.

Embodiments of the present invention further provide a system and process for creating, modifying and managing platform and language-independent page-based content.

Embodiments of the present invention further provide a relatively abstract format for defining content in a data source. The relatively abstract format may be transformed into multiple platform formats in client-side applications' user interfaces in multiple human languages.

In one embodiment, a system and method for platform and language-independent delivery of page-based content implements a Model-View-Controller architecture comprising a plurality of servlet filters, a servlet pipeline and a plurality of rendering processors for client detection, client tracking, relatively abstract format preprocessing, relatively abstract format processing and validating, and transforming and rendering of the relatively abstract format into multiple platform formats in client-side applications' user interfaces in multiple human languages.

In another embodiment, a system and method for platform and language-independent delivery of page-based content implements creation, modification and management tool that allows a creator or publishing team to create, modify, and manage platform and language-independent page-based content. The page-based content can then be viewed and interacted with by end-users, with embodiments of the system and method for platform and language-independent delivery of page-based content being used to display the same content on multiple platforms, and in multiple languages.

In yet another embodiment, a format in the form of an interface definition mark-up language ("IDML") is provided for defining a relatively abstract format to be transformed into multiple platform formats in client-side applications' user interfaces in multiple human languages. In one embodiment, IDML is a subset of exstensible Mark-up Language ("XML") and may be fully compliant with all XML standards. IDML is used to define user interface elements within embodiments of the system and method for platform and language-independent delivery of page-based content. Keywords and rules are defined for IDML which allow a user to accurately specify a user interface to be rendered by a rendering group within the system for platform and language-independent delivery of page-based content.

These and other features, and advantages of embodiments of the invention will be apparent to those skilled in the art from the following detailed description of embodiments of the invention, when read with the drawings and appended claims.

BRIEF DESCRIPTION OF THE DRAWINGS

Referring now to the drawings in which like reference numbers represent corresponding parts throughout.

DETAILED DESCRIPTION OF EMBODIMENTS OF THE INVENTION

In the following description of embodiments of the invention, reference is made to the accompanying drawings which form a part hereof, and in which is shown by way of illustration specific embodiments in which the invention may be practiced. It is to be understood that other embodiments may be utilized and structural changes may be made without departing from the scope of embodiments of the present invention.

As discussed above, the present invention relates generally to a system and process for transferring content between a server and multiple network enabled client devices operating on different platforms over a network such as the Internet. Embodiments of the present invention address the need for a system and method for accepting content defined in a relatively abstract format and transforming the relatively abstract format input into a recognized platform format specific for a particular device.

Figure 1:
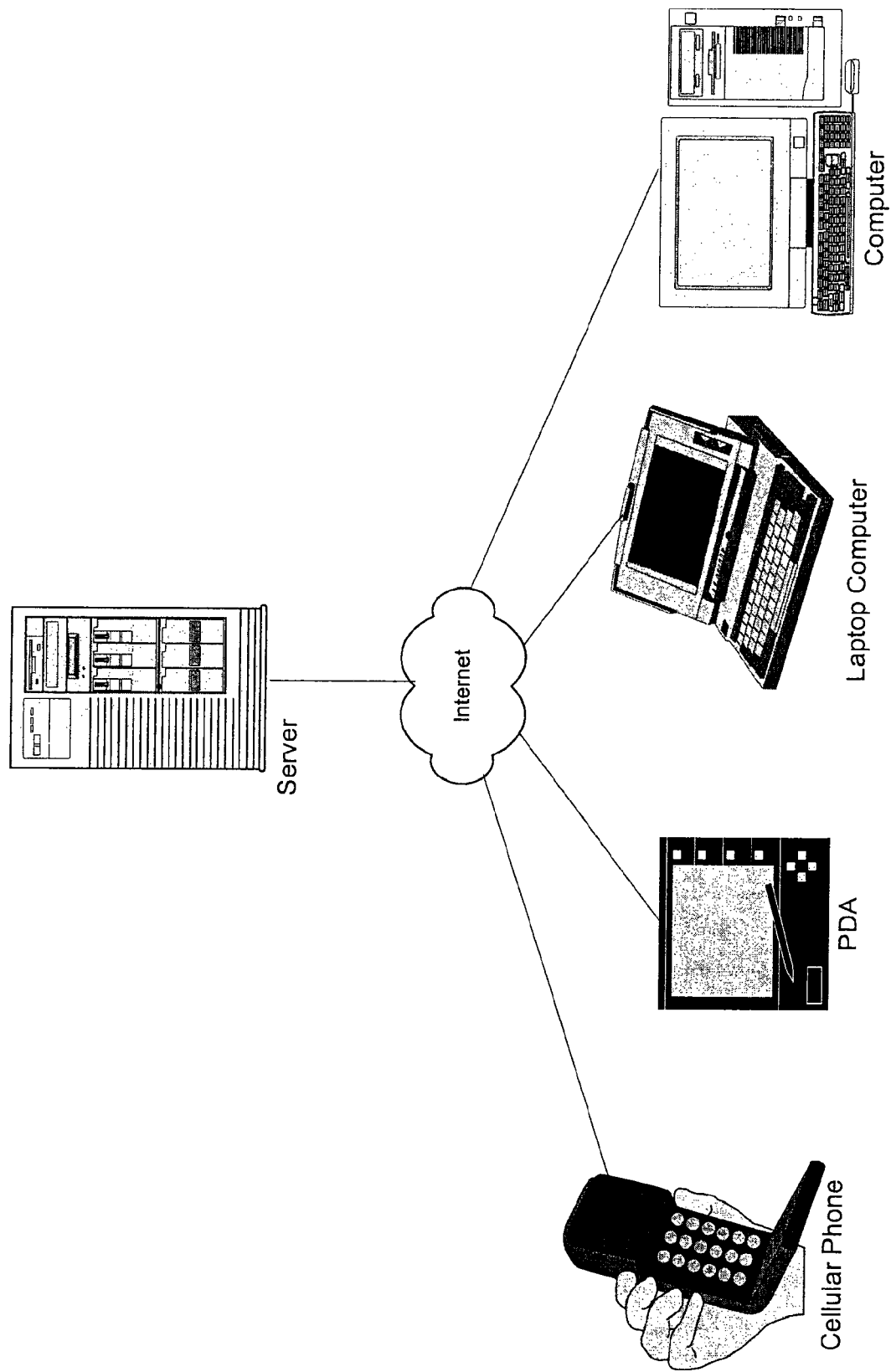
FIG. 1 illustrates a number of devices having a browser or user agent capability communicating with a server over the Internet.
Figure 2:
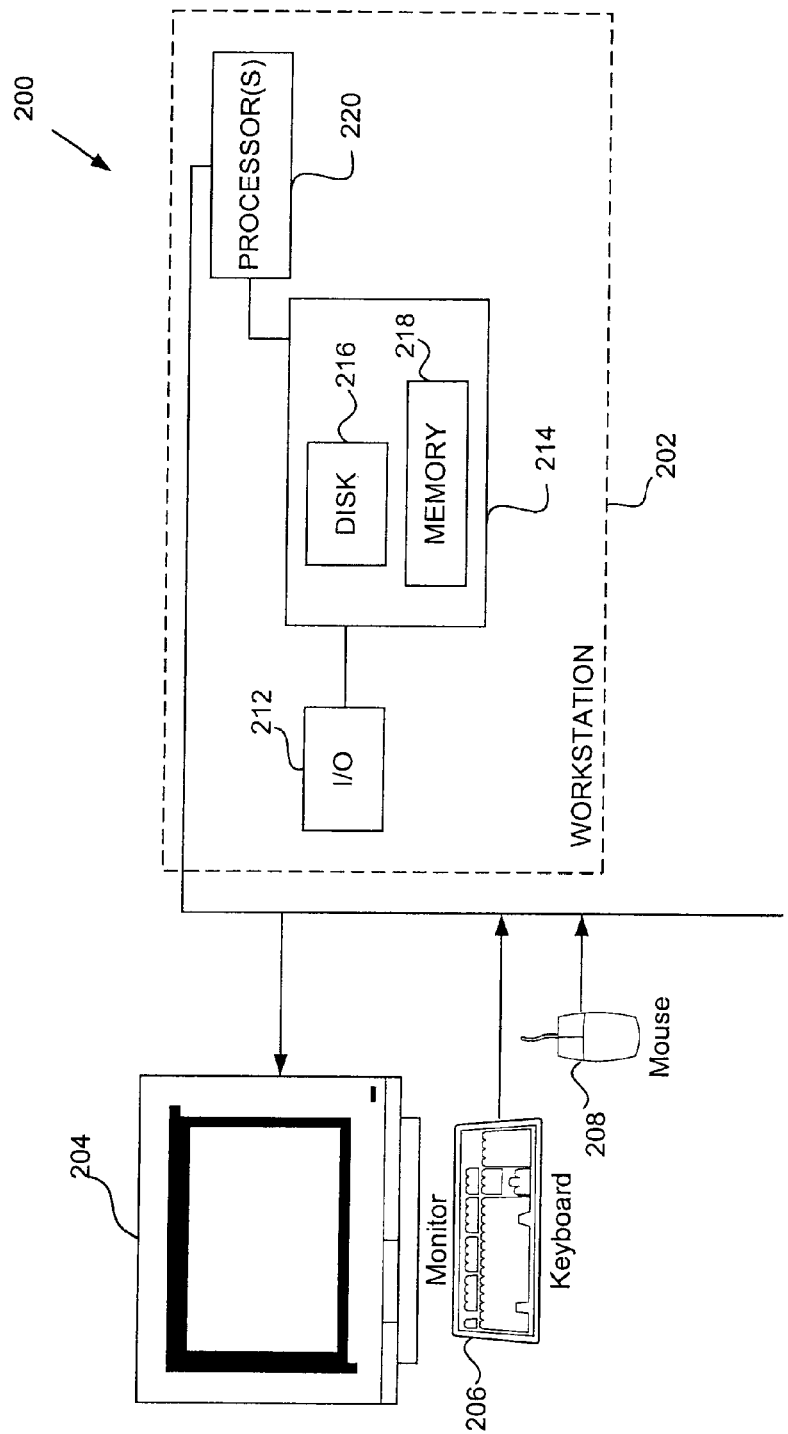
FIG. 2 illustrates an exemplary hardware/software environment wherein, embodiments of the system and process of the present invention may be employed.

A system and process for platform and language-independent delivery of page-based content, according to embodiments of the present invention, may be used with various types of hardware/software combinations. FIG. 2 illustrates an exemplary hardware/software environment 200 wherein embodiments of the system and process of the present invention may be employed.

The system 200 may include a computer workstation 202, a computer monitor 204, and input devices such as a keyboard 206, and mouse 208. The workstation 102 may also include input/output interfaces 212, storage 214, such as a disk 216 and random access memory (RAM) 218, as well as one or more processors 220. The workstation 102 may be a computer workstation such as a Windows NT-type workstation or other suitable computer or computers. The computer monitor 204, keyboard 206, and mouse 208, as well as other input devices such as, but not limited to, video tape recorders, cameras, and hardware accelerators (not shown) may be used to interact with various software elements of the system residing in the memory of the workstation 202 to cause processes to be performed on data. The system 200 in FIG. 2 is shown by way of illustration and not limitation. Other systems may be used to implement embodiments of the invention.

System and device functions and processes described herein may be implemented with machine-executable instructions. Software comprising these instructions may be used to program and cause general-purpose or special-purpose processors to perform the functions and processes described herein. Alternatively, such functions and processes may be implemented by firmware, hardware comprising hardwired logic, or by any combination thereof.

Figure 3:
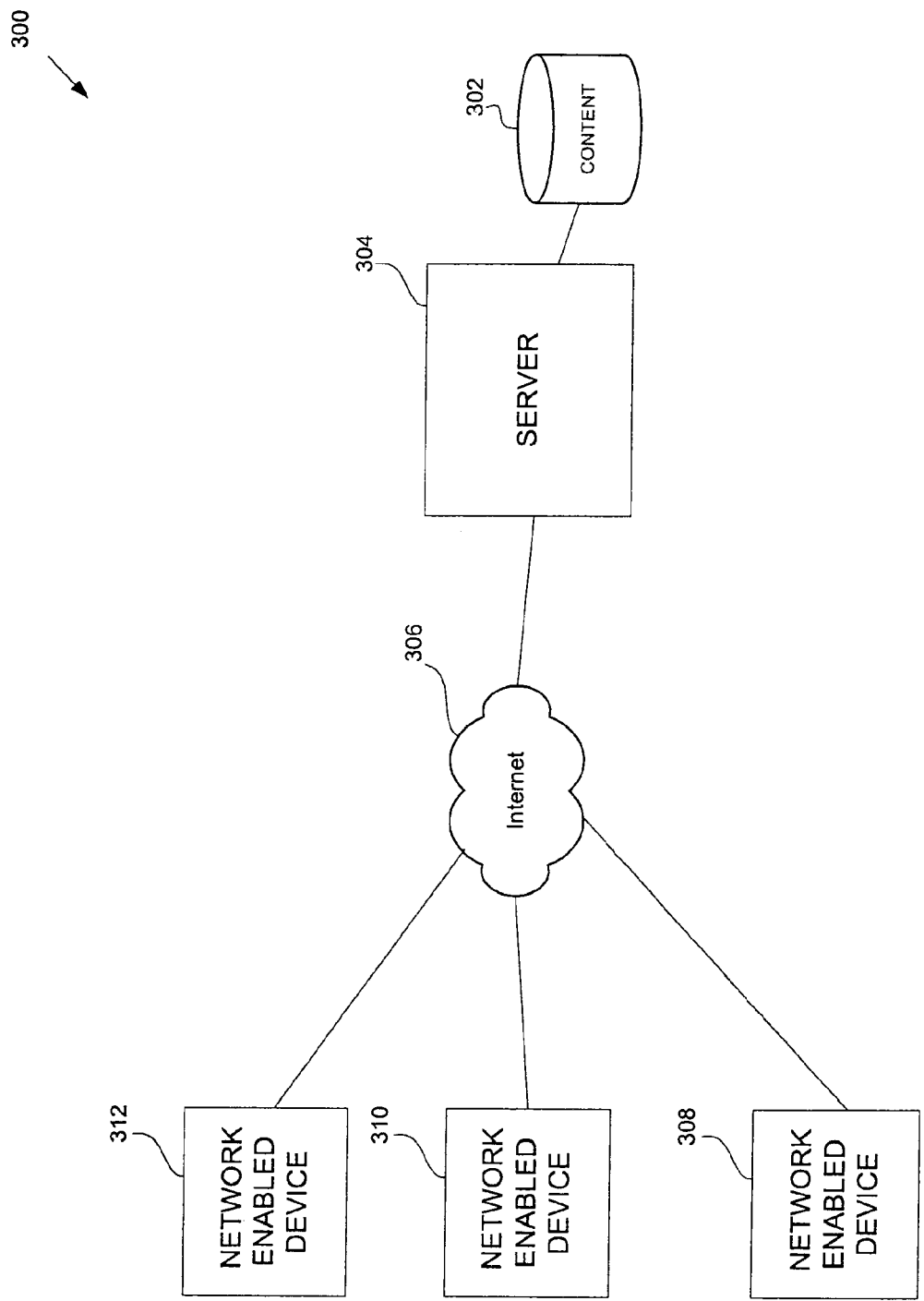
FIG. 3 illustrates a network environment where a server communicates with various network enabled devices, each having a platform-specific language for displaying content within a browser/user agent, according to embodiments of the present invention.

Embodiments of the invention may be employed in a network environment where a server communicates with various network enabled devices (NEDs), each having a platform-specific language for displaying content within a browser or user agent. Such a network environment 300 is shown in FIG. 3. Content 302 is provided via web server 304 and the Internet 306 to NEDs 308, 310 and 312, each of which may operate with different platforms, for example HTML, cHTML, WML and so on.

Embodiments of the invention may be employed with systems and methods described in co-pending U.S. utility patent applications entitled "Media Content Creating and Publishing System and Process," Ser. No. 09/906,024, filed Jul. 13, 2001, "Content Management System and Process," Ser. No. 09/906,023, filed Jul. 13, 2001, and "Dynamic Graphical Index Of Website Content," Ser. No. 09/915,608, filed Jul. 26, 2001, the content of all of which is incorporated by reference herein.

Figure 4:
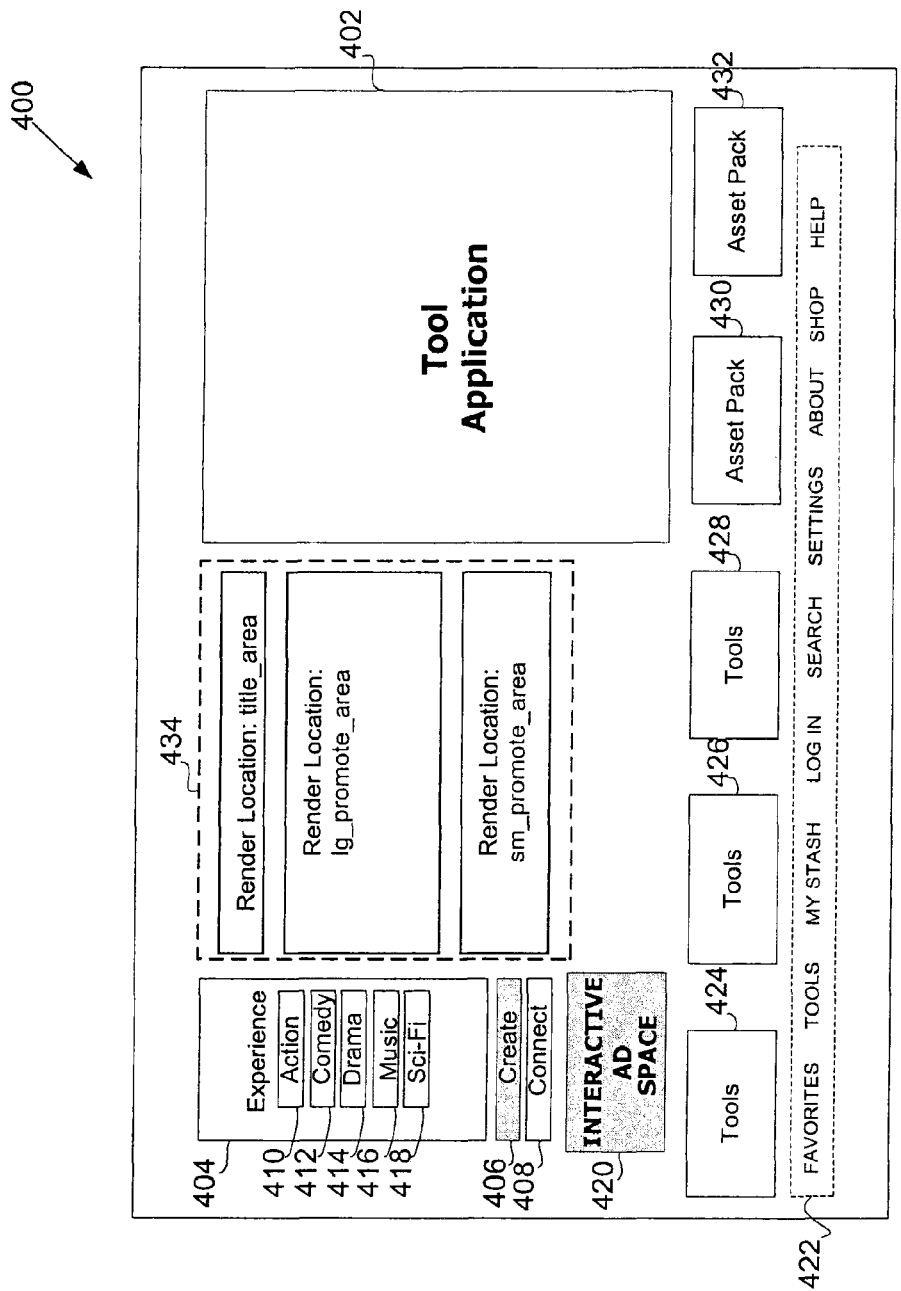
FIG. 4 illustrates an exemplary web page for display on a client network enabled device, according to embodiments of the present invention.

FIG. 4 shows an exemplary web page for display on a client NED. The exemplary tool application page 400 shown in FIG. 4 provides media creation and editing tools and digital assets that may be used to create and edit various media. Tool application page 400 comprises tool application area 402, "experience" channel area 404, (comprising user-selectable operators 410 (action), 412 (comedy), 414 (drama), 416 (music), and 418 (science fiction) for selecting a genre of media content), a "create" user-selectable operator 406, a "connect" user-selectable operator 408, interactive advertising space 420, and menu area 422.

Tool application page 400 may further comprise promotes for additional tools, such as tool promotes 424, 426, and 428. Tool application page 400 may also further comprise promotes for additional asset packs, such as asset pack promotes 430 and 432. Tool application page 400 may further comprise user-selectable operators that activate ("launch") tool poppers containing additional media content creating and editing functionality.

According to embodiments of the present invention, tool application page 400 is created with a creation tool that allows a creator or publishing team to create, modify, and manage a platform and language-independent page-based, graphic, or other content. The page-based content can then be viewed and interacted with by end-users on multiple platforms (such as, but not limited to, HTML, cHTML, WML and Flash), and in multiple human languages (such as, but not limited to, English, Spanish and Japanese) by rendering content in a relatively abstract format into multiple platforms and multiple human languages in user interfaces of client-side applications.

In one embodiment, a system and method for platform and language-independent delivery of page-based content uses a separate "thin" rendering group for each supported platform, allowing common user interface ("UI") elements to be shared by multiple platforms and hardware devices. In other embodiments, a system and method for platform and language-independent delivery of page-based content alternatively, or in addition, operates in cooperation with one or more client-side platform renderers such as, but not limited to, a Windows application renderer, a Flash renderer and a Playstation 2 ("PS2") renderer.

In one embodiment, the common UI elements may comprise rendering elements, action elements and UI elements, and copy elements (titles, paragraphs, etc.) that are used to populate pages such as tool application page 400 shown in FIG. 4. The common UI elements may be defined in a relatively abstract format and stored in a system database. The common UI elements defined in the relatively abstract format may be accessed by client-side devices via a system server. The common UI elements in the relatively abstract format are then transformed by embodiments of the invention's system and method into multiple platform formats in client-side applications' user interfaces in multiple human languages.

Alternatively, or in addition, the common UI elements or other data in a relatively abstract format may be obtained from other data sources besides a system database, including, but not limited to, another application external to the system itself. As an example, a shopping cart application could write data in a relatively abstract format back to the system and the system could then render it and return it to the shopping cart application in a particular platform format. As another example, a NED such as a Bluetooth-enabled digital camera may receive a user interface from an application on a host computer, enabling the camera to upload pictures to an external storage device. Furthermore, content may be provided from multiple data sources using, for example, rendering dynamic XSLT. The multiple data sources may include, but are not limited to, databases, 3rd party applications, or any other source that generates data in a relatively abstract format.

In one embodiment, the relatively abstract format may be a proprietary interface definition mark-up language ("IDML"). IDML may be a subset of XML and may be fully compliant with all XML standards. However, in other embodiments, the system and method for platform and language-independent delivery of page-based content may be modified such that IDML may be defined by other generalized mark-up languages such as, but not limited to, Standard Generalized Markup Language ("SGML").

Figure 5:
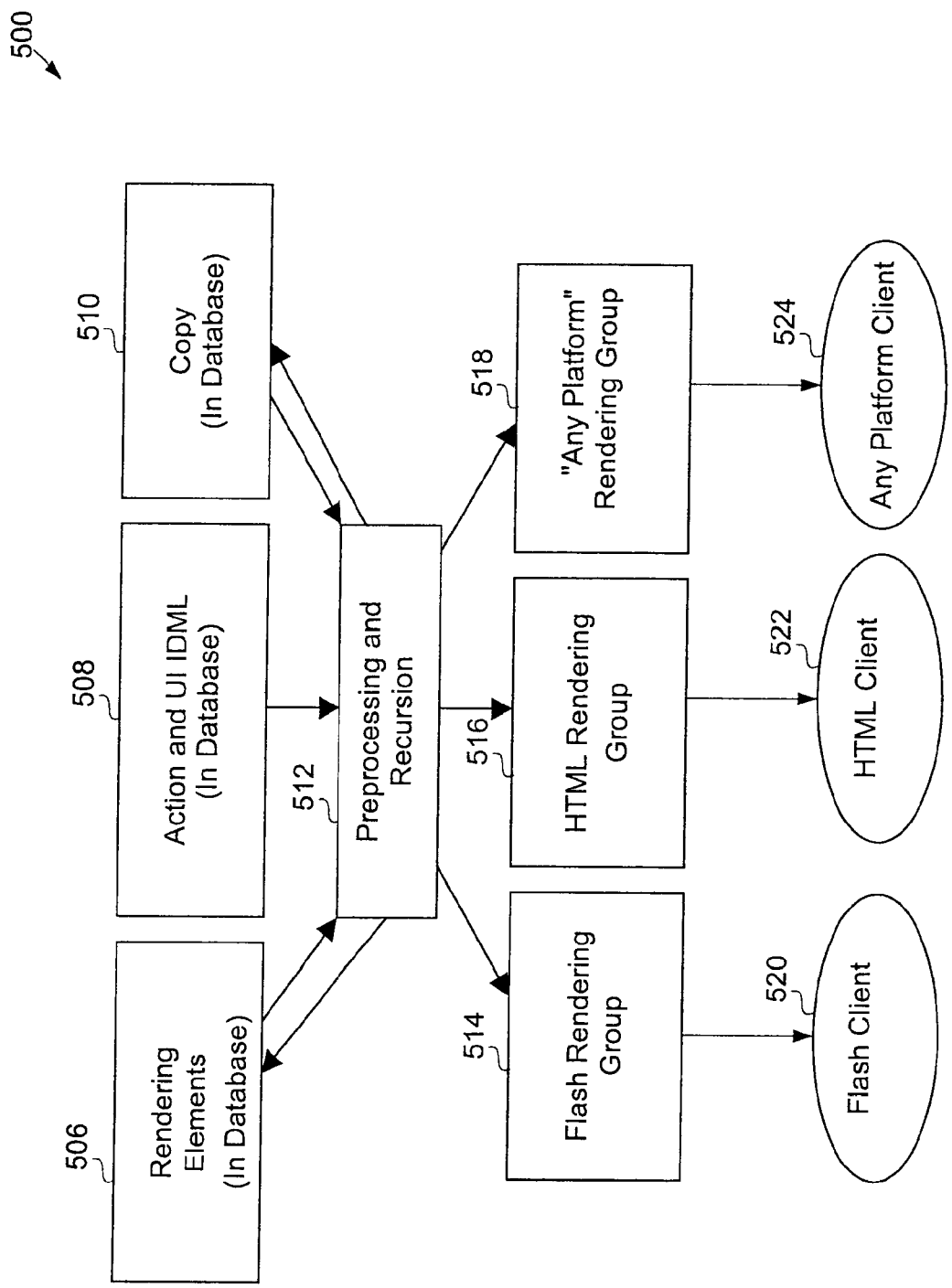
FIG. 5 shows a simplified block diagram illustrating an exemplary pipeline for platform and language-independent delivery of page-based content, according to embodiments of the present invention.
Figure 6A:
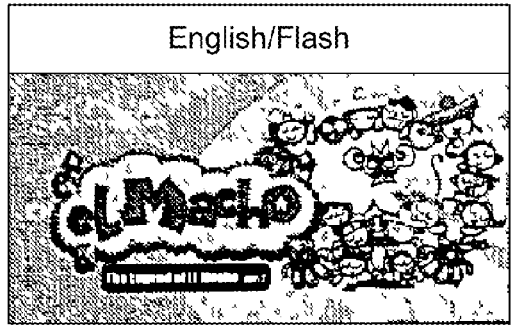
FIGS. 6A through 6D show exemplary rendering elements that may be used to populate pages, according to embodiments of the present invention.
Figure 6B:
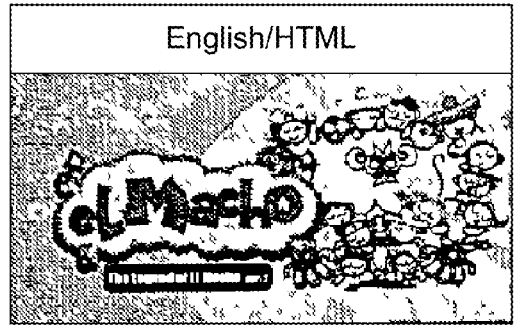
Figure 6C:
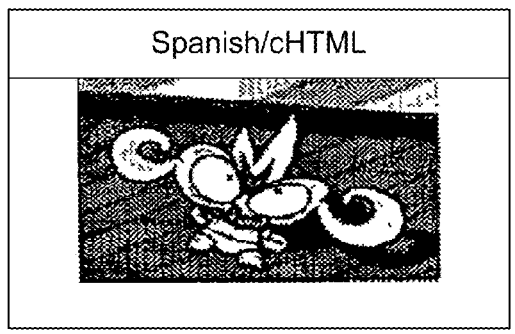
Figure 6D:
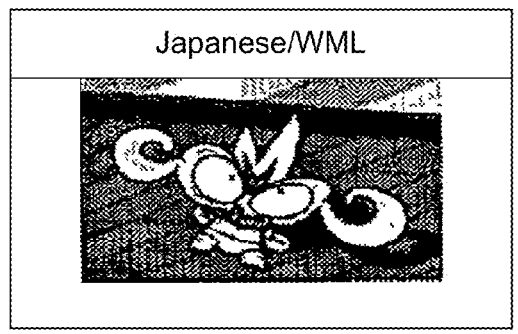

FIG. 5 shows a simplified block diagram illustrating an exemplary pipeline for platform and language-independent delivery of page-based content, according to embodiments of the present invention. As illustrated by the block diagram shown in FIG. 5, in one embodiment the UI elements 506, 508 and 510 stored in a database are specified in the relatively abstract format during preprocessing and recursion 512. UI elements 506, 508 and 510 are then rendered into various desired client platforms, for example Flash client 520, HTML client 522 and any other supported platform ("Any Platform") client 524. In the case of thin clients such as HTML client 522, the UI elements 506, 508 and 510 defined in the relatively abstract format may be received by HTML rendering group 516, which renders the UI elements 506, 508 and 510 into the HTML client platform. Thick clients such as Flash client 520 may comprise a Flash rendering group 514 that may receive the UI elements 506, 508 and 510 in the relatively abstract format and render them into SWF files. In the case of Any Platform client 524 (representing additional supported client platforms such as, but not limited to, Clie', PS2, and Wireless Application Protocol ("WAP") enabled devices), "Any Platform" rendering group 518 may receive the UI elements 506, 508 and 510 defined in the relatively abstract format and render them into the desired "Any Platform" client platform.

During preprocessing and recursion 512, a complete page or other content resource in the relatively abstract format is assembled from the individual UI elements 506, 508 and 510. In addition, names of the rendering elements and copy, for example business names, are resolved based on the client platform and language. Rendering groups are responsible for translating the relatively abstract format into the target platform. According to embodiments of the present invention, one rendering group may be required for each target platform.

In one embodiment, rendering elements are the set of rendering primitives/collections and rendering resources which make up the pages. Rendering primitives/collections may be platform specific while rendering resources may be both platform and human language specific. Rendering elements may be associated with a name and rendering platform. Rendering resources will additionally be associated with a human language.

The rendering primitives may be the actual functional elements of the pages. "Rendering primitives" may actually include both primitives and collections. The distinction is that a collection can contain one or more primitives/collections along with resources and copy, while a primitive can only contain rendering resources and copy, but not other primitives. Collections contain areas called render locations which are the actual areas that other copy, resources, primitives and collections can recursively be placed. Primitives also have render locations, but only copy or resources can be placed in those render locations. A page or other content resource is considered complete when all render locations have been filled. An example of a rendering primitive/collection 434 is shown on tool application page 400 shown in FIG. 4.

The rendering resources may be the graphical elements that are used in the pages. Typically this would consist of backgrounds, button skins, images, animations, and any other graphical elements in the pages. Rendering resources are defined by a name and they are language and platform specific.

Action elements and UI elements may be the set of generalized mark-up language code, for example XML code, that defines and parameterizes the pages. According to one embodiment, UI IDML is used to parameterize the actual UI. Action IDML is used to parameterize any actions that are taken on the pages. IDML actions allow a user to, for example, navigate and view web-based content, including, but not limited to, UI "pages/content resources" and various media. Actions may also allow users to submit data for processing to a receiving device. Thus, according to embodiments of the present invention, actions on a page may be abstracted as well as the rendered UI of the page.

Copy is the set of localized text (titles, paragraphs, etc.) that will be displayed in the pages. Copy will be associated with a name and rendering platform as well as a human language.

FIGS. 6A, 6B, 6C and 6D show exemplary rendering elements that may be used to populate, for example, tool promotes 424, 426, and 428 or asset pack promotes 430 and 432 of the tool application page 400 shown in FIG. 4. As shown in FIGS. 6A through 6D, the rendering elements may be displayed in various platform formats (Flash, HTML, cHTML, WML, etc.) and in various human languages (English, Spanish, Japanese, etc.).

Figure 7:
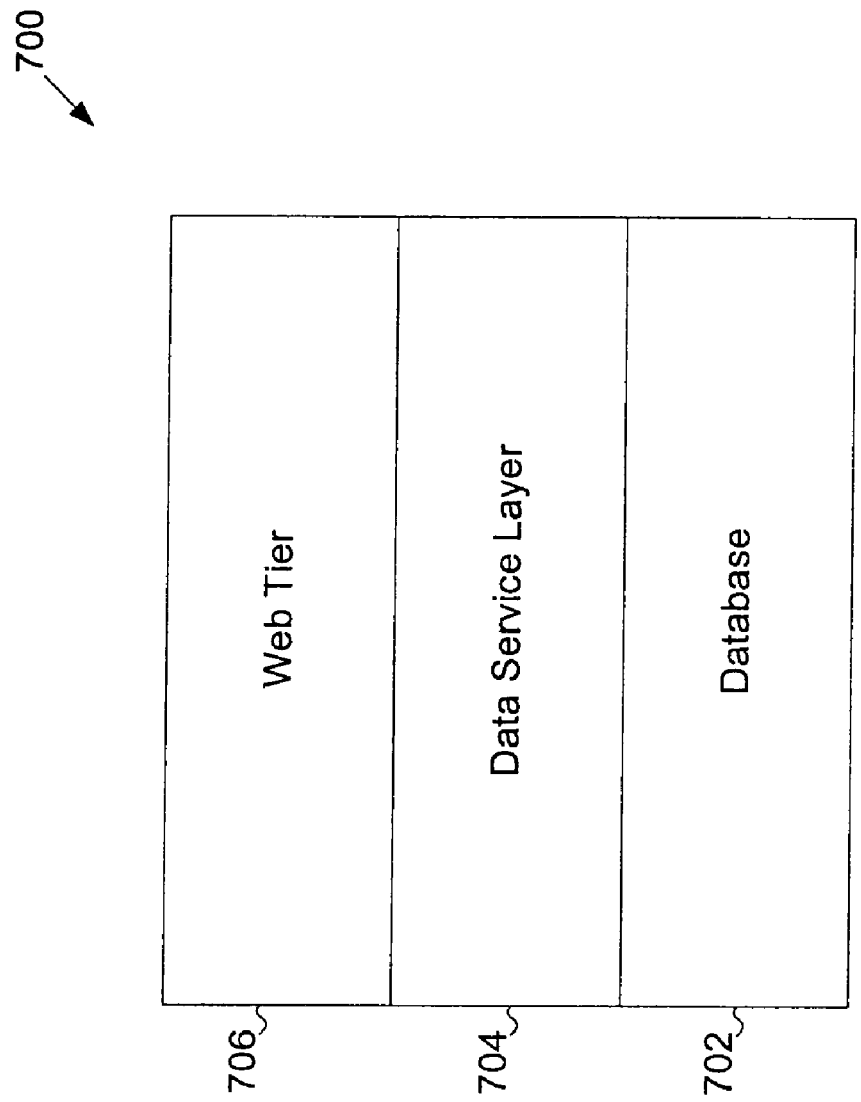
FIG. 7 shows a high level block diagram illustrating a server-side backend system for platform and language-independent delivery of page-based content, according to embodiments of the present invention.

FIG. 7 shows a high level block diagram illustrating a server-side backend system 700 for platform and language-independent delivery of page-based content, according to an embodiment of the present invention. According to embodiments of the present invention, the server-side backend system 700 may be implemented in Java™ Enterprise Edition ("J2EE™"). According to other embodiments, the server-side backend system 700 may be implemented in any other suitable server-side programming language, including, but not limited to, Microsoft™.NET, Visual Basic, C, C++, Perl, Python, ADA, C#, Common Lisp, Dylan, Eiffel, Elastic C, Modula 3, SMALLTALK, Mesa, and Tcl/TK.

The system essentially comprises three levels: a first level is a database 702 which may store content "logical assets" and associated metadata defining logical asset attributes. In one embodiment, the logical assets are defined in IDML. The logical assets may include, but are not limited to, rendering elements, action elements and user interface ("UI") elements and copy.

The second level of the high level block diagram is a data service layer 704 which may comprise an object bridge layer that relates data tables to objects, enterprise Java bean ("EJB") schema domain managers that provide standardized logic to different application servers and a Simple Object Access Protocol ("SOAP") interface that allows HTTP commands to be invoked.

The third level of the high level block diagram is a web tier 706 which supports multiple client platforms. Types of platforms supported by the web tier 706 include thin client platforms such as, but not limited to, HTML, cHTML and WAP. Web tier 706 further supports thick client platforms such as, but not limited to, Windows applications, Flash and Playstation 2 ("PS2"). Due to this multiple client platform support capability, changes to the page flow and presentation requires low maintenance for software development. In addition, web tier 706 is extensible, scalable and fault tolerant with regards to state.

Figure 8:
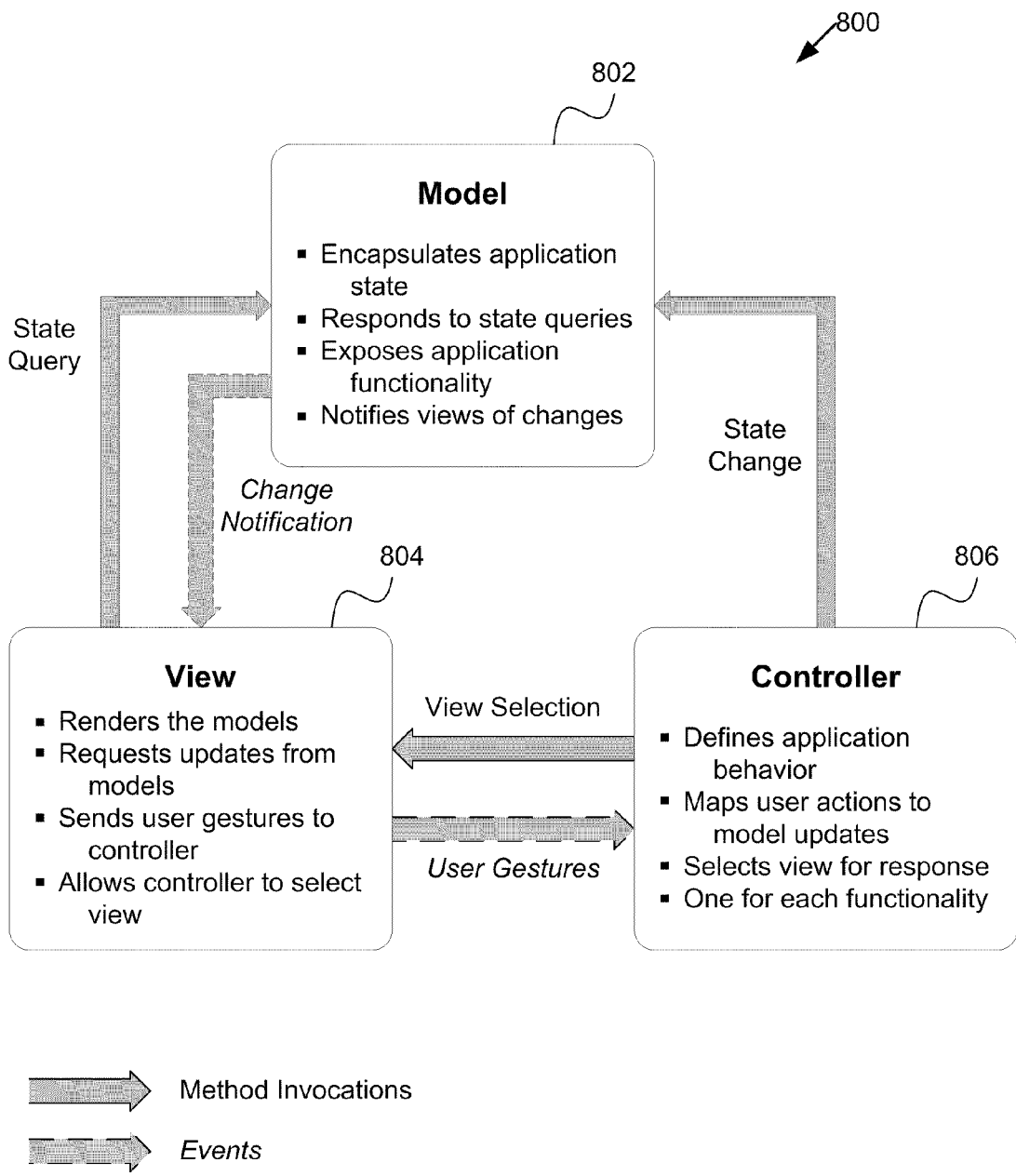
FIG. 8 shows a diagram illustrating the functions of an MVC architecture, according to embodiments of the present invention.

First, web tier 706 will be described in more detail. Web tier 706, according to one embodiment, uses a known Model-View-Controller ("MVC") architecture which divides applications into three layers—model, view, and controller—and de-couples their respective responsibilities. A diagram illustrating the functions of an MVC architecture 800 is shown in FIG. 8.

Each of the three layers handle specific tasks and has specific responsibilities relative to the other layers. As shown in the diagram of FIG. 8, a model 802 may represent business data and business logic or operations that govern access and modification of this business data. Often the model 802 serves as a software approximation to real-world functionality. The model 802 notifies views when it changes and provides the ability for the view to query the model 802 about its state. It also provides the ability for the controller 806 to access application functionality encapsulated by the model 802.

A view 804 renders the contents of a model. It accesses data from the model 802 and specifies how that data should be presented. It updates data presentation when the model 802 changes. A view 804 also forwards user input to the controller 806.

The controller 806 defines application behavior. It dispatches user requests and selects views for presentation. It interprets user inputs and maps them into actions to be performed by the model 802. In a stand-alone GUI client, user inputs may include, for example, button clicks and menu selections. In a Web application, user inputs may include, for example, HTTP GET and POST requests to the Web tier. The controller 806 selects the next view to display based on the user interactions and the outcome of the model operations. An application typically has one controller for each set of related functionality. Some applications use a separate controller for each client type, because view interaction and selection often vary between client types.

In software development, most of the high costs of ownership are not associated with construction (i.e. coding an application), but maintenance. As business requirements change over time, any changes to an existing software system will introduce some level of risk. The adoption of an MVC architecture for the web tier 706 separates responsibilities among model, view, and controller objects, reduces code duplication and makes applications easier to maintain. It also makes handling data easier, whether adding new data sources or changing data presentation, because business logic is kept separate from data. It is easier to support new client types, because it is not necessary to change the business logic with the addition of each new type of client.

Figure 9:
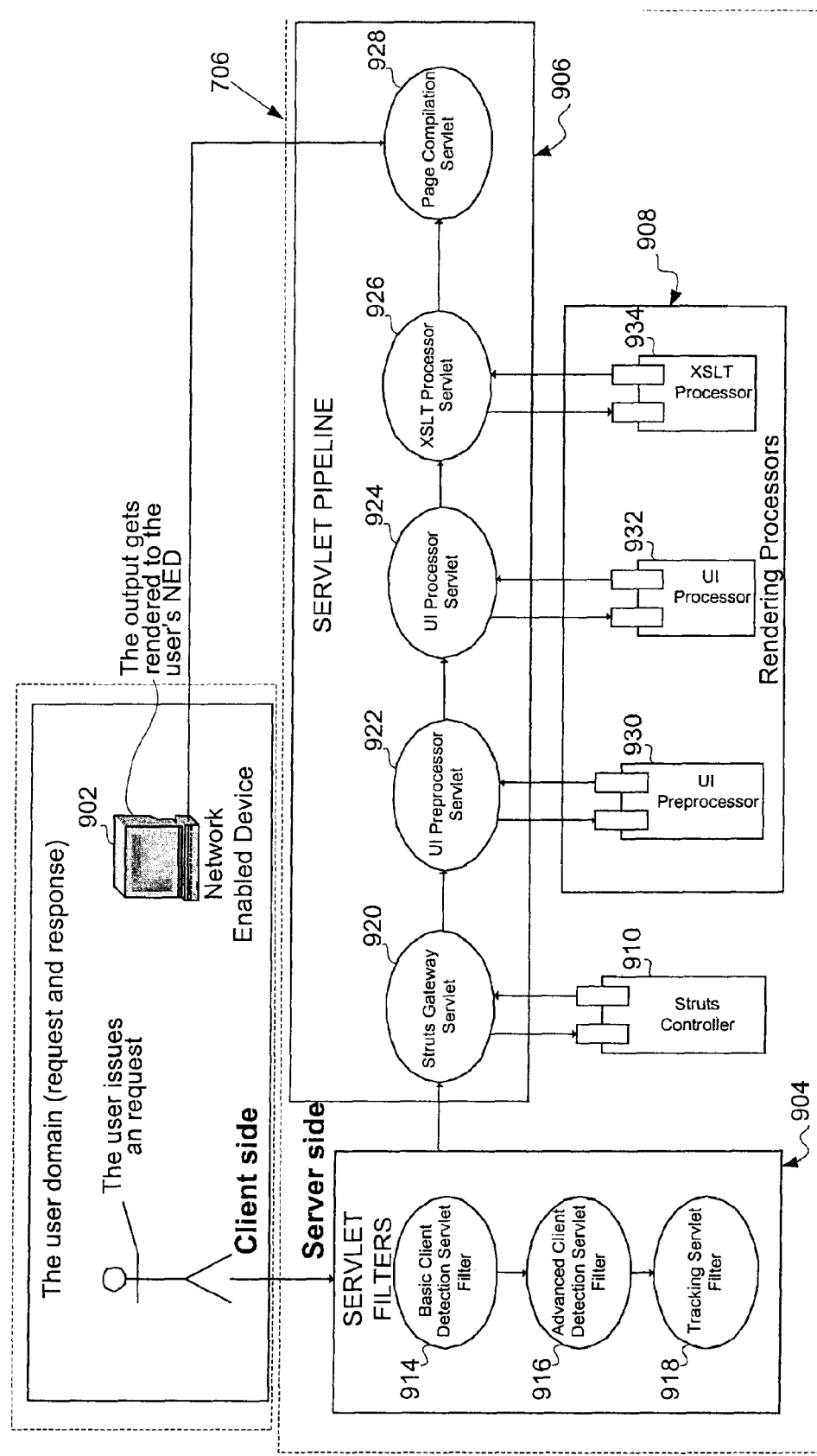
FIG. 9 shows a simplified block diagram of a system including web tier, according to embodiments of the present invention.

FIG. 9 shows a simplified block diagram of a system 900 including web tier 706, according to embodiments of the present invention. Web tier 706 is shown as a part of a server side application in communication with a client network-enabled device ("NED") 902.

According to embodiments of the present invention, web tier 706 may comprise three parts: servlet filters 904, servlet pipeline 906 and rendering processors 908. These software components work together to determine the type of client and its specification (for example, HTML or WAP), store client side information per user and transform a single input in a relatively abstract format such as, but not limited to, an IDML format, for platform-specific display.

Figure 10:
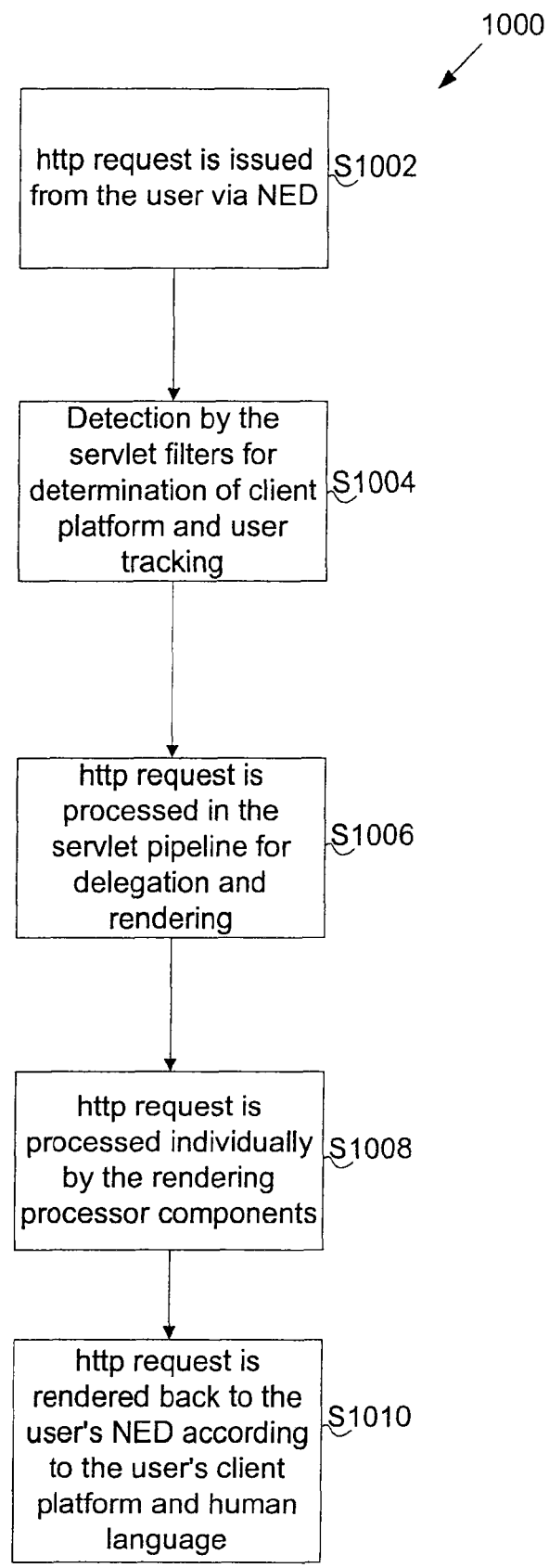
FIG. 10 shows a flowchart illustrating an HTTP request flow, according to embodiments of the present invention.

An HTTP request flow 1000, according to embodiments of the present invention, will now be described in a general manner with reference to the simplified block diagram of FIG. 9 and the flowchart shown in FIG. 10. An HTTP request is issued from the user via NED 902 at S1002. The client-side application may have a "user agent" or header that is passed to the server which maps to the right language and platform. Or a user may manually enter the language and platform information themselves or a client-side or server-side application may be provided to do this. The HTTP request is detected by the servlet filters 904 at S1004, and a determination of a client platform is made and user tracking is performed. At S1006, the HTTP request is processed in the servlet pipeline 906 for delegation and rendering. At S1008, the HTTP request is processed individually by the rendering processor components. At S1010, the HTTP request is rendered back to the user's NED 902 according to the user's client platform and human language.

The operation and inter-operation of the servlet filters 904, servlet pipeline 906 and rendering processors 908, according to embodiments of the present invention, will now be described in more detail. A servlet filter is an object that can transform a request or modify a response. A servlet filter is not a servlet, i.e., a servlet filter doesn't actually create a response. Instead, they are preprocessors of the request before it reaches a servlet, and/or postprocessors of the response leaving a servlet. A servlet filter can intercept a servlet's invocation before the servlet is called. In addition, a servlet filter can examine a request before a servlet is called and modify the request headers and request data by providing a customized version of the request object that wraps the real request. Furthermore, a servlet filter can modify the response headers and response data by providing a customized version of the response object that wraps the real response. Also, a servlet filter can intercept a servlet's invocation after the servlet is called.

In the system and method for platform and language-independent delivery of page-based content according to embodiments of the present invention, a series of servlet filters 904 acts on the struts controller gateway servlet 920 in the servlet pipeline 906. In one embodiment, servlet filters 904 comprise basic client detection servlet filter 914, advanced client detection servlet filter 916 and tracking servlet filter 918.

Basic client detection servlet filter 914 uses a browser/user agent compatibility management tool such as, but not limited to, BrowserHawk™, to detect the basic specifics/details of the client NED 902 such as language supported, plugins supported and basic HTML properties of the request. Basic client detection servlet filter 914 may then set client NED 902 information as a session variable.

Advanced client detection servlet filter 916 uses advanced device detection such as, but not limited to, Morphis device detection, to find the advanced details of the client, namely WAP device information such as, for example, the WAP phone make and colors supported. Advanced client detection servlet filter 916 may then set client NED 902 information as a session variable.

Tracking servlet filter 918 determines whether or not the user's NED 902 is known and can be tracked. If so, tracking servlet filter 918 may log this information to the database 702 (See FIG. 7) and/or run pattern recognition software to determine the user preferences at a later time.

Generally, a servlet pipeline may be an extensible architecture used to perform a series of operations on each incoming request. In any browser/user agent-server conversation, the browser/user agent operating on the client's NED will send the server a request. Usually the server will either find an HTML page or other content resource and send it back to the browser or user agent, or call a servlet and send the servlet's output to the browser. With a servlet pipeline, however, one servlet's output may be input to a second servlet. The Web server may send the second servlet's output to the browser, or may input it to a third servlet, and so on. The output from the last servlet in the chain may then be sent to the browser.

The servlet pipeline is a suitable point of integration when an HTTP or other non-HTTP request is being used as the method of communication between platforms, or when session-scoped data must be accessed. However the servlet pipeline should not be made excessively complex since every request must pass through it; an inefficient pipeline can compromise an application's performance.

According to embodiments of the present invention, servlet pipeline 906 may comprise a struts controller gateway servlet 920, a UI preprocessor servlet 922, a UI processor servlet 924, a Extensible Style Sheet Transformations ("XSLT") processor servlet 926 and a page/content resource compilation processor servlet 928.

The struts controller gateway servlet 920 communicates with struts controller 910. Struts controller 910 is the controller 806 in the MVC architecture described above and illustrated in FIG. 8. The struts controller gateway servlet 920 delegates the servlet requests to the appropriate action processors and determines the request servlet flow of an application.

The UI preprocessor servlet 922 invokes the rendering preprocessor component given an input IDML document. The preprocessing step involves resolving external IDML references and determining primitive and resource paths. The UI processor servlet 924 processes the refined IDML document by, for example, resolving scriptlet tags and dynamic pieces of IDML via the rendering processors 908. The UI processor servlet 924 also resolves, for example, Java Server Page ("JSP") tags and references. JSPs are text-based documents that execute as servlets.

The XSLT processor servlet 926 uses the rendering XSLT transformation component to dynamically change the relatively abstract format to a platform specific language such as, but not limited to, HTML, WAP or cHTML. The page/content resource compilation processor servlet 928 takes the transformed XSLT input and serializes the output into the output platform/language specific to the requesting device.

In the servlet pipeline 906 according to embodiments of the present invention, the struts controller gateway servlet 920 delegates the flow of the HTTP request. For example, if the struts controller 910 determines that the request is an "action" type of request, the struts framework may possibly forward the request through a completely different pipeline than for a different type of request. The power and flexibility of struts gives the servlet pipeline dynamic and stackable capabilities which allow customization options for multiple scenarios and use cases.

Rendering processors 908 will now be discussed. As discussed above, the system and method for platform and language-independent delivery of page-based content according to embodiments of the present invention, accepts a common input in a relatively abstract format and transforms the relatively abstract format input into a specific recognized platform format for a particular device. For example, a relatively abstract IDML input can be transformed for display in various platforms such as, but not limited to, a web-based or non-web-based browser, a WAP enabled cell phone or a PDA.

In one embodiment, rendering processors 908 are pluggable software components that are bound to an immutable interface. These processors may be chained together sequentially and may eventually be exposed as web services. The availability of the rendering processors 908 as web services gives access to external clients, such as NED 902, in order to process the relatively abstract format accordingly. The servlet pipeline 906 employs rendering processors 908 for displaying the client specific output to the user's NED. Rendering processors 908 communicate with servlets at each stage of the servlet pipeline 906. In one embodiment, rendering processors 908 comprise a UI preprocessor 930, a UI processor 932 and an XSLT processor 934.

UI preprocessor 930 functions to recursively resolve external relatively abstract format references in the source relatively abstract format document. These references are then dynamically inserted into the output relatively abstract format document. UI preprocessor 930 also resolves the primitive paths, the resource paths and the copy element texts. All of this information is dynamically inserted into the output relatively abstract format document.

UI processor 932 accepts an input in a relatively abstract format such as IDML and resolves the scriptlet elements (i.e. dynamic IDML tags). In one embodiment, UI processor 932 also handles JSP taglibs and may support, for example, JSP 1.2 template tag libraries.

XSLT processor 934, given an input in a relatively abstract format, dynamically builds a list of XSLT references for the XML stylesheet. It then performs a transformation on the data to the desired client platform specification. XSLT processor 934 finds primitives paths, builds XSLT references using primitive paths and runs the relatively abstract format with references through the XSLT transformer.

According to embodiments of the present invention, the web tier 706 includes Java objects that act as external interfaces for processing and validating the elements in the relatively abstract format. In one embodiment where the relatively abstract format is IDML, the Java objects include, but are not limited to, an IDMLActionProcessor, an IDMLPreProcessor, an IDMLProcessor, an IDMLReferenceProcessor and IDMLXSLTProcessor. Functions of these Java objects are described below. Details about each Java object described below may be found in Appendix A. In addition, valid IO/expected behavior for each of the Java objects is shown in Appendices B through F, respectively.

The IDML Action Processor parses IDML markup and returns back the valid IDML link used for action transitions from page to page or other content resource (i.e. moving from one IDML page to the next, similar to a hyperlink). This processor essentially parses out a defined link location for an IDML Action markup piece.

The IDML PreProcessor processes the IDML markup and performs 1) recursed IDML unraveling and 2) Resolution of primitive paths, copy text and rendering resource paths. The output returned from this processing call is then contained in a processor result whose processed status is true.

The IDML Processor parses IDML markup and resolves the dynamic content markup tags contained within the IDML. This is relevant when using JSP tags within the IDML. This processor is fundamental to displaying dynamically generated pages filled with content.

The IDML Reference processor parses IDML markup and recurses/resolves nested IDML references from the source IDML document. The end output should be a fully recursed IDML document without any references to other UI elements of IDML.

The IDML XSLT Processor processes the IDML markup and transforms the IDML markup to the corresponding rendering target type, such as, but not limited to, HTML, cHTML and WAP. If the transaction request is of a stateless nature, ideally, the transformation templates should be cached. The output returned from this processing call is then contained in a processor result whose processed status is true.

Figure 11:
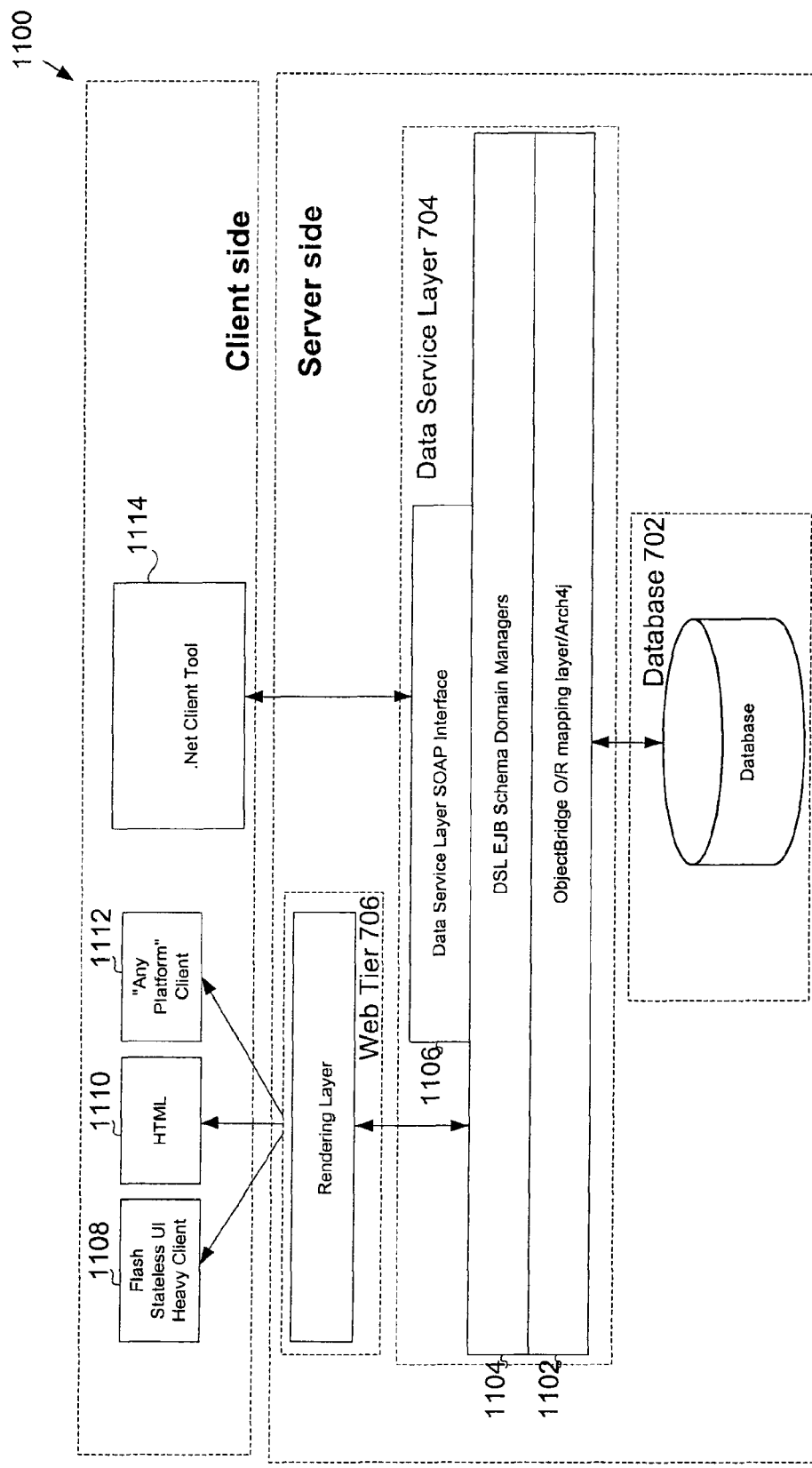
FIG. 11 shows a simplified block diagram of a system, showing a relation of a data service layer to a web tier and database on a server side, and client network-enabled devices and a .Net client tool on the client side, according to embodiments of the present invention.

Data service layer 704 will now be described. FIG. 11 shows a simplified block diagram of a system 1100 showing a relation of data service layer 704 to web tier 706 and database 702 on the server side and client NED types 1108, 1110, 1112 and .Net client tool 1114 on the client side.

Object bridge layer 1102 relates data tables to objects and acts as a mapping tool that automatically implements object persistence to database 702. SOAP interface 1106 allows exchanges of information over the Internet based on the XML standard. SOAP invokes methods using XML and HTTP, allowing applications to directly communicate with one another over the Internet by allowing objects created using various different languages to communicate with one another.

EJB schema domain managers 1104 provide standardized logic to different application servers based on an Enterprise Java Beans ("EJB") specification. An EJB receives data from client applications running on the client NED for processing and retrieves data from database 702 to be sent back to the client applications running on the client NED. Data is retrieved from the database 702 in an IDML format and is converted by the rendering group in the web tier 706 into the particular client language. Data service layer 704 includes EJBs for performing various functions. A non-limiting list of EJBs included in data service layer 704, along with their attributes, roles, public methods and various other parameters are shown in Tables 1-16 below.

TABLE 1

| | |
|---|---|
| Identifier | COM-01 |
| Defining Quality | The Asset manager is an EJB can create, remove and update Assets and associated asset attributes. |
| Name | Asset Manager EJB. |
| Attributes | Handling of logical representations of physical files, handling of asset-attributes (metadata for asset records). |
| Behaviors | a. Create an asset |
| | b. Update an asset |
| | c. Remove an asset |
| | d. Retrieve an asset |
| | e. Retrieve all assets |
| | f. Add an attribute to a given asset |
| | g. Remove an attribute from a given asset |
| | h. Update an attribute from a given asset |
| | i. Retrieve all attributes from a given asset |
| | j. Find an asset attribute by name |
| Public Methods | a. createItem(Asset) - return: Asset |
| | b. updateItem(Asset) - return: Asset |
| | c. removeItem(Asset) - return: void |
| | d. getItem(Integer asset_id) - return: Asset |
| | e. getAllItems( ) - return: Asset array, or null |
| | f. addAssociatedAttribute(Asset, AssetAttribute) - return: Asset, or null |
| | g. removeAssociatedAttribute(Asset, AssetAttribute) - return: Asset, or null |
| | h. updateAssociatedAttribute(Asset, AssetAttribute) - return: Asset, or null |
| | i. findAssociatedAttributeByName(Asset, String asset_name) - return: AssetAttribute, or null |
| | j. getAllAssociatedAttributes(Asset) - return: AssetAttribute array, or null |
| Relationships | None. |
| Roles | a. Service Asset management requests (locally) |
| | b. Service Asset Attribute management requests (locally) |
| | c. Service Asset management requests (remotely through SOAP) |
| | d. Service Asset Attribute management requests (remotely through SOAP) |

TABLE 1-continued

| | |
|---|---|
| State Groups | a. Active usage though local interface<br>b. Active usage though SOAP<br>c. Idle |
| Constraints | None. |
| Relates To | n/a |

TABLE 2

| | |
|---|---|
| Identifier | COM-02 |
| Defining Quality | The Logical Asset manager EJB can create, remove and update Logical Assets and retrieve associated metadata. |
| Name | Logical Asset Manager EJB. |
| Attributes | Handling of logical group or individual representations of user associated assets, handling of logical asset metadata. |
| Behaviors | a. Create a logical asset<br>d. Update a logical asset<br>e. Remove a logical asset<br>f. Retrieve a logical asset<br>g. Retrieve all logical assets<br>h. Retrieve a logical asset by given name<br>i. Retrieve all logical assets by given asset<br>j. Retrieve all associated metadata from a logical asset<br>k. Retrieve all associated assets from a logical asset |
| Public Methods | a. createItem(LogicalAsset) - return: LogicalAsset<br>b. updateItem(LogicalAsset) - return: LogicalAsset<br>c. removeItem(LogicalAsset) - return: void<br>d. getItem(Integer logical_asset_id) - return: LogicalAsset<br>e. getAllItems( ) - return: LogicalAsset array, or null<br>f. findItemByAsset(Asset) - return: LogicalAsset array, or null<br>g. getAllAssociatedMetadata(LogicalAsset) - return: Metadata array, or null<br>h. getAllAssociatedAssets(LogicalAsset) - return: Asset Array, or null |
| Relationships | None. |
| Roles | a. Service Logical Asset management requests (locally)<br>b. Service Logical Asset management requests (remotely through SOAP) |
| State Groups | a. Active usage though local interface<br>b. Active usage though SOAP<br>c. Idle |
| Constraints | None. |
| Relates To | n/a |

TABLE 3

| | |
|---|---|
| Identifier | COM-03 |
| Defining Quality | The Metadata manager EJB can create, remove and update a Metadata item. Metadata can be associated with Logical Assets. |
| Name | Metadata Manager EJB. |
| Attributes | Handling of metadata, that may describe folders/groups associated with logical assets. Metadata usually is, but does not have to be associated with logical assets. |
| Behaviors | a. Create a metadata item<br>b. Update a metadata item<br>c. Remove a metadata item<br>d. Retrieve a metadata item<br>e. Retrieve all metadata items<br>f. Retrieve a metadata item by given metadata type<br>g. Retrieve a metadata item by given value |
| Public Methods | a. createItem(Metadata) return: Metadata<br>b. updateItem(Metadata) - return: Metadata<br>c. removeItem(Metadata) - return: void<br>d. getItem(Integer metadata_id) - return: Metadata<br>e. getAllItems( ) - return: Metadata array, or null |

TABLE 3-continued

| | |
|---|---|
| | f. findItemByType(Metadata) - return: Metadata array, or null<br>g. findItemByValue(String) - return: Metadata array, or null |
| Relationships | None. |
| Roles | a. Service Metadata management requests (locally)<br>b. Service Metadata management requests (remotely through SOAP) |
| State Groups | a. Active usage though local interface<br>b. Active usage though SOAP<br>c. Idle |
| Constraints | None. |
| Relates To | n/a |

TABLE 4

| | |
|---|---|
| Identifier | COM-04 |
| Defining Quality | The Metadata Type manager is an EJB that can create, remove and update Metadata types. |
| Name | Metadata Type Manager EJB. |
| Attributes | Handling of metadata types, that may describe categories of metadata. |
| Behaviors | a. Create a metadata type item<br>b. Update a metadata type item<br>d. Remove a metadata type item<br>e. Retrieve a metadata type item<br>f. Retrieve all metadata type items<br>g. Retrieve a metadata type item by given name |
| Public Methods | a. createItem(Metadata Type) return: Metadata Type<br>b. updateItem(Metadata Type) - return: Metadata Type<br>c. removeItem(Metadata Type) - return: void<br>d. getItem(Integer metadata_type_id) - return: Metadata Type<br>e. getAllItems( ) - return: Metadata Type array, or null<br>f. findItemByName(String) - return: Metadata Type, or null |
| Relationships | None. |
| Roles | a. Service Metadata Type management requests (locally)<br>b. Service Metadata Type management requests (remotely through SOAP) |
| State Groups | a. Active usage though local interface<br>b. Active usage though SOAP<br>c. Idle |
| Constraints | None. |
| Relates To | n/a |

TABLE 5

| | |
|---|---|
| Identifier | COM-05 |
| Defining Quality | The country manager EJB can create, remove and update a country record, |
| Name | Country Manager EJB. |
| Attributes | Handling of country record management. |
| Behaviors | a. Create a country record<br>b. Update a country record<br>c. Remove a country record<br>d. Retrieve a country record<br>e. Retrieve all country records<br>f. Retrieve a country record by given name<br>g. Retrieve a country record by given country code |
| Public Methods | a. createItem(Country) return: Country<br>b. updateItem(Country) - return: Country<br>c. removeItem(Country) - return: void<br>d. getItem(Integer country_id) - return: Country<br>e. getAllItems( ) - return: Country array, or null<br>f. findItemByName(String) - return: Country, or null<br>g. findItemByCode(String) - return: Country, or null |
| Relationships | None. |
| Roles | a. Service Country management requests (locally)<br>b. Service Country management requests (remotely through SOAP) |

TABLE 5-continued

| | |
|---|---|
| State Groups | a. Active usage though local interface<br>b. Active usage though SOAP<br>c. Idle |
| Constraints | None. |
| Relates To | n/a |

TABLE 6

| | |
|---|---|
| Identifier | COM-06 |
| Defining Quality | The File manager EJB can create, remove and update a File item. |
| Name | File Manager EJB. |
| Attributes | Handling of records representing physical files. |
| Behaviors | a. Create a file item<br>b. Update a file item<br>c. Remove a file item<br>d. Retrieve a file item<br>e. Retrieve all file items<br>f. Retrieve a file item by a given name<br>g. Retrieve a file item by a given name and path<br>h. Retrieve a file item by a given path |
| Public Methods | a. createItem(File) return: File<br>b. updateItem(File) - return: File<br>c. removeItem(File) - return: void<br>d. getItem(Integer file_id) - return: File<br>e. getAllItems( ) - return: File array, or null<br>f. findItemByName(String) - return: File array, or null<br>g. findItemByPath(String) - return: File array, or null<br>h. findItemByNameAndPath(String, String) - return: File, or null |
| Relationships | None. |
| Roles | a. Service File management requests (locally)<br>b. Service File management requests (remotely through SOAP) |
| State Groups | a. Active usage though local interface<br>b. Active usage though SOAP<br>c. Idle |
| Constraints | None. |
| Relates To | n/a |

TABLE 7

| | |
|---|---|
| Identifier | COM-07 |
| Defining Quality | The File extension manager EJB can create, remove and update a FileType and the associated extension. |
| Name | File Extension Manager EJB. |
| Attributes | Handling of file types and associated extensions. |
| Behaviors | a. Create a file type item<br>b. Update a file type item<br>c. Remove a file type item<br>d. Retrieve a file type item<br>e. Retrieve all file type items<br>f. Retrieve a file item by a given name<br>g. Retrieve a file item by a given file extension<br>h. Add a file extension<br>i. Add a collection of file extensions<br>j. Retrieve file extensions<br>k. Remove a file extension<br>l. Remove a collection of file extensions |
| Public Methods | a. createItem(FileType) return: FileType<br>b. updateItem(FileType) - return: FileType<br>c. removeItem(FileType) - return: void<br>d. getItem(Integer file_type_id) - return: FileType<br>e. getAllItems( ) - return: Filetype array, or null<br>f. findItemByName(String) - return: FileType, or null<br>g. findItemByExtension(String) - return: FileType array, or null<br>h. addFileExtension(FileType, String) - return: FileType, or null |

TABLE 7-continued

| | |
|---|---|
| | i. addFileExtensions(FileType, String array) - return: FileType, or null<br>j. getFileExtensions(FileType) - return: FileExtension array, or null<br>k. removeFileExtension(FileType, String) - return: FileType, or null<br>l. removeFileExtensions(FileType, String array) - return: FileType, or null |
| Relationships | None |
| Roles | a. Service FileType management requests (locally)<br>b. Service FileExtension management requests (locally)<br>c. Service FileType management requests (remotely through SOAP)<br>d. Service FileExtension management requests (remotely through SOAP) |
| State Groups | a. Active usage though local interface<br>b. Active usage though SOAP<br>c. Idle |
| Constraints | None. |
| Relates To | n/a |

TABLE 8

| | |
|---|---|
| Identifier | COM-08 |
| Defining Quality | The User manager EJB can create, remove and update a user record. |
| Name | User Manager EJB. |
| Attributes | Handling of user records. |
| Behaviors | a. Create a user account item<br>b. Update a user account item<br>c. Remove a user account item<br>d. Retrieve a user account item<br>e. Retrieve all user account items<br>f. Retrieve a user account item by login name<br>g. Retrieve a user account password hash a given login name and hash type |
| Public Methods | a. createItem(UserAccount) return: UserAccount<br>b. updateItem(UserAccount) - return: UserAccount<br>c. removeItem(UserAccount) - return: void<br>d. getItem(Integer user_account_id) - return: UserAccount<br>e. getAllItems( ) - return: UserAccount array, or null<br>f. findItemByLogin(String) - return: UserAccount array, or null<br>g. findPasswordHashByLogin(String, String) - return: String, or null |
| Relationships | None. |
| Roles | a. Service User management requests (locally)<br>b. Service User management requests (remotely through SOAP) |
| State Groups | a. Active usage though local interface<br>b. Active usage though SOAP<br>c. Idle |
| Constraints | None. |
| Relates To | n/a |

TABLE 9

| | |
|---|---|
| Identifier | COM-09 |
| Defining Quality | The UI Copy manager EJB can create, remove and update a UICopy record. UICopy records contain actual text content. |
| Name | UI Copy Manager EJB. |
| Attributes | Handling of UI Copy records. |
| Behaviors | a. Create a UICopy record<br>b. Update a UICopy record<br>c. Remove a UICopy record<br>d. Retrieve a UICopy record |

TABLE 9-continued

| | |
|---|---|
| | e. Retrieve all UICopy records<br>f. Retrieve a UICopy record by given name<br>g. Retrieve a UICopyText record by given name and renderer type and language |
| Public Methods | a. createItem(UICopy) return: UICopy<br>b. updateItem(UICopy) - return: UICopy<br>c. removeItem(UICopy) - return: void<br>d. getItem(Integer ui_copy_id) - return: UICopy<br>e. getAllItems( ) - return: UICopy array, or null<br>f. findItemByName(String) - return: UICopy array, or null<br>g. findUICopyTextItemByNameAnd-RendererTypeAndLanguage (String, RendererType, Language) - return: UICopyText, or null. |
| Relationships | None. |
| Roles | a. Service UICopy management requests (locally)<br>b. Service UICopy management requests (remotely through SOAP) |
| State Groups | a. Active usage though local interface<br>b. Active usage though SOAP<br>c. Idle |
| Constraints | None. |
| Relates To | n/a |

TABLE 10

| | |
|---|---|
| Identifier | COM-10 |
| Defining Quality | The Renderer Resource manager EJB can create, remove and update a RendererResource record. A RendererResource record specifies resource files with specific renderer types. |
| Name | Renderer Resource Manager EJB. |
| Attributes | Handling of Renderer Resource records. |
| Behaviors | a. Create a Renderer Resource record<br>b. Update a Renderer Resource record<br>c. Remove a Renderer Resource record<br>d. Retrieve a Renderer Resource record<br>e. Retrieve all Renderer Resource records<br>f. Retrieve a Renderer Resource record by given name<br>g. Retrieve a Renderer Resource File record by given name and renderer type and language |
| Public Methods | a. createItem(RendererResource) return: RendererResource<br>b. updateItem(RendererResource) - return: RendererResource<br>c. removeItem(RendererResource) - return: void<br>d. getItem(Integer renderer_resource_id) - return: RendererResource<br>e. getAllItems( ) - return: RendererResource array, or null<br>f. findItemByName(String) - return: RendererResource array, or null<br>g. findResourceFileItemByNameAnd-RendererTypeAndLanguage (String, RendererType, Language) - return: RenderingResourceFile, or null. |
| Relationships | None. |
| Roles | a. Service Rendering Resource management requests (locally)<br>b. Service Rendering Resource management requests (remotely through SOAP) |

TABLE 10-continued

| | |
|---|---|
| State Groups | a. Active usage though local interface<br>b. Active usage though SOAP<br>c. Idle |
| Constraints | None. |
| Relates To | n/a |

TABLE 11

| | |
|---|---|
| Identifier | COM-11 |
| Defining Quality | The Renderer Primitive manager EJB can create, remove and update a RendererPrimitive item. A RendererPrimitive item specifies primitive files with specific renderer types. |
| Name | Renderer Primitive Manager EJB. |
| Attributes | Handling of Renderer Primitive records. |
| Behaviors | a. Create a Renderer Primitive record<br>b. Update a Renderer Primitive record<br>c. Remove a Renderer Primitive record<br>d. Retrieve a Renderer Primitive record<br>e. Retrieve all Renderer Primitive records<br>f. Retrieve a Renderer Primitive record by given name<br>g. Retrieve a Renderer Primitive File record by given name and renderer type |
| Public Methods | a. createItem(RendererPrimitive) return: RendererPrimitive<br>b. updateItem(RendererPrimitive) - return: RendererPrimitive<br>c. removeItem(RendererPrimitive) - return: void<br>d. getItem(Integer renderer_primitive_id) - return: RendererPrimitive<br>e. getAllItems( ) - return: RendererPrimitive array, or null<br>f. findItemByName(String) - return: RendererPrimitive array, or null<br>g. findResourceFileItemByNameAnd-RendererType (String, RendererType) - return: RenderingPrimitiveFile, or null. |
| Relationships | None. |
| Roles | a. Service Rendering Primitive management requests (locally)<br>b. Service Rendering Primitive management requests (remotely through SOAP) |
| State Groups | a. Active usage though local interface<br>b. Active usage though SOAP<br>c. Idle |
| Constraints | None. |
| Relates To | n/a |

TABLE 12

| | |
|---|---|
| Identifier | COM-12 |
| Defining Quality | The Renderer Type manager EJB can create, remove and update a RendererType item. A RendererType item specifies primitive files with specific renderer types. |
| Name | Renderer Type Manager EJB. |
| Attributes | Handling of Renderer Type records. |
| Behaviors | a. Create a Renderer Type record<br>b. Update a Renderer Type record<br>c. Remove a Renderer Type record<br>d. Retrieve a Renderer Type record<br>e. Retrieve all Renderer Type records<br>f. Retrieve a Renderer Type record by given name |

TABLE 12-continued

| | |
|---|---|
| Public Methods | a. createItem(RendererType) return: RendererType<br>b. updateItem(RendererType) - return: RendererType<br>c. removeItem(RendererType) - return: void<br>d. getItem(Integer renderer_type_id) - return: RendererType<br>e. getAllItems( ) - return: RendererType array, or null<br>f. findItemByName(String) - return: RendererType array, or null |
| Relationships | None. |
| Roles | a. Service Rendering Type management requests (locally)<br>b. Service Rendering Type management requests (remotely through SOAP) |
| State Groups | a. Active usage though local interface<br>b. Active usage though SOAP<br>c. Idle |
| Constraints | None. |
| Relates To | n/a |

TABLE 13

| | |
|---|---|
| Identifier | COM-13 |
| Defining Quality | The Language manager EJB can create, remove and update a Language item. A Language item specifies language types. |
| Name | Language Manager EJB. |
| Attributes | Handling of Language records. |
| Behaviors | a. Create a Language record<br>b. Update a Language record<br>c. Remove a Language record<br>d. Retrieve a Language record<br>e. Retrieve all Language records<br>f. Retrieve a Language record by given name |
| Public Methods | a. createItem(Language) return: Language<br>b. updateItem(Language) - return: Language<br>c. removeItem(RendererType) - return: void<br>d. getItem(Integer language_id) - return: Language<br>e. getAllItems( ) - return: Language array, or null<br>f. findItemByName(String) - return: Language array, or null |
| Relationships | None. |
| Roles | g. Service Language management requests (locally)<br>h. Service Language management requests (remotely through SOAP) |
| State Groups | a. Active usage though local interface<br>b. Active usage though SOAP<br>i. Idle |
| Constraints | None. |
| Relates To | n/a |

TABLE 14

| | |
|---|---|
| Identifier | COM-14 |
| Defining Quality | The IDML UI manager EJB can create, remove and update a IDMLUI item. An IDML UI item contains unparsed IDML code chunks. |
| Name | IDML UI Manager EJB. |
| Attributes | Handling of IDMLUI records. |
| Behaviors | a. Create an IDML UI record<br>b. Update an IDML UI record<br>c. Remove an IDML UI record<br>e. Retrieve an IDML UI record<br>f. Retrieve all IDML UI records<br>g. Retrieve an IDML UI record by given name |

TABLE 14-continued

| | |
|---|---|
| Public Methods | a. createItem(IDMLUI) return: IDMLUI<br>b. updateItem(IDMLUI) - return: Language<br>c. removeItem(IDMLUI) - return: void<br>d. getItem(Integer idml_ui_id) - return: IDMLUI<br>e. getAllItems( ) - return: IDMLUI array, or null<br>f. findItemByName(String) - return: IDMLUI array, or null |
| Relationships | None. |
| Roles | a. Service IDML UI management requests (locally)<br>b. Service IDML UI management requests (remotely through SOAP) |
| State Groups | a. Active usage though local interface<br>b. Active usage though SOAP<br>c. Idle |
| Constraints | None. |
| Relates To | n/a |

TABLE 15

| | |
|---|---|
| Identifier | COM-15 |
| Defining Quality | The IDML Scriptlet manager EJB can create, remove and update a IDML Scriptlet item. An IDML Scriptlet item contains unparsed IDML scriptlet code chunks. |
| Name | IDML Scriptlet Manager EJB. |
| Attributes | Handling of IDML Scriptlet records. |
| Behaviors | a. Create an IDML Scriptlet record<br>b. Update an IDML Scriptlet record<br>c. Remove an IDML Scriptlet record<br>d. Retrieve an IDML Scriptlet record<br>e. Retrieve all IDML Scriptlet records<br>f. Retrieve an IDML Scriptlet record by given name |
| Public Methods | a. createItem(IDMLScriptlet) return: IDMLScriptlet<br>b. updateItem(IDMLScriptlet) - return: IDMLScriptlet<br>c. removeItem(IDMLScriptlet) - return: void<br>d. getItem(Integer idml_scriptlet_id) - return: IDMLScriptlet<br>e. getAllItems( ) - return: IDMLScriptlet array, or null<br>f. findItemByName(String) - return: IDMLScriptlet array, or null |
| Relationships | None. |
| Roles | a. Service IDML Scriptlet management requests (locally)<br>b. Service IDMLScriptlet management requests (remotely through SOAP) |
| State Groups | a. Active usage though local interface<br>b. Active usage though SOAP<br>c. Idle |
| Constraints | None. |
| Relates To | n/a |

TABLE 16

| | |
|---|---|
| Identifier | COM-16 |
| Defining Quality | The IDML Action manager EJB can create, remove and update a IDML Action item. An IDML Action item contains unparsed IDML Action code chunks. |
| Name | IDML Action Manager EJB. |
| Attributes | Handling of IDML Action records. |
| Behaviors | a. Create an IDML Action record<br>b. Update an IDML Action record<br>c. Remove an IDML Action record<br>d. Retrieve an IDML Action record<br>e. Retrieve all IDML Action records<br>f. Retrieve an IDML Action record by given name |

TABLE 16-continued

| | |
|---|---|
| Public Methods | a. createItem(IDMLAction) return: IDMLAction |
| | b. updateItem(IDMLAction) - return: IDMLAction |
| | c. removeItem(IDMLAction) - return: void |
| | d. getItem(Integer idml_action_id) - return: IDMLAction |
| | e. getAllItems( ) - return: IDMLAction array, or null |
| | f. findItemByName(String) - return: IDMLAction array, or null |
| Relationships | None. |
| Roles | a. Service IDML Action management requests (locally) |
| | b. Service IDML Action management requests (remotely through SOAP) |
| State Groups | a. Active usage though local interface |
| | b. Active usage though SOAP |
| | c. Idle |
| Constraints | None. |
| Relates To | n/a |

According to embodiments of the present invention, the data service layer 704 includes EJBs that function as an external interface. In one embodiment, the external interface EJBs include, but are not limited to, CountryManager, FileManager, FileTypeManager, IDMLActionManager, IDMLUIManager, LanguageManager, RendererTypeManager, RenderingPrimitiveManager, RenderingResourceManager and UICopyManager. Functions of these EJBs are described below. Details about each EJB described below may be found in Appendix G.

The Country Manager EJB interface manages countries used by the platform services runtime. Specifically, the country manager can create, remove, retrieve, query and update countries within the data service layer.

The File Manager EJB interface manages files used by the platform services runtime. Specifically, the file manager can create, remove, retrieve, query and update soft file references (with pointers to the actual file content) within the data service layer.

The File Type Manager creates a new file type item given a registered file type name and extension.

The IDML Action Manager EJB interface manages UI action items used by the platform services runtime. Specifically, the action manager can create, remove, retrieve, query and update IDML action elements for handling "clicks" such as, but not limited to, links within the presentation layer.

The IDML UI Manager EJB interface manages UI page items used by the platform services runtime. Specifically, the UI manager can create, remove, retrieve, query and update IDML UI page elements for rendering pages or other content resources within a presentation layer.

The Language Manager EJB interface manages languages used by the platform services runtime. Specifically, the UI manager can create, remove, retrieve, query and update registered languages for rendering pages or other content resources in a presentation layer or, in some embodiments, setting user preferences.

The Renderer Type Manager EJB interface manages target renderer types used to define the different rendering views used by the platform services runtime. Specifically, the renderer type manager can create, remove, retrieve, query and update registered renderer types for defining the possible views via a presentation layer.

The Rendering Primitive Manager EJB interface manages IDML primitives used to composite pages used by the IDML UI for the platform services runtime. Specifically, the rendering primitive manager can create, remove, retrieve, query and update registered renderer primitives that are used to implicitly render pages or other content resources for the presentation layer.

The Rendering Resource Manager EJB interface manages IDML resources used to composite pages (including, but not limited to, gifs and audio files) used by the IDML UI for the platform services runtime. Specifically, the rendering resource manager can create, remove, retrieve, query and update registered renderer resources that are used to implicitly display external resources for pages or other content resources for a presentation layer.

The UI Copy Manager EJB interface manages text copy used in compositing pages (i.e. written text for the language) used by the IDML UI for the platform services runtime. Specifically, the UI copy manager can create, remove, retrieve, query and update registered UI copy text that are used to display written content for pages or other content resources for the presentation layer.

Figure 12:
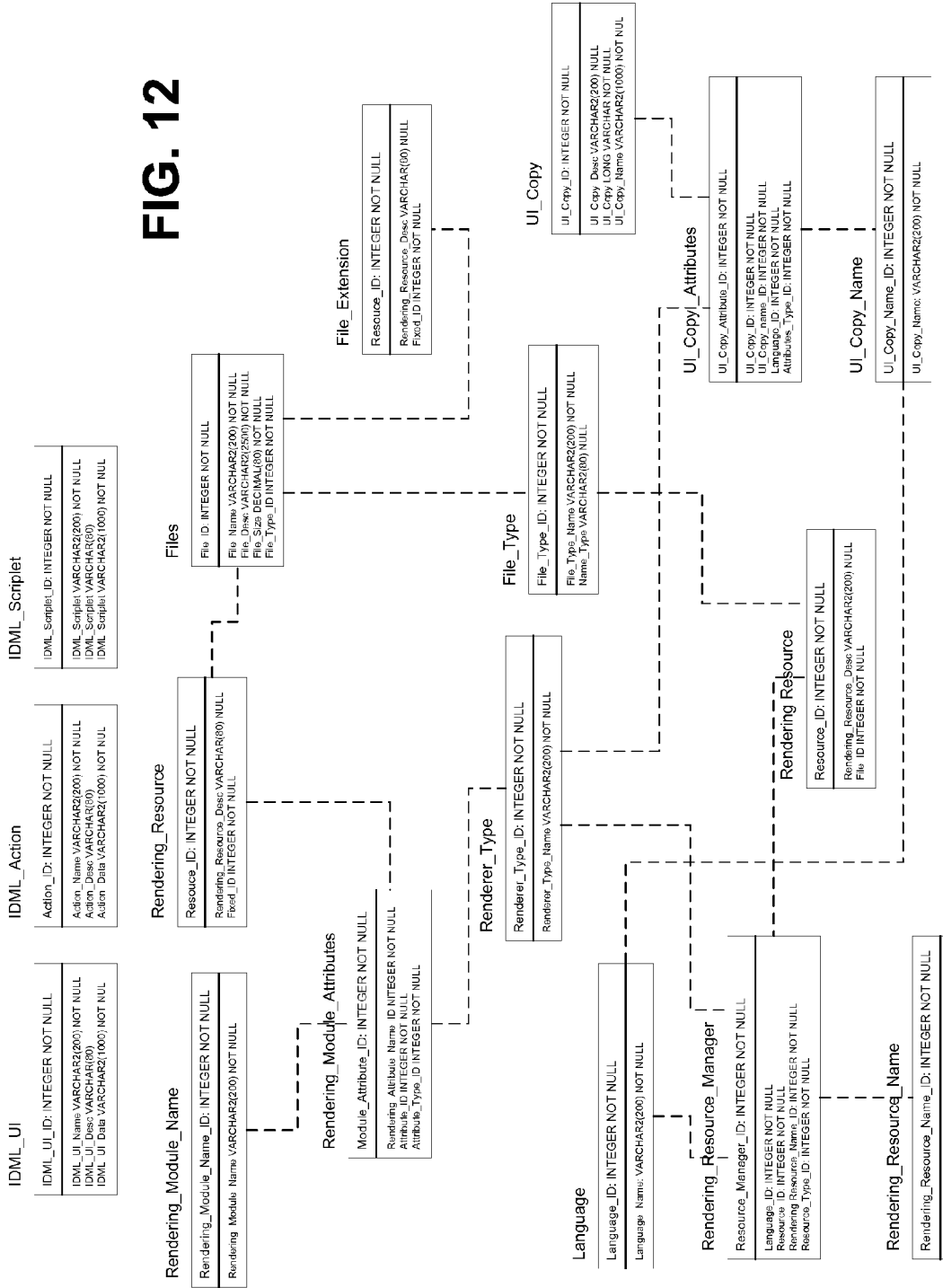
FIG. 12 shows an exemplary schema of a database for storing rendering elements, action elements, UI elements and copy, according to embodiments of the present invention.

Database 702 will now be described. According to embodiments of the present invention, rendering elements, action elements and UI elements, and copy may be stored in a database such that they are accessible to client applications. In one embodiment, the database is an Oracle™ 8I database. However, other suitable databases such as, but not limited to, Oracle 9i, FoxPro, DB2, Informix, Sybase, Access, mySQL, and MS SQL may also be used. An exemplary schema of the database for storing rendering elements, action elements and UI elements, and copy, according to one embodiment of the present invention, is shown in FIG. 12.

Figure 13:
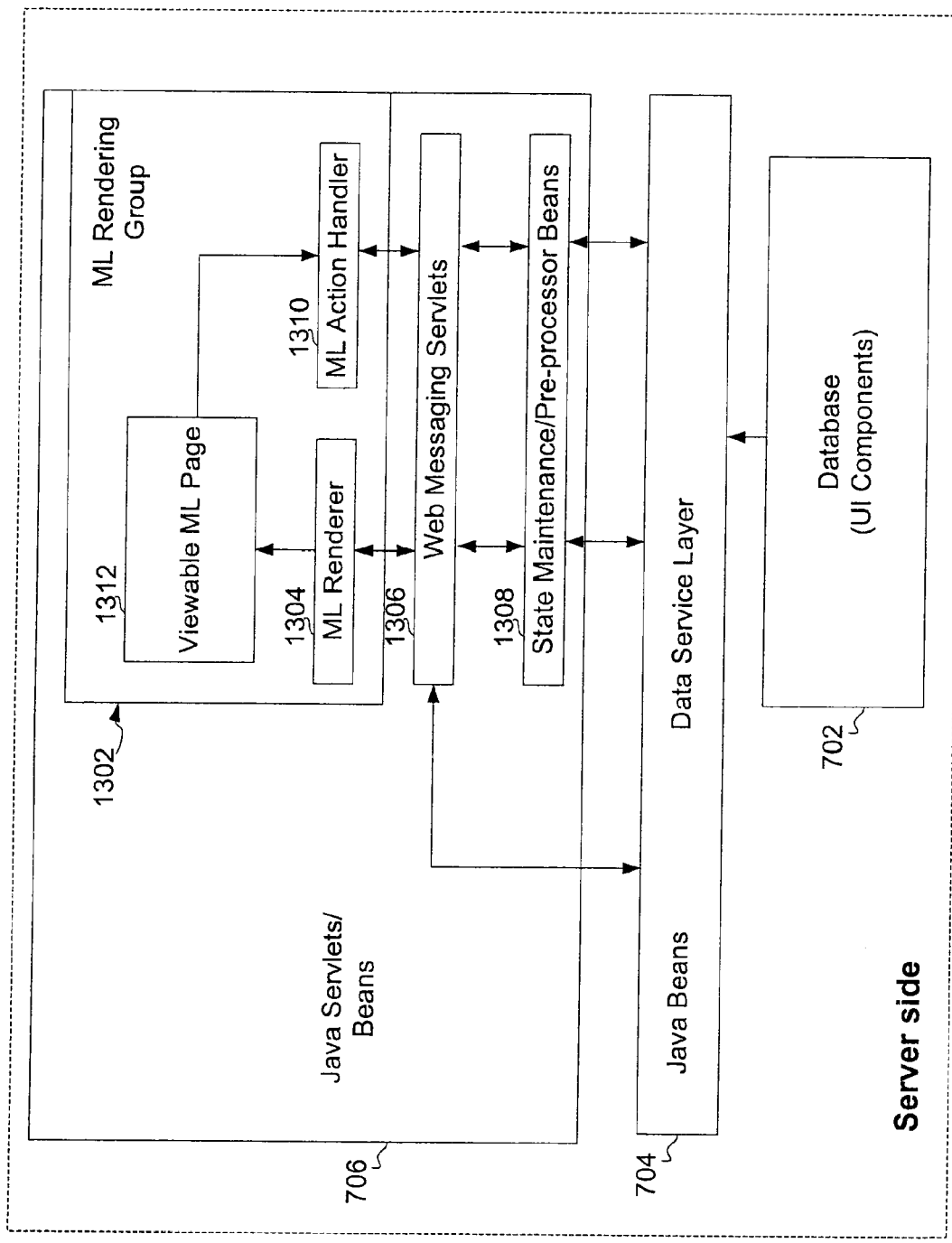
FIG. 13 shows a simplified block diagram of a mark-up language rendering group within web tier, along with a database and a data service layer, according to embodiments of the present invention.

FIG. 13 shows a simplified block diagram of a mark-up language ("ML") rendering group 1302 within web tier 706, along with database 702 and data service layer 704, according to embodiments of the present invention. ML rendering group 1302 may be any ML rendering group, including HTML rendering group 516 shown in FIG. 5.

According to embodiments of the present invention, ML renderer 1304 performs functions including, but not limited to, replacing IDML collection styles with ML page styles; embedding ML templates within a given style based on incoming IDML UI constructs and actions; performing one-to-one substitution of keyed variables from IDML to ML templates; maintaining a data "snapshot" of the current page for rapid incremental updates; recursively requesting preprocessed IDML from web messaging servlets 1306, which in turn use the state maintenance/preprocessor beans 1308; fetching non-IDML primitives and collections (such as, but not limited to, SWF and .jpg) via the web messaging servlets 1306 using paths specified in returned, preprocessed IDML; and outputting final ML pages (such as, but not limited to, HTML, WML and cHTML).

According to embodiments of the present invention, the state maintenance/preprocessor beans 1308 perform functions including, but not limited to, initially tracking only selected rendering platforms and localization settings; on each request received from ML rendering group 1302 via the web messaging servlets 1306, using the data service layer 704 API to retrieve unmodified IDML, primitives and collections (ASCII data), paths to file-based binary primitives and language specific text (ASCII copy); compositing paths and text copy into IDML; replacing IDML statement "{%NAMED_DB_OBJECT: NAMED_ELEMENT%}" with actual database content; and passing modified IDML and other ASCII data back to the ML rendering group 1302 via the web messaging servlets 1306.

According to embodiments of the present invention, ML action handler 1310 performs functions including, but not limited to, accepting input from mark-up languages (such as, but not limited to, HTML, WML and cHTML); retrieving a selected action or actions through the data service layer 704 API via the web messaging servlets 1306, which in turn use the state maintenance/preprocessor beans 1308; scheduling actions to the ML renderer 1304; and on completion of actions, sending an update command to ML renderer 1304, signaling that a render to the specified mark-up language should be performed, resulting in a viewable ML page 1312.

Figure 14:
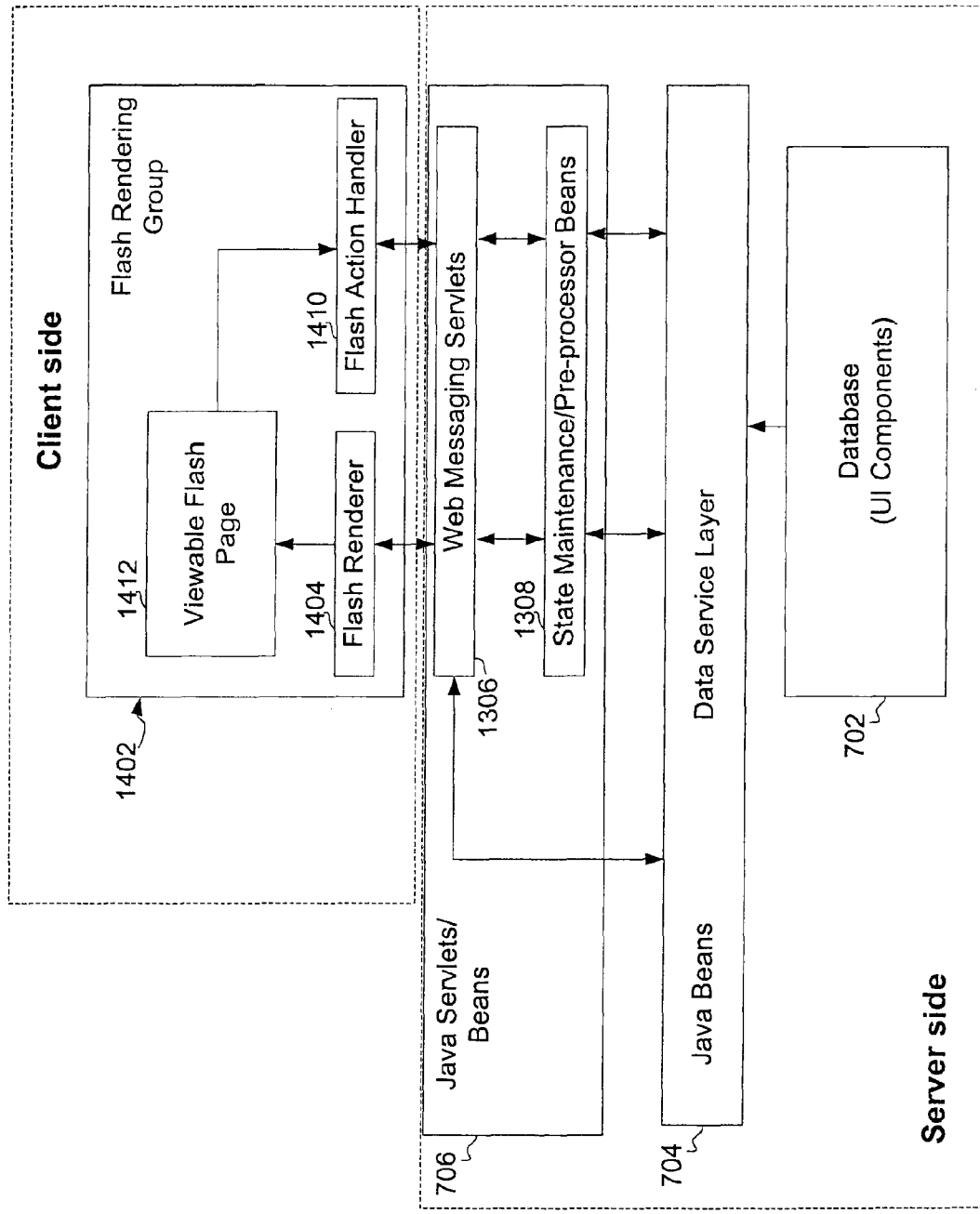
FIG. 14 shows a simplified block diagram of a Flash rendering group, along with a database, a data service layer and a web tier, according to embodiments of the present invention.

FIG. 14 shows a simplified block diagram of a Flash rendering group 1402 which may be a self-contained client-side renderer, along with database 702, data service layer 704 and web tier 706, according to embodiments of the present invention.

According to embodiments of the present invention, Flash renderer 1404 performs functions including, but not limited to, recursively requesting preprocessed IDML from web messaging servlets 1306, which in turn uses state maintenance/preprocessor beans 1308; using web messaging servlets 1306 to fetch non-IDML primitives and collections (such as, but not limited to, SWF, and .jpg) using paths specified in returned preprocessed IDML; and outputting a Flash page.

According to embodiments of the present invention, Flash action handler 1410 performs functions including, but not limited to, accepting input from Flash; retrieving a selected action or actions through the data service layer 704 via web messaging servlets 1306, which in turn use state maintenance/preprocessor beans 1308; handling actions from within the Flash rendering group 1402; triggering updates of Flash pages through the Flash renderer 1404. According to embodiments of the present invention, Flash action handler 1410 is located within the Flash rendering group 1402 and is thus not a Java servlet.

As described above, systems and methods for platform and language-independent delivery of page-based content transform content in a relatively abstract format into multiple platform formats in client-side applications' user interfaces in multiple human languages. In one embodiment, the relatively abstract format may be IDML.

Figure 15:
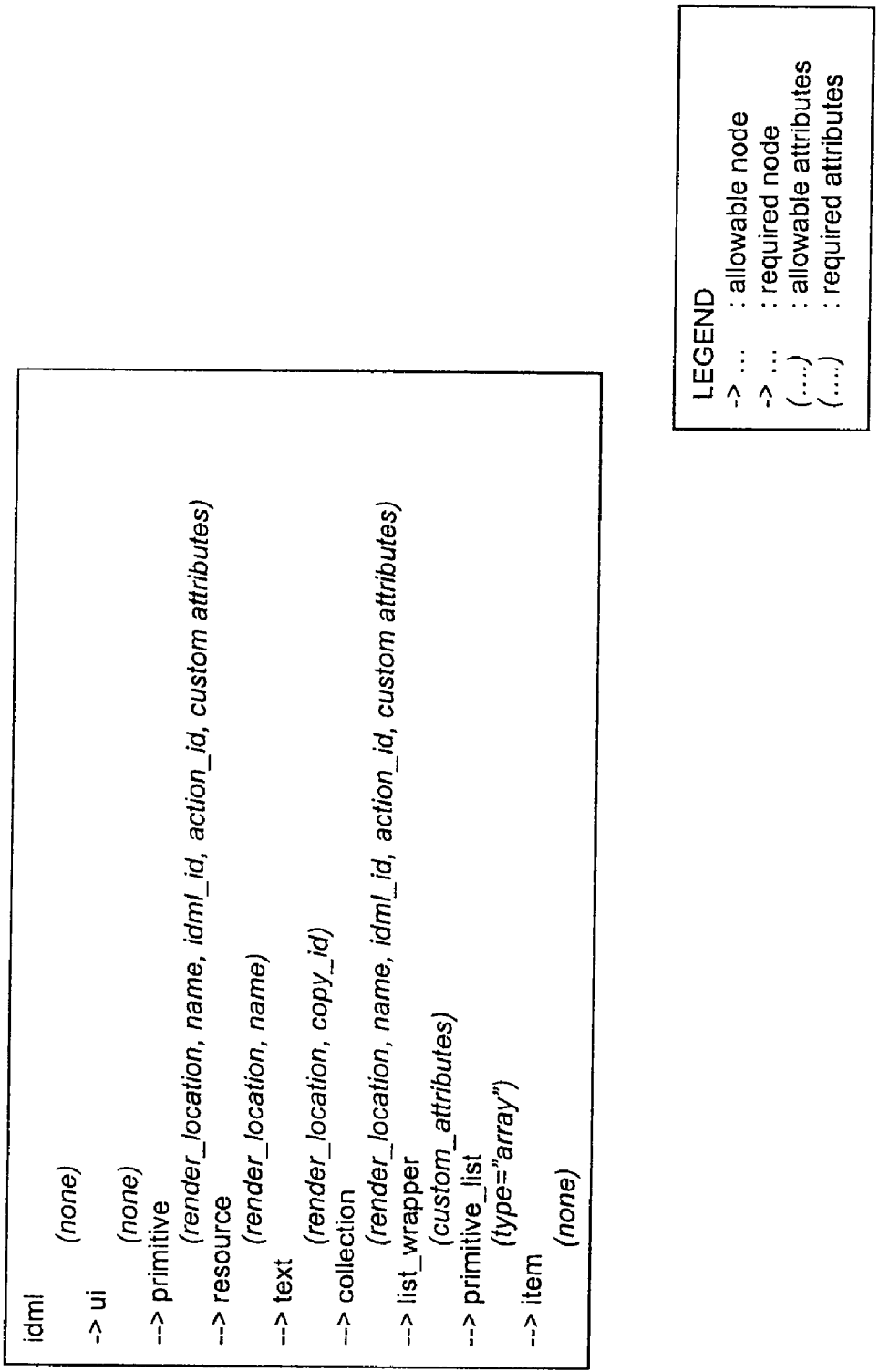
FIG. 15 shows an example IDML document structure, according to embodiments of the present invention.

The following describes the syntax of IDML and its allowable use, according to embodiments of the present invention. FIG. 15 shows an example IDML document structure, according to embodiments of the present invention. An IDML document may always start with a required <idml> tag. The IDML tag has no allowable attributes. Allowable nested tags are the UI tag. An example of a IDML tag is shown below:

```
<idml>
    ...
</idml>
```

After the IDML tag, the <ui> tag is required. The UI tag has no allowable attributes. Allowable nested tags are primitive, collection, resource, text, list_wrapper and primitive_list. An example of a UI tag is shown below:

```
<idml>
    <ui>
        ...
    </ui>
</idml>
```

A primitive tag is used to parameterize any primitives that are going to be included in the page. Primitives can only contain resources and text. Required attributes of the primitive tag are: name (the business name of the primitive) and render_location (the render location that the primitive will be placed in). Allowable attributes of the primitive tag are: idml_id (the name or identification ("ID") of the IDML element which further defines this primitive) and action_id (the name or ID of the action associated with this primitive) and custom attributes (any other attributes used specifically by this primitive). Allowable nested tags are: text (copy text used by this primitive) and resource (rendering resource (graphical element) used by this primitive). An example of a primitive tag is shown below:

```
<idml>
    <ui>
        <primitive name = "page_header"
            render_location="header_area">
            ...
        </primitive>
    </ui>
</idml>
```

A resource tag is used to specify any rendering resources that are going to be included in the page. Required attributes of the resource tag are: name (the business name of the resource) and render_location (the render location that the resource will be placed in). The resource tag has no allowable attributes or nested tags. An example of a resource tag is shown below:

```
<idml>
    <ui>
        <primitive name = "page_header"
            render_location="header_area">
            <resource name="elmacho_header"
                render_location="header_resource_area"/>
        </primitive>
    </ui>
</idml>
```

A text tag is used to specify any copy text that is going to be included in the page. Required attributes of the text tag are: copy_id (the business name of the copy text) and render_location (the render location that the text will be placed in). The text tag has no allowable attributes or nested tags. An example of a text tag is shown below:

```
<idml>
    <ui>
        <primitive name = "page_header"
            render_location="header_area">
            <resource name="elmacho_header"
                render_location="header_resource_area"/>
            <text copy_id="elmacho_title"
                render_location="header_title_area"/>
        </primitive>
    </ui>
</idml>
```

A collection tag is used to parameterize any collections that are going to be included in the page. Collections can contain primitives or other collections, as well as resources and text. Required attributes of the collection tag are: name (the business name of the primitive) and render_location (the render location that the collection will be placed in). Allowable attributes of the collection tag are: idml_id (the name or ID of the IDML element which further defines this primitive), action_id (the name or ID of the action associated with this primitive) and custom attributes (any other attributes used specifically by this collection). Allowable nested tags are: text (copy text used by this primitive), resource (rendering resource (graphical element) used by this primitive), collection (a collection contained within this collection) and primitive (a primitive contained within this collection). An example of a collection tag is shown below:

```
<idml>
    <ui>
        <collection name="main_page_template" render_location="main_area">
            <primitive name = "page_header" render_location="header_area">
                ...
            </primitive>
            <primitive name = "page_footer" render_location="footer_area">
                ...
            </primitive>
        </collection>
    </ui>
</idml>
```

A list_wrapper tag is used to wrap the primitive_list tag. This is due to the fact that the primitive_list tag has no allowable custom attributes. As such, the custom attributes can be included in the list wrapper. The list_wrapper tag has no required attributes. Allowable attributes are: custom attributes (any other attributes used specifically by this list). Allowable nested tags are: primitive_list (the primitive list which is wrapped by this list wrapper). An example of a list_wrapper tag is shown below:

```
<idml>
    <ui>
        <list_wrapper x_offset="20" y_offset="30">
            <primitive_list type="array">
                ...
            </primitive_list>
        </list_wrapper>
    </ui>
</idml>
```

A primitive_list is used to parameterize collections that are iterative in nature such as menus or other lists. Required attributes of the primitive_list are: type="array". For flash compatibility, the type="array" attribute must be included. The primitive_list has no allowable attributes. Allowable nested tags are: item (lists can contain many items). An example of a primitive_list is shown below:

```
<idml>
    <ui>
        <list_wrapper x_offset="20" y_offset="30">
            <primitive_list type="array">
                <item>
                    ...
                </item>
                <item>
                    ...
                </item>
```

```
            </primitive_list>
        </list_wrapper>
    </ui>
</idml>
```

An item tag is used to wrap the individual items in a primitive list. The item tag has no required or allowable attributes. Allowable nested tags are: primitive, collection, list_wrapper and primitive_list. An example of an item tag is shown below:

```
<idml>
    <ui>
        <list_wrapper x_offset="20" y_offset="30">
            <primitive_list type="array">
                <item>
                    <primitive name = "button" render_location="button_area">
                        <text copy_id = "drama_button"/>
                    </primitive>
                </item>
                <item>
                    <primitive name = "button" render_location="button_area">
                        <text copy_id = "action_button"/>
                    </primitive>
                </item>
            </primitive_list>
        </list_wrapper>
    </ui>
</idml>
```

One of the IDML syntax examples shown above is repeated below, along with a exemplary data tables 17 and 18, which may be saved, for example in a data source such as a database. Tables 17 and 18 illustrate a correspondence between the IDML code and the data tables stored in the data source.

```
<idml>
    <ui>
        <primitive name = "page_header" render_location="header_area">
            <resource name="elmacho_header" render_location="header_resource_area"/>
            <text copy_id="elmacho_title" render_location="header_title_area"/>
        </primitive>
    </ui>
</idml>
```

TABLE 17

(Copy Grid)

|  | HTML | Flash | cHTML |
|---|---|---|---|
| English | "elmacho_title" | "elmacho_title" | "elmacho_title" |
| Spanish | ............ | ............ | ............ |
| French | ............ | ............ | ............ |

TABLE 18

(Primitive Grid)

| HTML | "page_header"_HTML.XSLT |
| cHTML | "page_header"_cHTML.XSLT |
| Flash | "page_header"_SWF |

In the example IDML code shown above, it can be seen that the text copy_id in the IDML code="elmacho_title". Thus, in the exemplary copy grid shown in Table 17 versions of the copy "elmacho_title" may be implemented in each of the available platforms and languages (in this example HTML, cHTML and Flash; English, Spanish and French). The English and French versions (shown as . . . ) of the referenced copy appear in corresponding cells of Table 17.

Similarly, it can be seen that the primitive name="page_header" in the IDML code". Thus, in the exemplary primitive grid shown in Table 18, versions of the referenced primitive name are implemented in each of the available platforms of the present example. In the case of the HTML and cHTML platforms, the primitive is implemented in an XSLT format. For the Flash platform, the primitive is implemented in an SWF format.

Similar data tables may be implemented for graphics, actions and other types of elements and other data. For example, different language versions of graphics formats such as, but not limited to, JPEG and SWF may be stored in a table in a manner similar to that shown above.

Thus, it can be seen that embodiments of the present invention allow content, such as UI primitives and copy, to be defined in a relatively abstract format such as IDML that is then rendered into multiple platform formats in client-side applications' user interfaces in multiple human languages. Primitives implementing, for example, web pages or other pages, could be created for each platform type. When a change is required, for example adding or deleting a button or other user-selectable operator, a change made to the IDML or other relatively abstract format will add or delete the button across every supported platform, and thus in every device that the pages are rendered in. The user does not have to modify multiple source definitions of the pages.

Also, if a user's content is defined in the relatively abstract format, then when new content is introduced, the user is only required to add a new primitive, for example XSLT or SWF, for each supported device "category" instead of rewriting the new content for each supported device. This is due to the fact that devices within a specific device category may share enough commonality that the fact that they are separate devices may be transparent to the processed results. Furthermore, when new devices or device categories appear, new XSLT primitives may be coded rather than re-coding the exiting content for the new device or device category. Thus, maintenance of the pages is advantageously simplified.

Referring again to FIG. 11, .NET tool 1114 may, according to embodiments of the present invention, include a creation, modification and management tool that allows a page creator or publishing team to create, modify, and manage platform and language-independent page-based content. The page-based content can then be viewed and interacted with by end-users, with embodiments of the system and method for platform and language-independent delivery of page-based content being used to display the same pages on multiple platforms, and in multiple languages.

In one embodiment, a content creation, modification and management system application may run under Windows2000 Professional, and interfaces directly with services of the system for platform and language-independent delivery of page-based content through SOAP protocols, providing a "toolset" that allows a user to access, view, and modify one or more databases that adhere to database specifications defined for the system. In other embodiments, the creation, modification and management tool may run under other operating systems, including, but not limited to, Windows 98, Windows Me, Windows 2000, Windows XP, possible future implementations on Windows CE, Linux, Solaris, and Java VM.

According to embodiments of the present invention, embedded within the toolset is the ability to publish page data FROM one database instance TO another, using separate instances of the services. This segment of the toolset may be an implementation of the "publishing pipeline", defined in the "Screenblast 2.0 Site Publishing Functional Specifications," which appears in Appendix H.

However, embodiments of the present invention are not limited to moving content from one database instance to another. As an example, a publishing pipeline according to embodiments of the present invention may include the option to move physical files from one file system to another in conjunction with the database content transfers. In one embodiment, an alternate physical-file pipeline for publishing to a "Live" environment may be implemented, wherein time-stamps (last-modified) of individual files are sampled on a destination server, followed by a remote initiation of a server-side file sync process. This is, in turn, followed by another set of (looped) file-based time-stamp samples. This second round of samples only terminates when all of the physical files have been updated, as determined by changed time-stamps. Following this physical file movement, the database content is moved from the source database to the destination database in the normal fashion.

In one embodiment, UI elements are created by a user, for example a page developer, and are the elements of the system that define the overall page structure. UI elements are stored in the database as IDML code elements and associated data, such as name, description, etc.

The IDML in a UI Component can reference other components, actions, copy, assets, or rendering elements. The UI Components can be considered the "glue" that binds page elements together.

Figure 16:
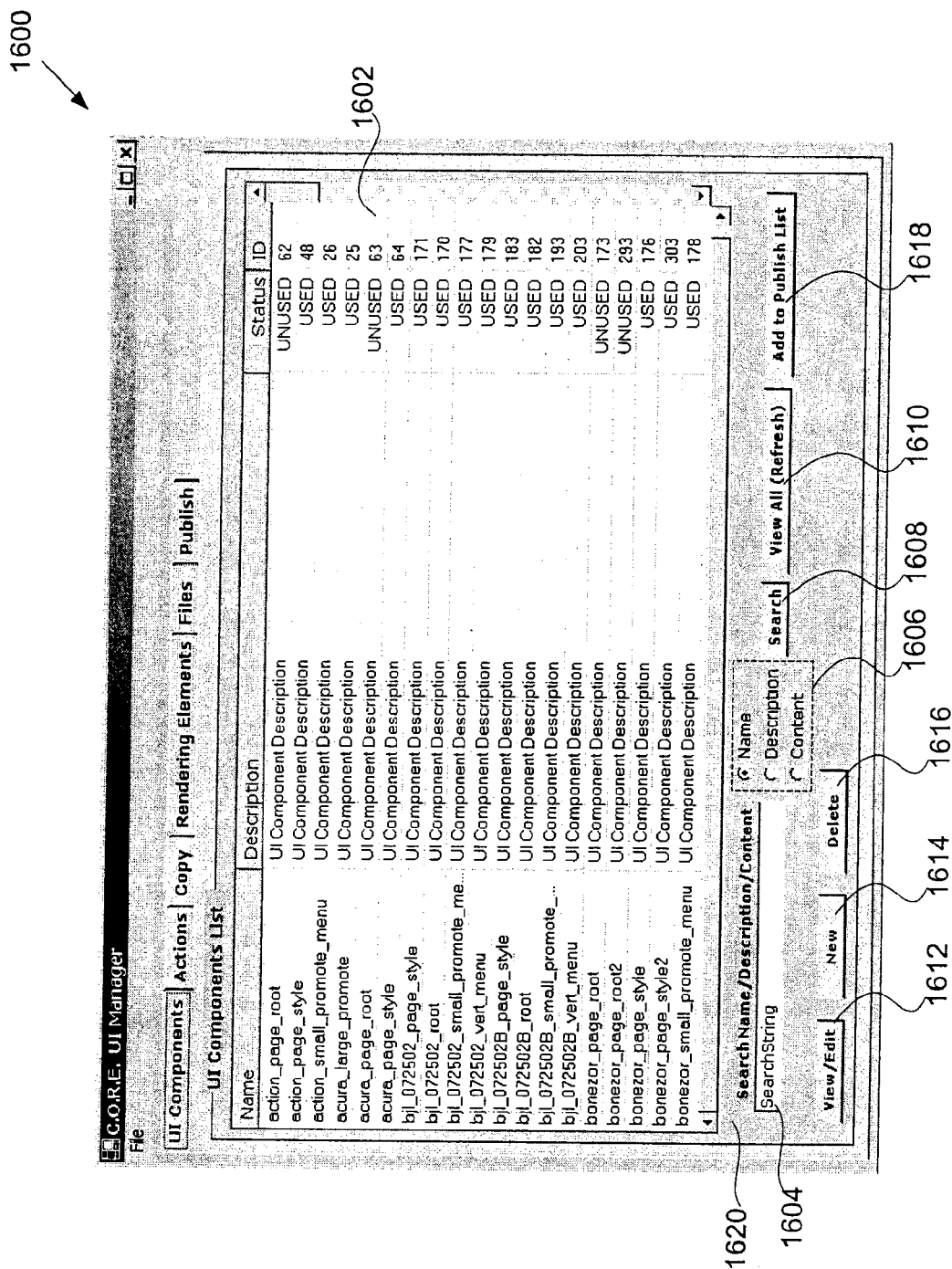
FIG. 16 shows an exemplary UI components list interface, according to embodiments of the present invention.

An exemplary UI components list interface 1600 is shown in FIG. 16, according to embodiments of the present invention. UI components list interface 1600 may show all of the UI components in a particular database, for example database 702, with links to editing interfaces, as well as giving the ability to add selected components to a publishing list. The "Search/Edit" area 1620 of the interface also allows the user to filter the list display based on search criteria, and to view, edit, or create UI components within the database.

List box 1602 displays all of the UI components in a particular database. Individual items are selected using a single-click or other suitable selection method. A Shift-Click allows the user to select a range of items, and a ctrl-click allows the selection of additional single items. Double-clicking an item brings up the "View/Edit" UI component interface 1700 (See FIG. 17) for that item. Items may be sorted by a particular header category by clicking or otherwise selecting that category, Clicking again in a particular category causes the items to be sorted in reverse order.

Given a particular search string in the "Search Name/Description/Content" text box 1604, and given the search area defined by the selection of either the "Name", "Description", or "Content" radio buttons generally designated by numeral 1606, selecting the "Search" user selectable operator 1608 will cause the list box 1602 to display only the items that match the search criteria. For instance, entering "comedy" in the search string, selecting the "Name" radio button, and selecting "Search" user selectable operator 1608 will cause only those items with the string "comedy" somewhere in the name to be displayed. Selecting the "View All" user selectable operator 1610 will negate the search feature and cause all items to be displayed again until the next search is performed.

Figure 17:
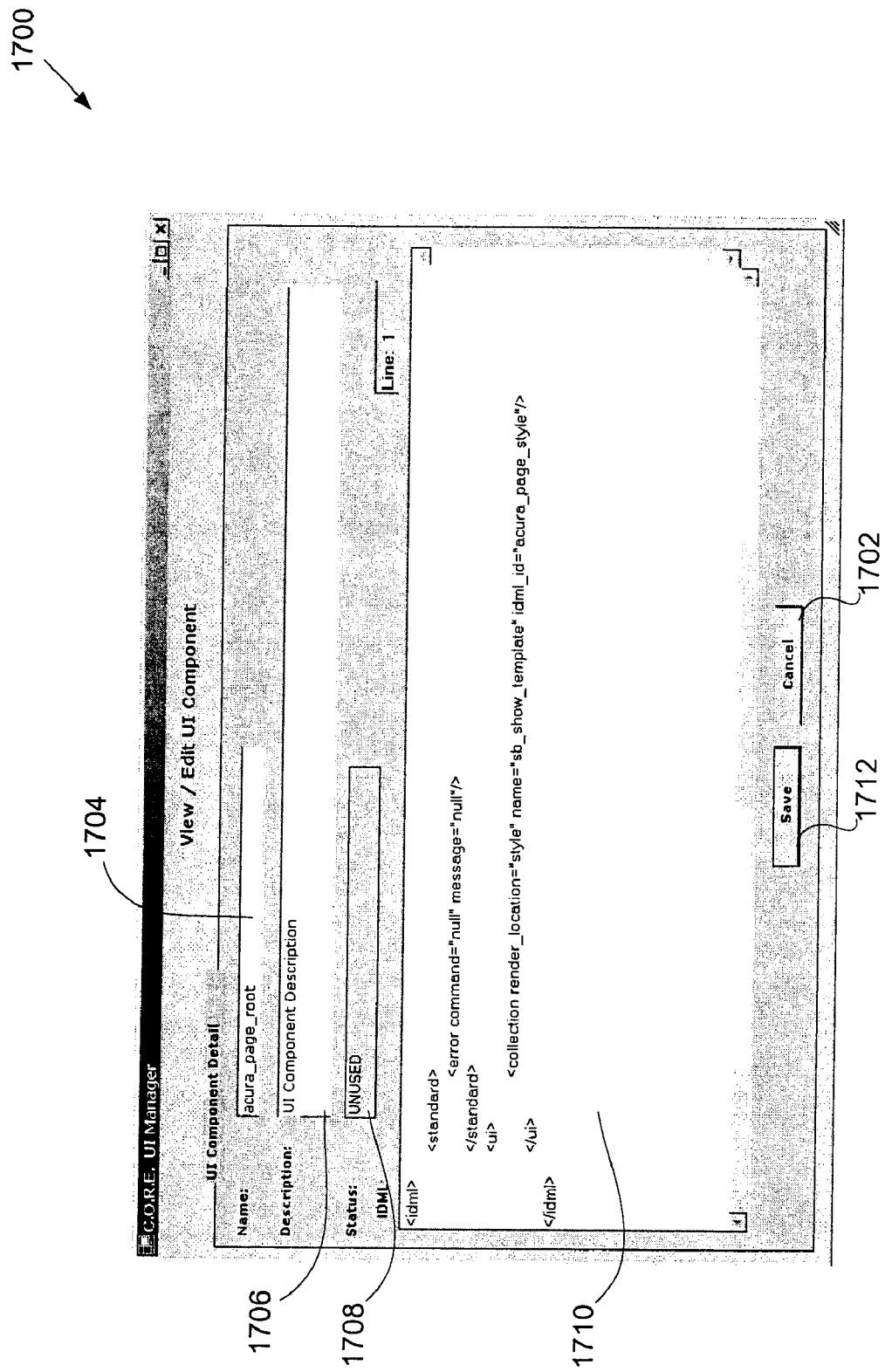
FIG. 17 shows an exemplary "View/Edit" UI component interface, according to embodiments of the present invention.

The "View/Edit" user selectable operator 1612 brings up the "View/Edit" UI component interface 1700, shown in FIG. 17, for the selected item in the list box 1602. If no items, or multiple items are selected, this user selectable operator has no effect. Double-clicking an item in the list box 1604 has the same effect as clicking this user selectable operator.

"New" user selectable operator 1614 brings up the "New" interface for creating new UI Components in the database. This interface is almost identical to the "View/Edit" UI component interface 1700, with the exception of a header, which reads "Create New UI Component". A default name and description is shown, and the IDML window is initially empty. Attempting to save with the same name as an already existing UI component is not allowed.

"Delete" user selectable operator 1616 deletes all selected UI Components in the list box. Before deletion, a confirmation prompt may appear to protect the user against inadvertently deleting items by mistake.

"Add to Publish List" user selectable operator 1618 adds all currently selected UI Components to the list of items in the publishing queue (see below). If a UI Component is already on the list, a duplicate instance is not added.

In one embodiment, on first viewing UI components list interface 1600, the top row in the UI Components List is highlighted and "View/Edit" is the default double-click action. Scroll bars may only be visible if the list exceeds the size of the list box.

Referring now to FIG. 17, an exemplary "View/Edit" UI component interface 1700 will be described in more detail. Through use of the "View/Edit" UI component interface 1700, the detailed information in an individual UI Component may be viewed and edited. When saved, these UI Components are stored in the database as IDML code components, with the associated data, such as name, description, etc.

The "Cancel" user selectable operator 1702 closes the "View/Edit" UI component interface 1700 and returns the user to the main interface. Changes that may have been made in the "View/Edit" UI component interface 1700 are not saved.

The Name text field 1704 allows the user to change the business name of the UI Component. When this interface is accessed by using the "New" user selectable operator 1614 from the main UI components list interface 1600, this field allows the user to enter the name of a new UI Component. The "Description" text field 1706 allows the user to enter any extra descriptive information about the UI Component.

The Status field 1708 is a read-only text field that indicates if the UI Component is referenced (USED) by another UI Component, or if it is not referenced (UNUSED). The status in this field is updated whenever the "Verify" user selectable operator (not shown) is clicked or otherwise selected.

IDML editing window 1710 serves as an editor for a UI Component's IDML code. If a new component is being created, this window is initially left blank. "Save" user selectable operator 1712 causes the tool to save the UI Component data to the database. If creating a new component, saving over an existing component is not allowed. If editing an existing component, and the component name has been changed, the tool may launch a confirmation pop-up if attempting to save over an existing named UI Component. Otherwise, the save is performed automatically, the "View/Edit" UI component interface 1700 is closed, and a "UI Component Successfully Saved" message may appear in a header of the UI components list interface 1600.

Figure 18:
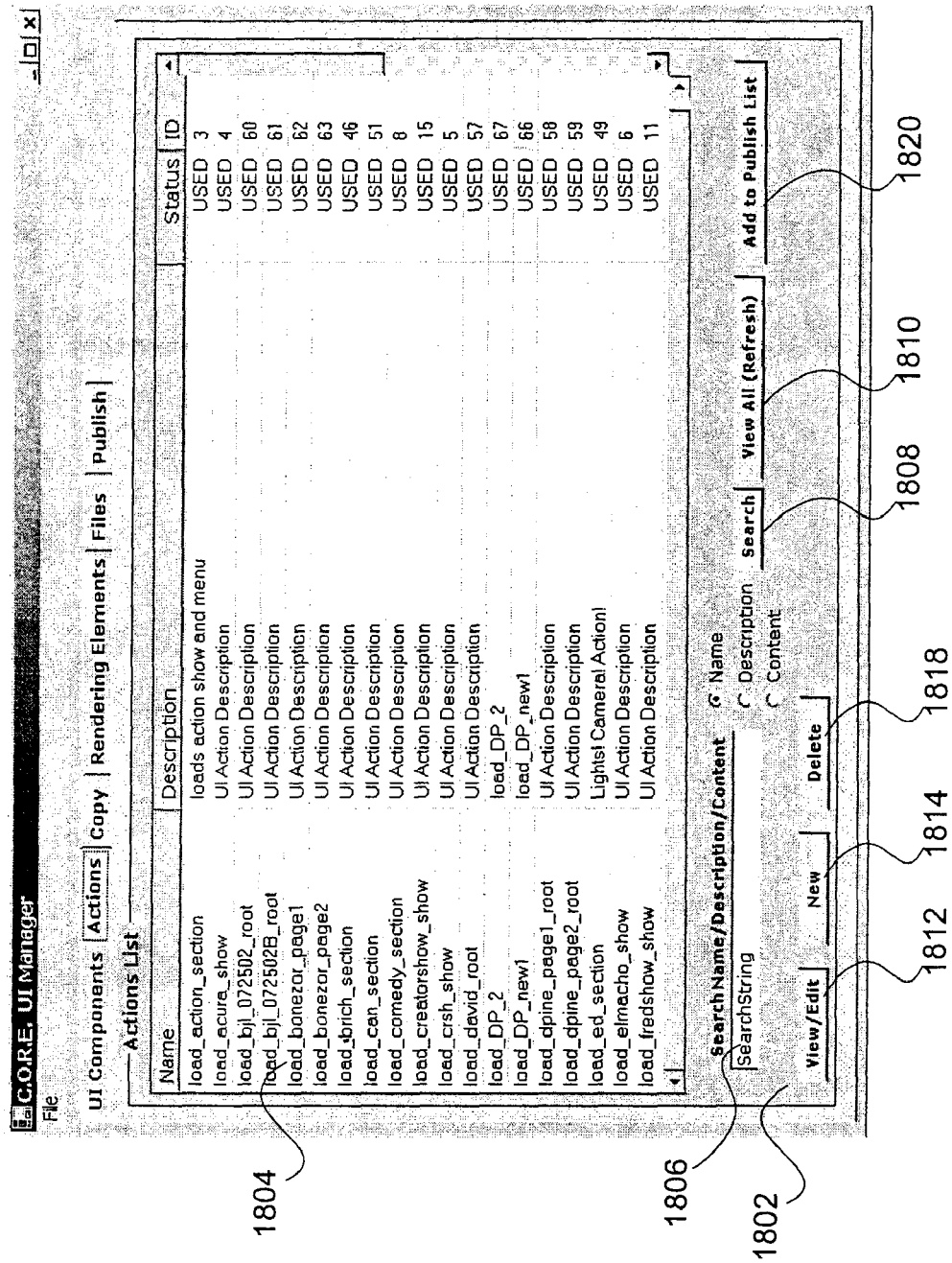
FIG. 18 shows an exemplary actions list interface, according to embodiments of the present invention.

FIG. 18 shows an exemplary actions list interface 1800. Actions are created by the user, for example a page developer, and are the elements of the system that define special behaviors within the overall page. Actions are stored in the database as IDML code components and associated data, such as name, description, etc.

The IDML in an action references one or more specific named low-level actions that cause events to occur within the system. Other data may be embedded in these actions that define links to elements such as sub-actions, copy, assets, or rendering elements. Actions are system elements that "do things" based on user input.

The actions list interface 1800 shows all of the actions in a particular database, for example database 702, with links to editing interfaces, as well as giving the ability to add selected actions to a publishing list. The "Search/Edit" area 1802 of the interface also allows the user to filter the list display based on search criteria, and to view, edit, or create actions within the database.

Figure 19:
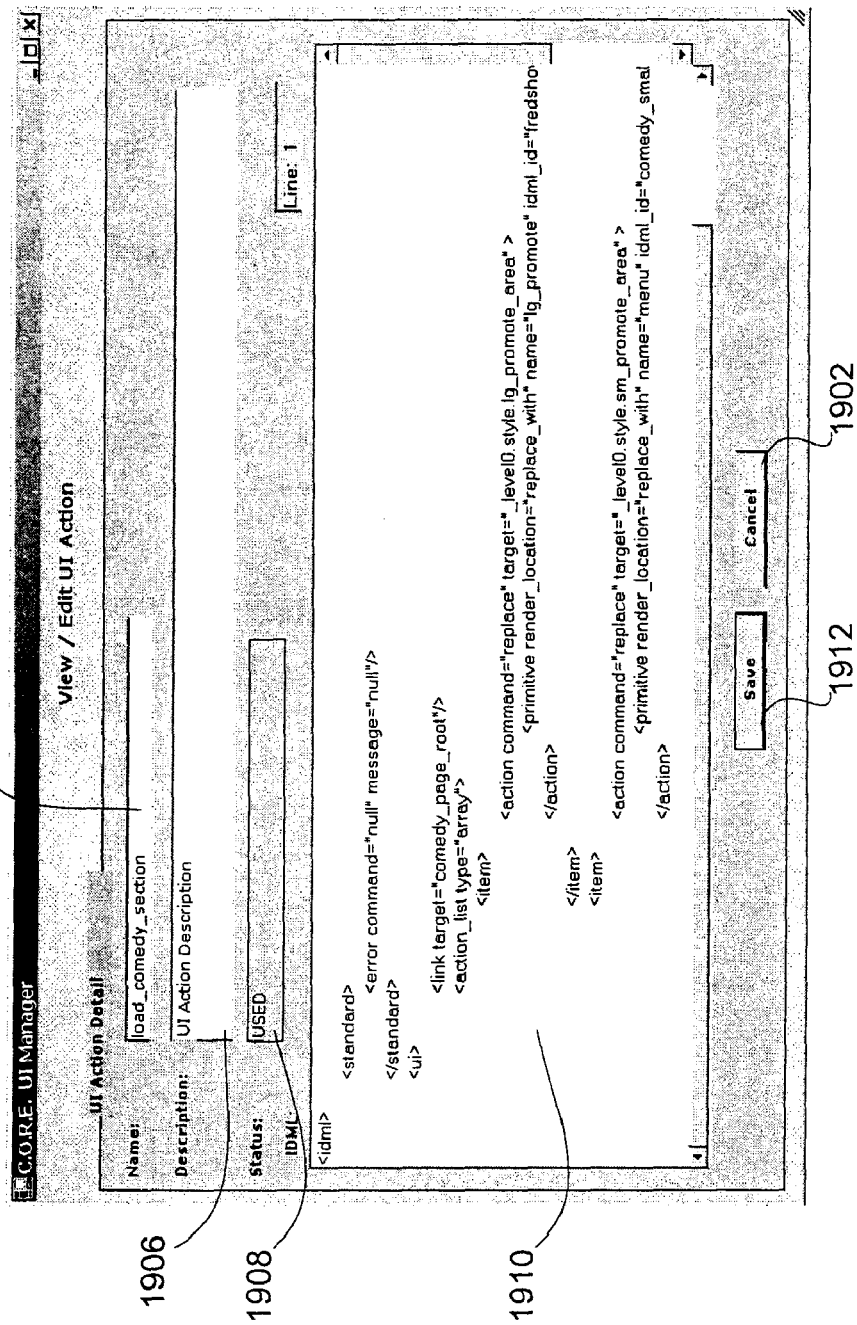
FIG. 19 shows an exemplary "View/Edit" action interface, according to embodiments of the present invention.

List box 1804 displays all of the actions in a particular database. Individual items are selected using a single-click or other suitable selection method. A shift-click allows the user to select a range of items, and a ctrl-click allows the selection of additional single items. Double-clicking an item brings up the "View/Edit" interface 1900 (See FIG. 19) for that item. Items may be sorted by a particular header category by clicking on that category. Clicking again in a particular category causes the items to be sorted in reverse order.

"New" user selectable operator 1814 brings up the "New" interface for creating new UI actions in the database. This interface is almost identical to the "View/Edit" action interface 1900, with the exception of the header, which reads "Create New Action". A default name and description is shown, and the IDML window is initially empty. Attempting to save with the same name as an already existing action is not allowed.

"Search Name/Description/Content" text box 1806, "Search" user selectable operator 1808, "View All" user selectable operator 1810, "View/Edit" user selectable operator 1812, "Delete" user selectable operator 1818 and "Add to Publish List" user selectable operator 1820 function in a manner similar to that described above for similar features on the UI components list interface 1600.

In one embodiment, on first viewing actions list interface 1800, the top row in the actions list box 1804 is highlighted and "View/Edit" is the default double-click action. Scroll bars my only be visible if the list exceeds the size of the list box.

Referring again to FIG. 19, an exemplary "View/Edit" action interface 1900 will be described in more detail. Through use of the "View/Edit" action interface 1900, the detailed information in an individual UI action may be viewed and edited. When saved, these UI actions are stored in the database as IDML code components, with the associated data, such as name, description, etc.

The "Cancel" user selectable operator 1902 closes the "View/Edit" action interface 1900 and returns the user to the main interface. Changes that may have been made in the "View/Edit" action interface 1900 are not saved.

The Name text field 1904 allows the user to change the business name of the UI action. When this interface is accessed by using the "New" user selectable operator 1814 from the main UI actions list interface 1800, this field allows the user to enter the name of a new UI action. The "Description" text field 1906 allows the user to enter any extra descriptive information about the UI action.

The Status field 1908 is a read-only text field that indicates if the UI action is referenced (USED) by another UI Component, or if it is not referenced (UNUSED). The status in this field is updated whenever the "Verify" user selectable operator (not shown) is clicked or otherwise selected.

IDML editing window 1910 serves as an editor for a UI action's IDML code. If a new action is being created, this window is initially left blank. "Save" user selectable operator 1912 causes the tool to save the UI action data to the database. If creating a new action, saving over an existing action is not allowed. If editing an existing action, and the action name has been changed, the tool may launch a confirmation pop-up if attempting to save over an existing named UI action. Otherwise, the save is performed automatically, the View/Edit action interface 1900 is closed, and a "UI Component Successfully Saved" message may appear in a header of the actions list interface 1800.

Figure 20:
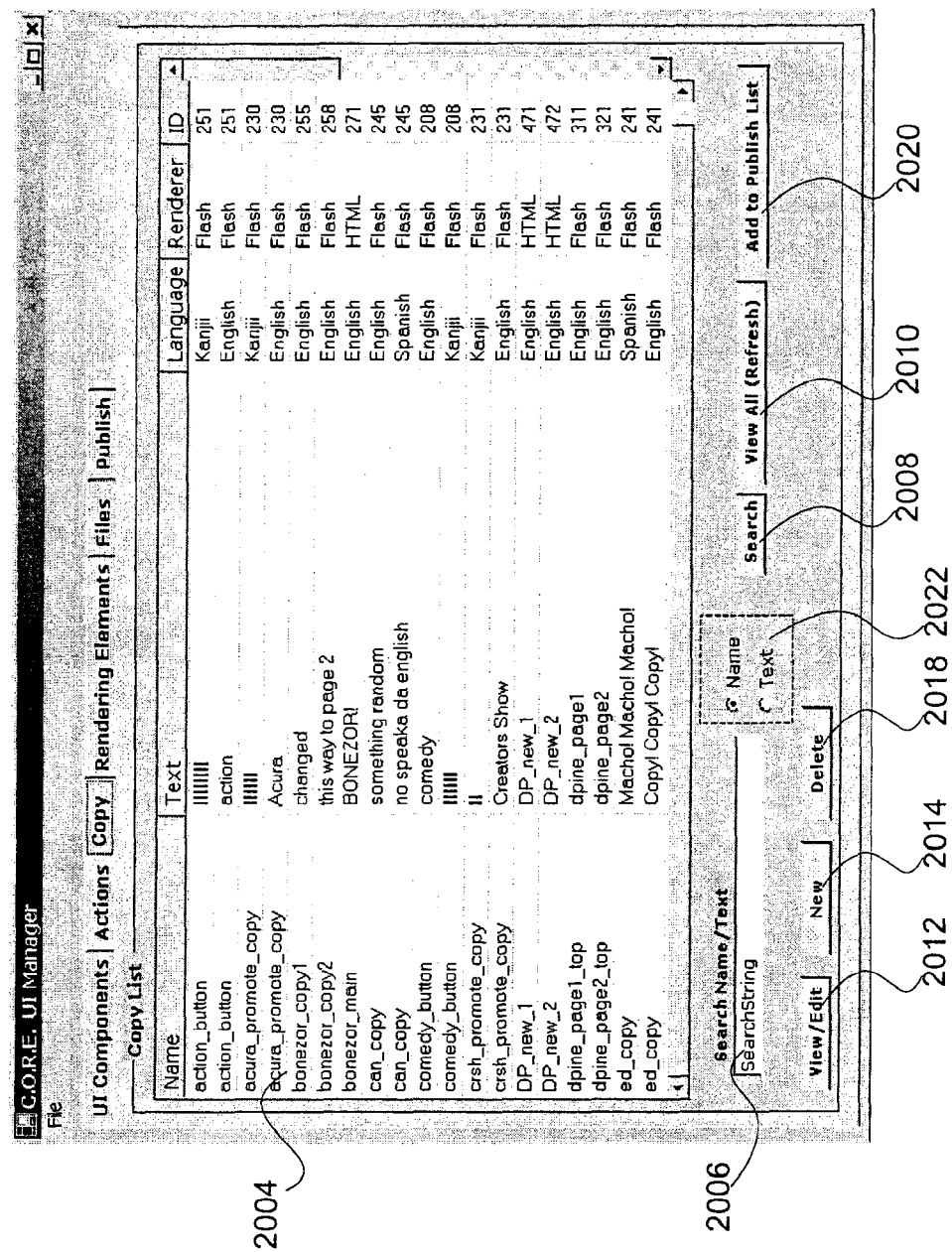
FIG. 20 shows an exemplary copy list interface, according to embodiments of the present invention.

FIG. 20 shows an exemplary copy list interface 2000. Copy (text) is created by a user, for example a page developer, and comprises the elements of the system that define displayed text within the overall page. In one embodiment, copy is stored in the database as 4-byte Unicode text and associated data, such as name, languages, renderers, etc. However other formats for storing the copy are possible including, but not limited to, UnicodeBig, UnicodeBigUnmarked, UnicodeLittle, UnicodeLittleUnmarked, UTF8, UTF-16. Uses of the system in which internationalization is not needed could take advantage of language-specific encodings.

The copy list interface 2000 shows all of the copy in a particular database, for example database 702, with links to editing interfaces, as well as giving the ability to add selected copy items to a publishing list. The "Search/Edit" area 2002 of the interface also allows the user to filter the list display based on search criteria, and to view, edit, or create copy items within the database.

Figure 21:
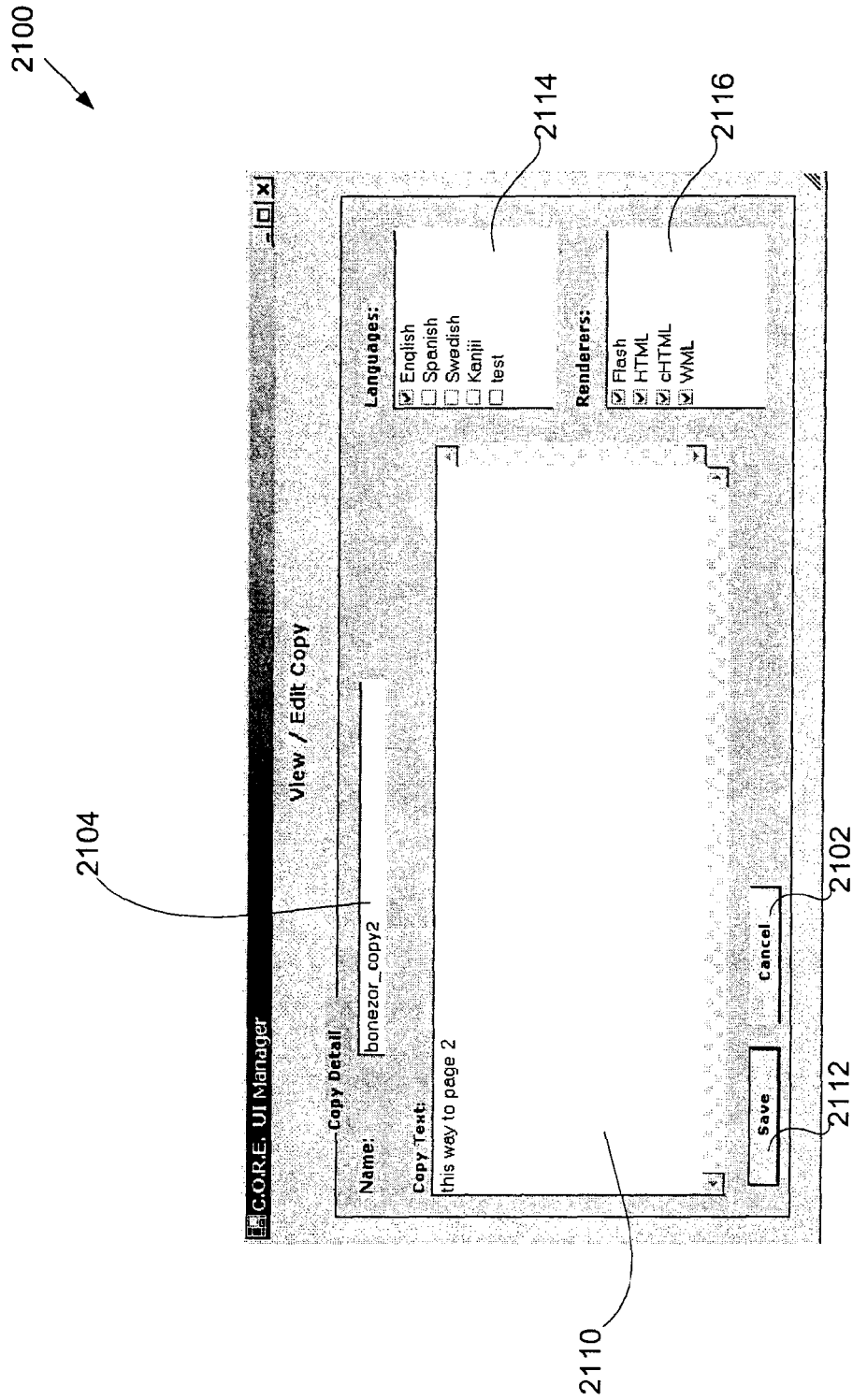
FIG. 21 shows an exemplary "View/Edit" copy interface, according to embodiments of the present invention.

List box 2004 displays all of the copy items in a particular database. Individual items are selected using a single-click or other suitable selection method. A shift-click allows the user to select a range of items, and a ctrl-click allows the selection of additional single items. Double-clicking an item brings up the "View/Edit" copy interface 2100 (See FIG. 21) for that item. Items may be sorted by a particular header category by clicking on that category. Clicking again in a particular category causes the items to be sorted in reverse order. Note that a named copy item within the database contains multiple sub-items, grouped by text, language and renderer. The copy list box 2004 displays all sub-items, not the single named meta-item.

Given a particular search string in the "Search Name/Text" text box 2006 text box, and given the search area defined by the selection of either the "Name" or "Text" radio button, generally referred to by the numeral 2022, selecting the "Search" user selectable operator 2008 will cause the list box 2004 to display only the items that match the search criteria. For instance, entering "comedy" in the search string, selecting the "Name" radio button, and selecting "Search" user selectable operator 2008 will cause only those items with the string "comedy" somewhere in the name to be displayed. Selecting the "View All" user selectable operator 2010 will negate the search feature and cause all items to be displayed again until the next search is performed.

"New" user selectable operator 2014 brings up the "New" interface for creating new copy in the database. This interface is almost identical to the "View/Edit" copy interface 2100, with the exception of the header, which reads "Create New Copy". A default name is shown, and the copy text window is initially empty. Attempting to save with the same name as an already named copy element is not allowed.

"View/Edit" user selectable operator 2012, "Delete" user selectable operator 2018 and "Add to Publish List" user selectable operator 2020 function in a manner similar to that described above for similar features on the UI components list interface 1600.

In one embodiment, on first viewing copy list interface 2000, the top row in the actions list box 2004 is highlighted and "View/Edit" is the default double-click action. Scroll bars my only be visible if the list exceeds the size of the list box.

Referring again to FIG. 21, an exemplary "View/Edit" copy interface 2100 will be described in more detail. Through use of the "View/Edit" copy interface 2100, the detailed information in an individual copy item is viewed and edited. In one embodiment, when saved, the copy item is stored in the database as 4-byte Unicode text, with the associated data, such as name, languages, etc. However other formats for storing the copy are possible including, but not limited to, UnicodeBig, UnicodeBigUnmarked, UnicodeLittle, UnicodeLittleUnmarked, UTF8, UTF-16. Uses of the system in which internationalization is not needed could take advantage of language-specific encodings.

"Cancel" user selectable operator 2102 closes the "View/Edit" copy interface 2100 and returns the user to the main interface. Changes that may have been made in the "View/Edit" copy interface 2100 are not saved.

The "Name" text field 2104 allows the user to change the business name of the copy item. When this interface is accessed by using the "New" user selectable operator 2014 from the main viewing copy list interface 2000, this field allows the user to enter the name of a new copy item.

Copy text editing window 2110 serves as an editor for a copy item's text. If a new copy item is being created, this window is initially left blank. Multiple text data may be associated with a single "business named" copy item. This allows for multiple language and renderer support.

"Save" user selectable operator 2112 causes the tool to save the copy item data to the database. If creating a new copy item, the saving over an existing copy item is not allowed. If editing an existing copy item, and the copy item's name has been changed, the tool may launch a confirmation pop-up if attempting to save over an existing named copy item. Otherwise, the save is performed automatically, the "View/Edit" copy interface 2100 is closed, and a "Copy Successfully Saved" message may appear in a header of the viewing copy list interface 2000.

Languages checked list box 2114 allows the user to set one or more languages that the text will be used for during rendering. At least one language must be selected before saving. In one embodiment, because there can be more than one piece of text associated with a named copy item, there must not be a match between a checked language and checked renderer associated with one instance of text, and a checked language and renderer associated with another instance of text in the same named copy item.

Renderer select box 2116 allows the user to set one or more renderers that the text will be used for during rendering. At least one renderer must be selected before saving. In one embodiment, because there can be more than one piece of text associated with a named copy item, there must not be a match between a checked language and checked renderer associated with one instance of text, and a checked language and renderer associated with another instance of text in the same named copy item.

Figure 22:
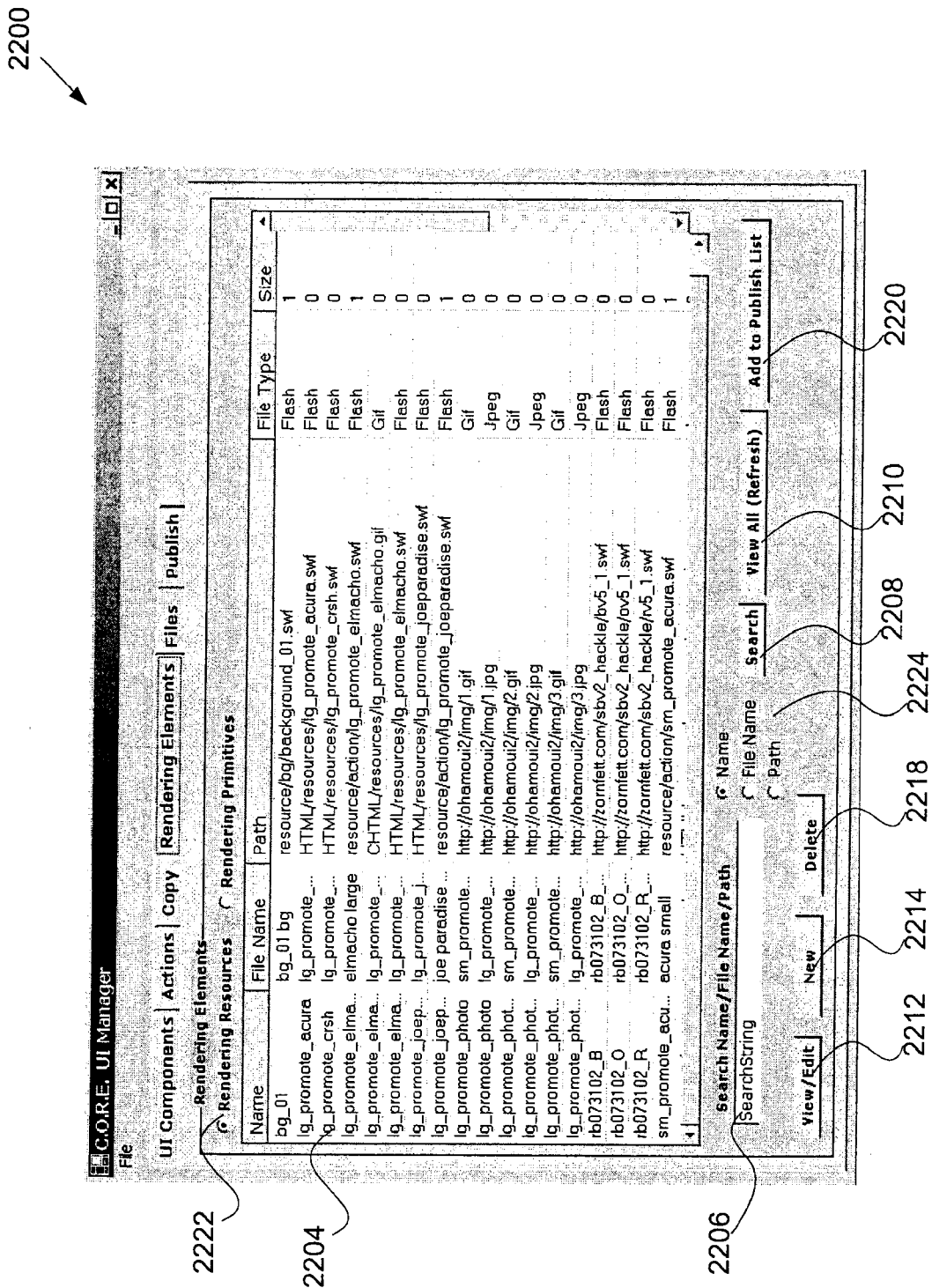
FIG. 22 shows an exemplary rendering elements list interface, according to embodiments of the present invention.

FIG. 22 shows an exemplary rendering elements list interface 2200. Rendering elements are created by created by a user, for example a page developer, and comprise the elements of the system that reference renderer and language specific resources and primitives that are displayed as part of a page. These resources and primitives are indexed through a file table in a database. Rendering elements contain the contextual information needed for the system to correctly display file-based images, flash animations, etc. within an IDML defined page.

The rendering elements list interface 2200 shows all of the rendering elements in a particular database, for example database 702, with links to editing interfaces, as well as giving the ability to add selected rendering elements to a publishing list. Search capabilities are enabled in this interface as well.

List box 2204 displays a subset of the rendering elements in a particular database. That subset is selected using the "Rendering Resources" and "Rendering Primitives" radio buttons referred to generally by the numeral 2222 at the top of rendering elements list interface 2200. Individual items are selected using a single-click or other suitable selection method. A shift-click allows the user to select a range of items, and a ctrl-click allows the selection of additional single items. Double-clicking an item brings up the "View/Edit" rendering elements interface 2300 (See FIG. 23) for that item. Items may be sorted by a particular header category by clicking on that category. Clicking again in a particular category causes the items to be sorted in reverse order. Note that a named rendering element within the database contains multiple sub-items, grouped by file, language and renderer. The rendering element list box 2204 displays all sub-items, not the single named meta-item.

Given a particular search string in the "Search Name/File Name/Path" text box 2206, and given the search area defined by the selection of either the "Name", "File Name", or "Path" radio buttons, generally referred to by the numeral 2224, selecting the "Search" user selectable operator 2208 will cause the list box 2204 to display only the items that match the search criteria. For instance, entering "comedy" in the search string, selecting the "Name" radio button, and selecting "Search" user selectable operator 2208 will cause only those items with the string "comedy" somewhere in the name to be displayed. Selecting the "View All" user selectable operator 2210 will negate the search feature and cause all items to be displayed again until the next search is performed.

"New" user selectable operator 2214 brings up the "New" interface for creating new rendering elements in the database. This interface is almost identical to the "View/Edit" rendering elements interface 2300, with the exception of the header, which reads "Create New Rendering Element". A default name and description is shown, and the file name window is initially empty. Attempting to save with the same name as an already existing rendering element is not allowed "View/Edit" user selectable operator 2212, "Delete" user selectable operator 2218 and "Add to Publish List" user selectable operator 2220 function in a manner similar to that described above for similar features on the UI components list interface 1600.

In one embodiment, on first viewing rendering elements list interface 2200, the top row in the list box 2204 is highlighted and "View/Edit" is the default double-click action. Scroll bars my only be visible if the list exceeds the size of the list box.

Figure 23:
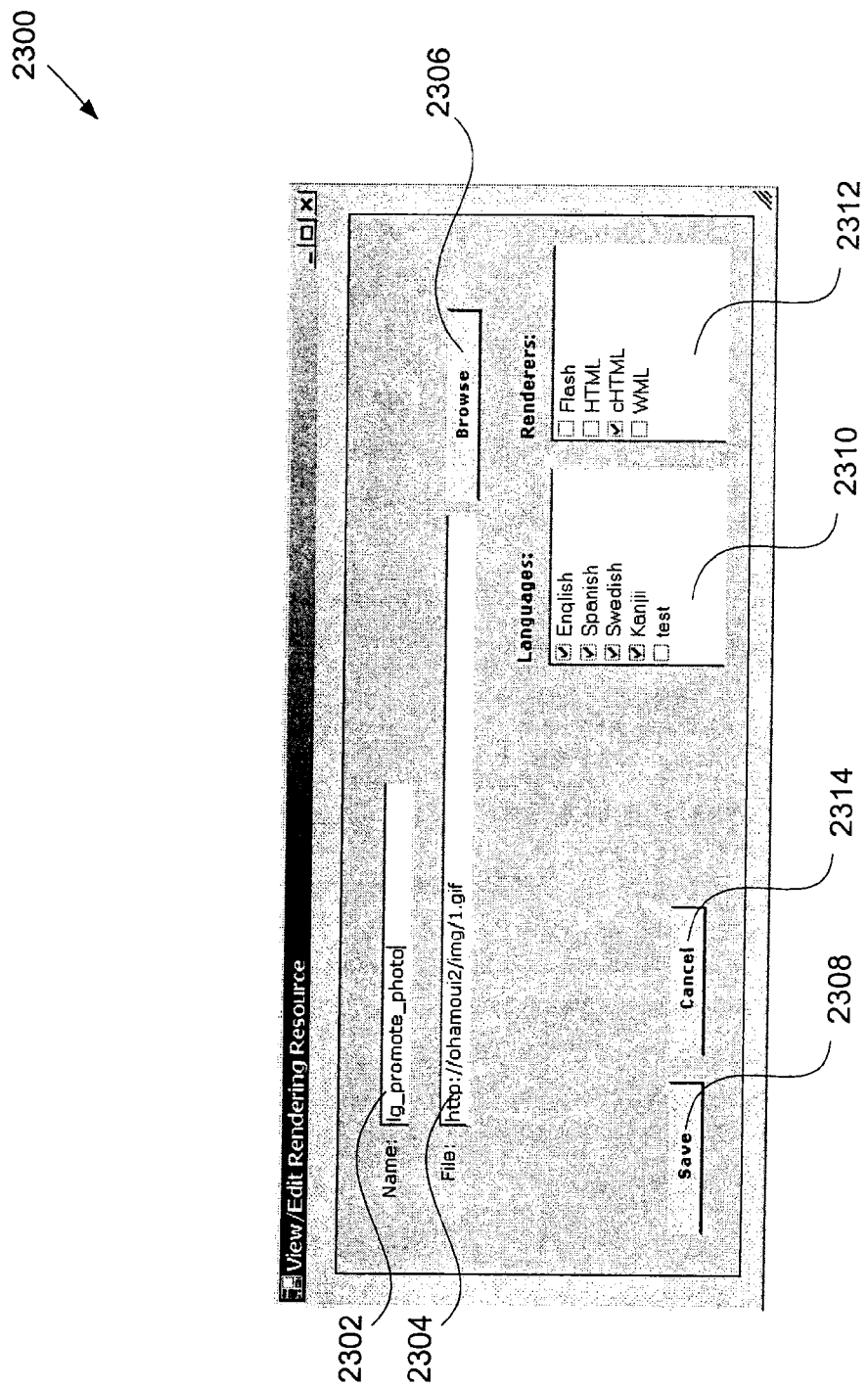
FIG. 23 shows an exemplary "View/Edit" rendering elements interface, according to embodiments of the present invention.

FIG. 23 shows an exemplary "View/Edit" rendering elements interface 2300. "View/Edit" rendering elements interface 2300 allows a user to view and edit detailed information in an individual rendering element. When saved, the rendering element is stored in the database as a link to a named file in the file table, along with any associated data, such as name, languages, etc.

"Name" text field 2302 allows a user to change the business name of the rendering element. When this interface is accessed by using the "New" user selectable operator 2214 from the rendering elements list interface 2200, this field allows the user to enter the name of a new rendering element.

"File" text field 2304 allows the user to enter the name of a file in the file table to associate with this rendering element. Alternatively, the user can use the "Browse" user selectable operator 2306 to browse the file system to find a physical file to associate with the rendering element. When selected, this physical file path is compared to the existing file table. If a match is found, that named file in the table is used, and the name appears in the "File" text field 2304. If no match is found, an entry in the file table is created automatically for the user, and that named entry appears in the "File" text field 2304 instead.

"Save" user selectable operator 2308 causes the tool to save the rendering element data to the database. If creating a new rendering element, the saving over an existing rendering element is not allowed. If editing an existing rendering element, and the rendering element's name has been changed, the tool launches a confirmation pop-up if attempting to save over an existing named rendering element. Otherwise, the save is performed automatically, the "View/Edit" rendering elements interface 2300 is closed, and a "rendering element Successfully Saved" message appears in a header of the rendering elements list interface 2200.

"Languages Checked" list box allows the user to set one or more languages that the rendering element will be used for during rendering. At least one language must be selected before saving. In one embodiment, because there can be more than one file associated with a named rendering element, there must not be a match between a checked language and checked renderer associated with one file in the file table, and a checked language and renderer associated with another file in the same named rendering element.

"Renderer Select" list box 2312 allows a user to set one or more renderers that the rendering element will be used for during rendering. At least one renderer must be selected before saving. In one embodiment, because there can be more than one file associated with a named rendering element, there must not be a match between a checked language and checked renderer associated with one file in the file table, and a checked language and renderer associated with another file in the same named rendering element.

"Cancel" user selectable operator 2314 closes the "View/Edit" rendering elements interface 2300 and returns the user to the rendering elements list interface 2200. Changes that may have been made in the "View/Edit" rendering elements interface 2300.

Figure 24:
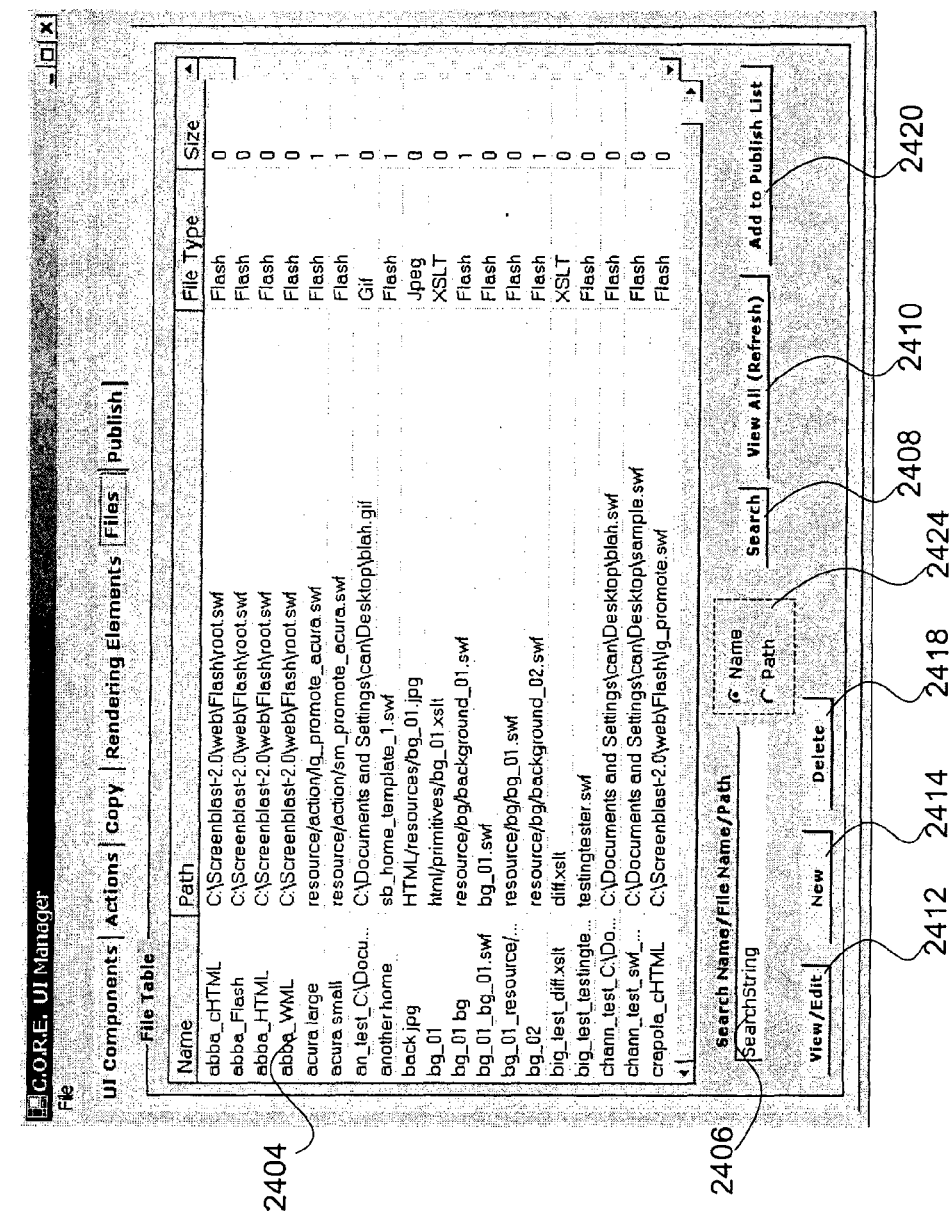
FIG. 24 shows an exemplary files list interface, according to embodiments of the present invention.

FIG. 24 shows an exemplary files list interface 2400. Files in the database file table are explicitly created by a user, for example a page developer, or automatically created during the creation or editing of page elements such as rendering elements or assets. Files comprise the elements of the system that reference actual physical files in, for example, a hard-disk based file system. Files contain the contextual information needed for other elements of the system to correctly reference physical files for activities such as the display of file-based images, flash animations, etc. within an IDML defined page.

The files list interface 2400 interface shows all of the files in a particular database, for example database 702, with links to editing interfaces, as well as giving the ability to add selected files to a publishing list. Search capabilities may be enabled in this interface as well.

List box 2404 displays all of the files in a particular database. Individual items are selected using a single-click or other suitable selection method. A shift-click allows the user to select a range of items, and a ctrl-click allows the selection of additional single items. Double-clicking an item brings up the "View/Edit" files interface 2500 (See FIG. 25) for that item. Items may be sorted by a particular header category by clicking on that category. Clicking again in a particular category causes the items to be sorted in reverse order.

Given a particular search string in "Search Name/File Name/Path" text box 2406, and given the search area defined by the selection of either the "Name" or "Path" radio buttons, generally referred to by the numeral 2224, selecting the "Search" user selectable operator 2408 will cause the list box 2404 to display only the items that match the search criteria. For instance, entering "comedy" in the search string, selecting the "Name" radio button, and selecting the "Search" user selectable operator 2408 will cause only those items with the string "comedy" somewhere in the name to be displayed. Selecting the "View All" user selectable operator 2410 will negate the search feature and cause all items to be displayed again until the next search is performed.

"New" user selectable operator 2414 brings up the "New" interface for creating new files in the database. This interface is almost identical to the "View/Edit" files interface 2500, with the exception of the header, which reads "Create New File". A default name is shown, and the file (path) window is initially empty. Attempting to save with the same name as an already existing file is not allowed.

"View/Edit" user selectable operator 2412, "Delete" user selectable operator 2418 and "Add to Publish List" user selectable operator 2420 function in a manner similar to that described above for similar features on the UI components list interface 1600.

In one embodiment, on first viewing files list interface 2400, the top row in the list box 2404 is highlighted and "View/Edit" is the default double-click action. Scroll bars my only be visible if the list exceeds the size of the list box.

Figure 25:
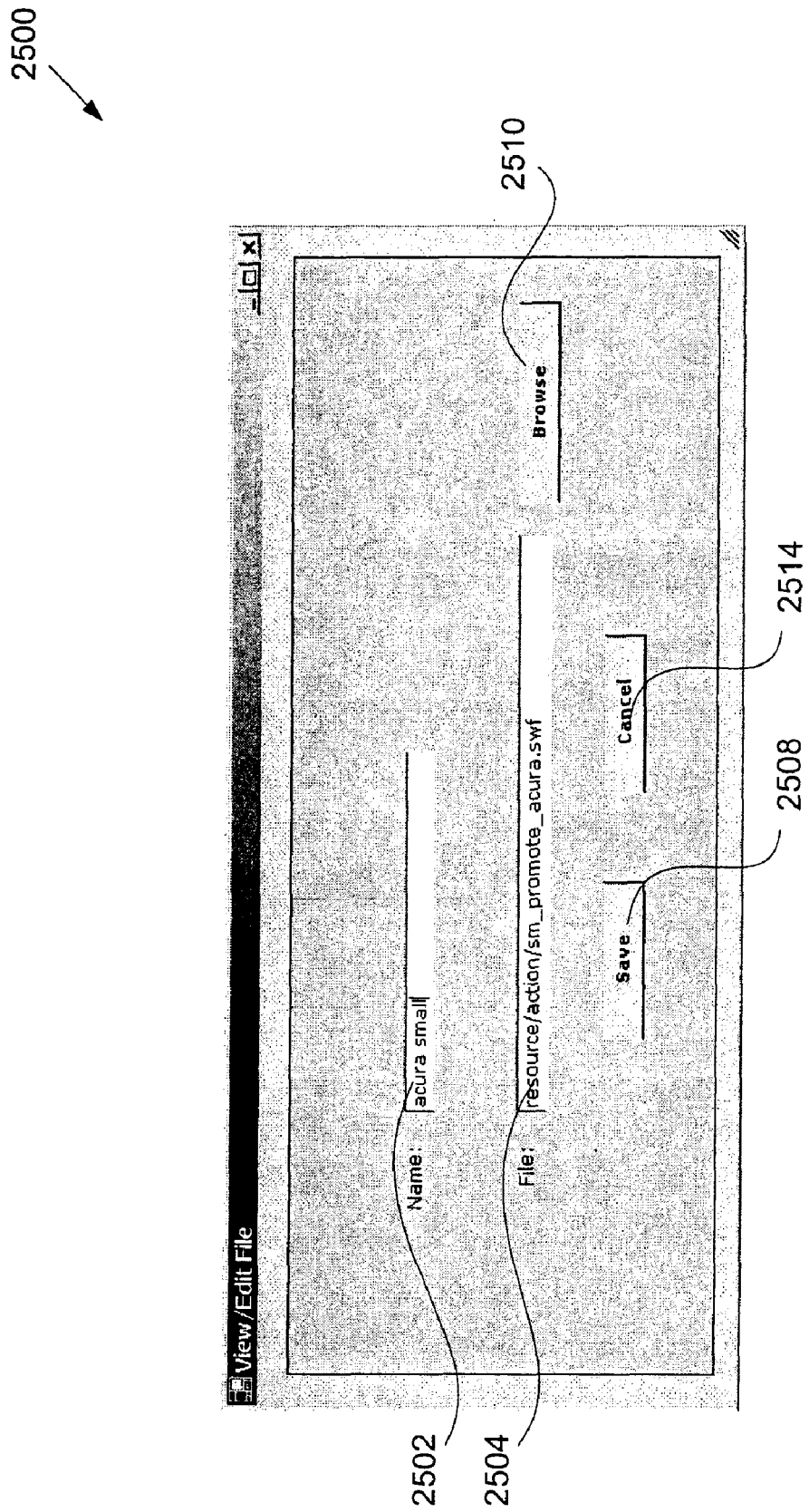
FIG. 25 shows an exemplary "View/Edit" files interface, according to embodiments of the present invention.

FIG. 25 shows an exemplary "View/Edit" files interface 2500. "View/Edit" files interface 2500 allows a user to view and edit detailed information in an individual file item. When saved, the file item is stored in the database as a path to a physical file, along with any associated data, such as name, languages, etc.

"Name" field 2502 allows the user to change the business name of the file item. When this interface is accessed by using the "New" user selectable operator from the files list interface 2400, this field allows the user to enter the name of a new file item.

"File" text field 2504 allows the user to explicitly enter the path of a physical file. Alternatively, the user can use the "Browse" user selectable operator 2510 to browse the file system to find a physical file.

"Save" user selectable operator 2508 causes the tool to save the file item data to the database. If creating a new file item, the saving over an existing file item is not allowed. If editing an existing file item, and the file item's name has been changed, the tool launches a confirmation pop-up if attempting to save over an existing named file item. Otherwise, the save is performed automatically, the "View/Edit" files interface 2500 is closed, and a "File Successfully Saved" message appears in the header of the files list interface 2400.

"Cancel" user selectable operator 2514 closes the "View/Edit" files interface 2500 and returns the user to the files list interface 2400. Changes that may have been made in the "View/Edit" files interface 2500.

Figure 26:
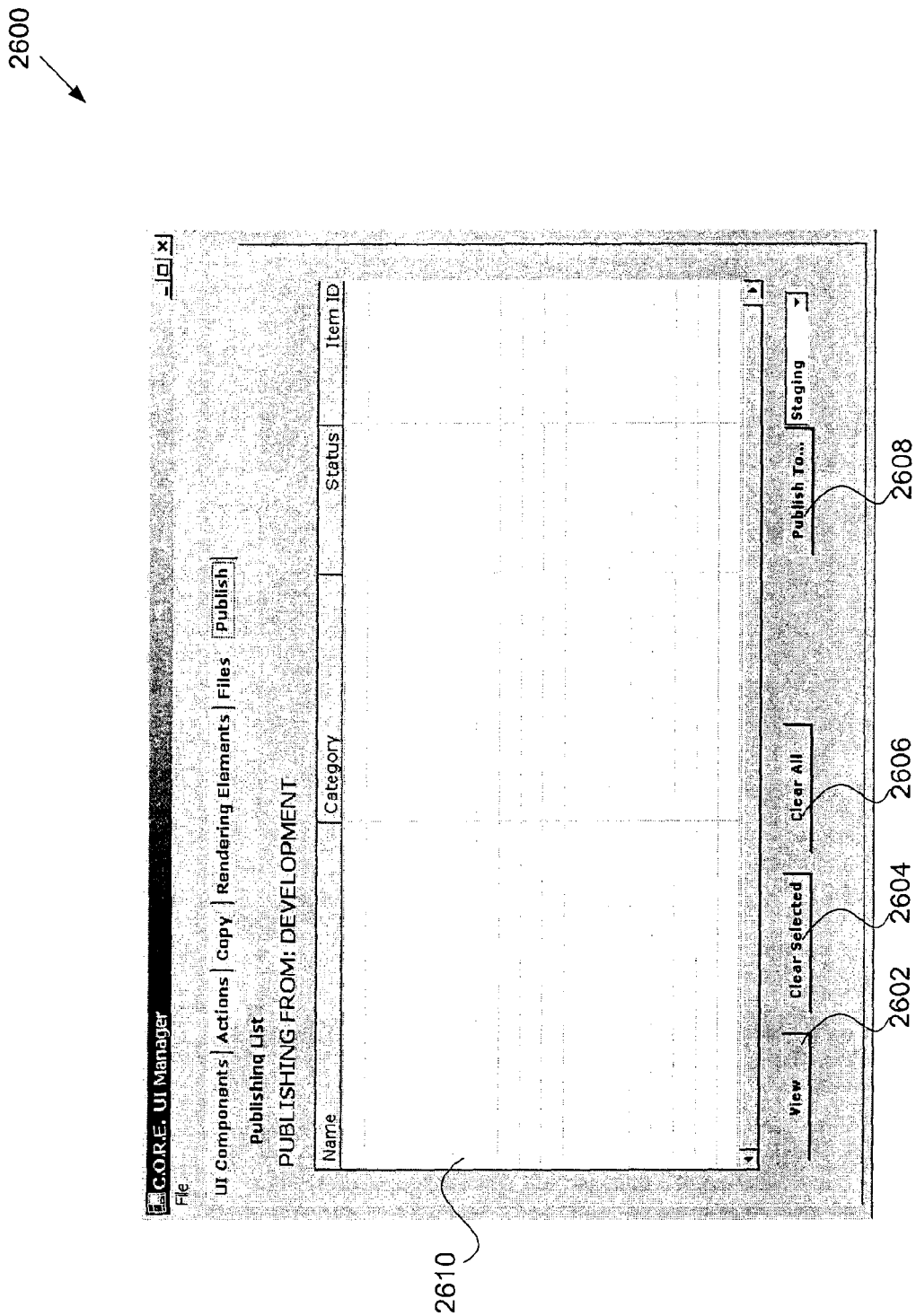
FIG. 26 shows an exemplary publishing list interface, according to embodiments of the present invention.

FIG. 26 shows an exemplary publishing list interface 2600. Publishing list interface 2600 serves as a sort of "shopping cart", and contains all of the items that have been added to the publishing list from other list interfaces described above, using the "Add to Publish List" user selectable operators. Once this list has been created to the tool user's satisfaction, the user can then use the "Publish To . . . " user selectable operator 2608 to move the listed items from the "Source" database and file system to the "Destination" database and file system. The "Destination" is selected from the drop-down list next to the "Publish To . . . " user selectable operator.

List box 2610 displays all of the items within the "Source" database that have been added to the "to be published" list. Individual items are selected using a single-click or other suitable selection method. A shift-click allows the user to select a range of items, and a ctrl-click allows the selection of additional single items. Double-clicking an item brings up the "View/Edit" interface for that item. Items may be sorted by a particular header column category by clicking on that category. Clicking again in a particular column category causes the items to be sorted in reverse order. This is not to be confused with the "Category" header in the list box 2610, which denotes the TYPE of each element within the list box 2610. Also note that the publication "Status" of a particular item is either "PENDING" or "ERROR". "PENDING" means that the item has yet to be published, whereas "ERROR" means that a prior attempt to publish the item was unsuccessful.

"View" user selectable operator 2602 brings up the "View/Edit" interface for the selected item in the list box. If no items, or multiple items are selected, this user selectable operator has no effect. Double-clicking an item in the list box 2610 has the same effect as clicking this user selectable operator.

"Clear Selected" user selectable operator 2604 removes all selected items from the list box 2610, effectively removing them from the "to be published" list. If no items are selected, this user selectable operator has no effect.

"Clear All" user selectable operator 2606 removes all items, whether selected or not, from the list box 2610, effectively removing them from the "to be published" list.

Figure 27:
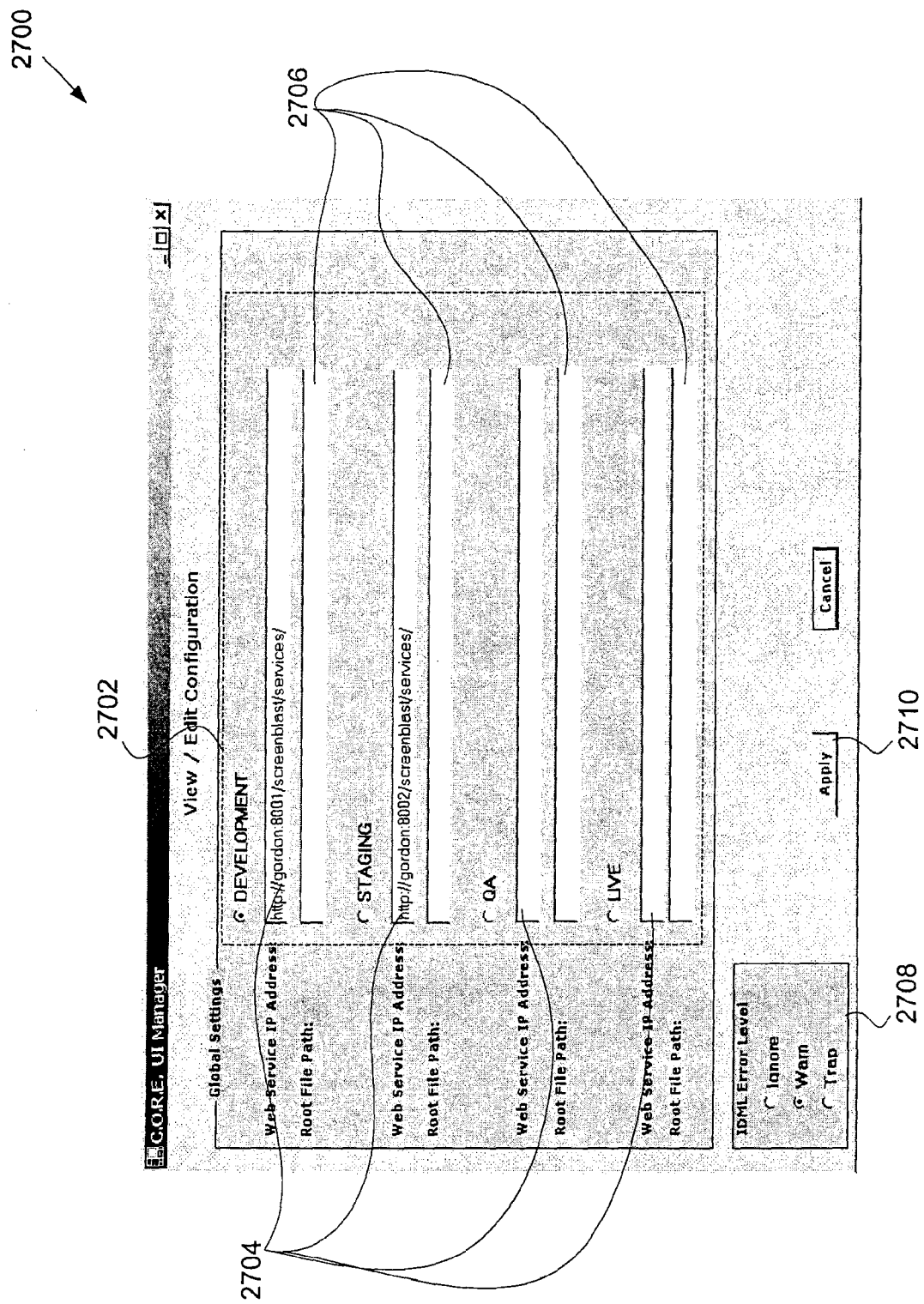
FIG. 27 shows an exemplary "View/Edit" file configuration interface, according to embodiments of the present invention.

FIG. 27 shows an exemplary "View/Edit" configuration interface 2700. This "View/Edit" configuration interface 2700 is opened by selecting "File/Configure" (not shown) from the files list interface 2400. It allows the user to set and save global system and file configuration data for the tool. This includes IP addresses for the various environments in the publishing pipeline, along with root file system paths that are used to create and manage relative path data for file objects within the database. Finally, the tool user can set the error checking level that is applied whenever an attempt is made to save a UI component or action to the database.

Selecting one of "Environment Selection" radio buttons ("Development", "Staging", "QA" and "Live"), generally referred to by the numeral 2702, allows the user to set the "active" or "source" environment for direct editing using the tool. Note that it is good practice to reserve most or all editing tasks for the Development environment, and only set the source environment to Staging or QA when the intent is to use the publishing elements of the tool to move data and files to the next stage in the pipeline. Potentially, in an "emergency fix" situation, one could edit in the Development database and directly publish to the Live environment.

"Web Service IP Address" text field 2704 allows a user to enter addresses that tell the tool where to find the instances of the system services for each stage in the publishing pipeline. Each instance of a server-side system database within the publishing pipeline is accessed by a unique instance of the backend "services". In one embodiment, these services are a set of SOAP-based APIs that allow the tool and other clients to communicate with the databases in a controlled and well defined fashion.

"Root File Path" text field 2706—For each stage in the publishing pipeline, a disk-based file system is also used to store physical files that are used by the system. Since relative paths are stored in the database file objects, the tool must know how and where to manipulate (move) physical files whenever items in the database are published that have associated physical files. Also, when creating new file-based items in the database, the path of the "active" or "source" environment is used as the root for the file search/select interface. When a file is actually selected, this root path is then stripped from the full path of the file to provide a relative path that is subsequently saved to the database.

"IDML Error Level" radio buttons, generally referred to by the numeral 2708, set the error-checking level that is applied when the user attempts to save a UI component or action to the database. "Ignore" allows the saving of IDML without any warnings or errors. "Warn" allows the user to know where and why IDML errors occurred, but allows the user to save anyway, should the user so choose. "Trap" works like the "Warn" setting, but will not allow the saving of IDML without the user first correcting the problems. When errors or warnings DO occur, a list of errors is shown, and the user can double-click or otherwise select any particular error to be taken to the relevant line of IDML within the editing interface.

"Apply" user selectable operator 2710 changes the settings to reflect any changes that the tool user has made within this interface. A configuration file is saved as well, so that the user's new settings will be enabled on startup of the next session.

"Cancel" user selectable operator closes the "View/Edit" file configuration interface 2700 and returns the user to the files list interface 2400. Changes that may have been made in the "View/Edit" file configuration interface 2700 are not saved.

It is to be understood that even though numerous characteristics and advantages of embodiments of the present invention have been set forth in the foregoing description, together with details of the structure and function of embodiments of the invention, this disclosure is illustrative only. Changes may be made in detail, especially matters of structure and management of parts within the principles of the present invention to the full extent indicated by the broad general meaning of the terms in which the appended claims are expressed.

For example, although embodiments of the invention's system and method have been described wherein particular components of the system are located on one of either the server-side or the client-side, these embodiments should not be considered as limiting, as particular components may be used on either the server-side or the client-side.

Furthermore, although embodiments of the present invention described relate to server systems using a stateless protocol, statefull protocols are also within the scope of the present invention. Thus, embodiments of the present invention might be used in conjunction with a shopping cart application to exchange, for example order and financial information. Statefull protocols may be implemented by, for example, augmenting the language defining the relatively abstract format, such as IDML, with the ability to execute procedural logic. More specifically, augmenting the language defining the relatively abstract format with the ability to handle programmatic elements such as, but not limited to, variable substitution, short-circuit logic, variable defined loops, branching, exception handling, function calling, lexical scoping, method invocations, and reference mechanisms to external pieces of code written in IDML or other language defining the relatively abstract format.

Besides augmenting the IDML or other language defining the relatively abstract format to handle the aforementioned programmatic elements, the system itself should be able to process this new augmented version of the language. This may require the inclusion of a parser and code generation mechanism that can handle the parsing of the new elements as well as the generation of executable code therefrom. An example of such parsing and code generation mechanism that may be used in the implementation is the JSP engine that is currently used in other aspects of current embodiments of the system and method for platform and language-independent delivery of page-based content. Once the executable code is generated, systems and methods according to embodiments of the present invention will then handle parameterizable programmatic elements that may contain statefull information. Embodiments of the present invention may contain a hybrid of stateless and statefull information.

In addition, although embodiments of the system and method for platform and language-independent delivery of page-based content has been described as being implemented by a page developer, embodiments of the present invention may be offered to average consumers in the form of a shrink-wrapped user-friendly product for implementing pages on, for example, personal or small business websites, or other pages, for example non-HTTP pages.

Also, embodiments of the present invention may be implemented wherein advertisements in the form of, for example, a SWF file enabled to communicate with a system as described above, would be provided to commercial or other users. The advertisement may "call back" to the system, for example on a periodic basis, to be updated. Thus, the advertisement would be syndicated from, for example, the system server to multiple clients. As an example, after the original advertisement has been provided to users, the advertisement may be modified to include a "Free shipping" announcement. The modification may be propagated by the advertisements "calling back" to the system. In other embodiments, an advertisement may be included on a compact disc ("CD") mailed to consumers. An application or other product distributed on the CD may then periodically and automatically update itself by contacting the system.

Furthermore, embodiments of the present invention may be implemented wherein a GUI builder translates into the relatively abstract format, for example IDML, instead of, for example, into an HTML file. For example, it is possible to build a WYSIWYG (What You See Is What You Get) GUI system to aid in the generation of IDML code. This system may allow users to manipulate graphical objects that are representations of IDML code. This will allow users not skilled in the generation of IDML to utilize the system effectively, hence reducing the need for IDML trained personnel to make use of the system.

Thus, a system and method for platform and language-independent delivery of page-based content has been described. Embodiments of the present invention provide a system and method for accepting content defined in a relatively abstract format and transforming the relatively abstract format input into a specific recognized platform format for a particular device or device category. Embodiments of the present invention further provide a system and process for creating, modifying and managing platform and language-independent pages, which can then be viewed and interacted with by end-users, the same pages being displayed on multiple platforms and in multiple languages. Embodiments of the present invention also provide a relatively abstract format for defining content in a data source. The relatively abstract format may be transformed into multiple platform formats in client-side applications' user interfaces in multiple human languages.

In one embodiment, a system and method for platform and language-independent delivery of page-based content implements a Model-View-Controller architecture comprising a plurality of servlet filters, a servlet pipeline and a plurality of rendering processors for client detection, client tracking, relatively abstract format preprocessing, relatively abstract format processing and validating, and transforming and rendering of the relatively abstract format into multiple platform formats in client-side applications' user interfaces in multiple human languages.

In another embodiment, a system and method for platform and language-independent delivery of page-based content implements a creation, modification and management tool that allows a page creator or publishing team to create, modify, and manage platform and language-independent page-based content. These pages can then be viewed and interacted with by end-users, with embodiments of the system and method for platform and language-independent delivery of page-based content being used to display the same pages on multiple platforms, and in multiple languages.

In yet another embodiment, a relatively abstract format in the form of an interface definition mark-up language ("IDML") is provided for defining content in a relatively abstract format to be transformed into multiple platform formats in client-side applications' user interfaces in multiple human languages. In one embodiment, IDML is a subset of eXtensible Mark-up Language ("XML") and may be fully compliant with all XML standards. IDML is used to define user interface elements within embodiments of the system and method for platform and language-independent delivery of page-based content. Keywords and rules are defined for IDML which allow a user to accurately specify a user interface to be rendered by a rendering group within the system for platform and language-independent delivery of page-based content.

Having disclosed exemplary embodiments and the best mode, modifications and variations may be made to the disclosed embodiments while remaining within the scope of the invention as defined by the following claims.

Appendix A a.  com.spde.ui.processors

Class IDMLActionProcessor java.lang.Object
  |
  +--com.spde.component.BaseComponent
        |
        +--com.spde.ui.processors.IDMLProcessorContainer
              |
              +--com.spde.ui.processors.IDMLActionProcessor

All Implemented Interfaces:
   IUIProcessor

--- public class IDMLActionProcessor
extends IDMLProcessorContainer

The IDML Action Processor parses IDML markup and returns back the valid IDML link used for action transitions from page to page (i.e. moving from one IDML page to the next, similar to a hyperlink). This processor essentially parses out a defined link location for an IDML Action markup piece.

Version:
   1.0
Author:
   Galvin Hsiu

---

| |
|---|
| DEBUG_LOGGING_PARAMETER, DEFAULT_UI_LOGGING_CATEGORY, ERROR_LOGGING_PARAMETER, INFO_LOGGING_PARAMETER, LOGGING_CATEGORY_PARAMETER, WARNING_LOGGING_PARAMETER |

| | |
|---|---|
| IDMLActionProcessor() | |

| | |
|---|---|
| com.spde.ui.processors.ProcessorResult | process(java.lang.String input_to_parse, com.spde.ui.IDMLRenderInfo render_info)<br>  Processed the IDML markup and looks for "link" markup tags to return back the appropriate action link used for page |

| | transitions. |
|---|---|

| |
|---|
| getProcessorProperties, process, setProcessorProperties, validate |

| |
|---|
| getLoggingDomain, logDebug, logDebug, logDebug, logError, logError, logError, logInfo, logInfo, logInfo, logWarning, logWarning, logWarning, setLoggingDomain |

| |
|---|
| clone, equals, finalize, getClass, hashCode, notify, notifyAll, toString, wait, wait, wait | i.    IDMLActionProcessor public IDMLActionProcessor()

ii.    process public com.spde.ui.processors.ProcessorResult process(java.lang.String input_to_parse,
                    com.spde.ui.IDMLRenderInfo render_info)

Processed the IDML markup and looks for "link" markup tags to return back the appropriate action link used for page transitions.

Specified by:
process in interface IUIProcessor

Specified by:
process in class IDMLProcessorContainer

Parameters:
input_to_parse - The input IDML markup to parse.
render_info - The client render information (i.e. such as language and renderer type)

Returns:
The payload results of the processing. If the action idml parser could not be created, the return value is null.

b.    com.spde.ui.processors
Class IDMLPreprocessor java.lang.Object
  |
 +--com.spde.component.BaseComponent
    |

+--com.spde.ui.processors.IDMLProcessorContainer
    |
    +--com.spde.ui.processors.IDMLPreprocessor

All Implemented Interfaces:
IUIProcessor

--- public class IDMLPreprocessor
extends IDMLProcessorContainer

The IDML Preprocessor parses IDML markup and does the following: 1) Recurse and resolve nested IDML references from the source. 2) Resolve primitive paths, copy text and rendering resource paths in the recursed IDML. This preprocessor is a fundamental step to transforming generic IDML source pages into linking with a client-specific rendered page.

Version:
1.0
Author:
Galvin Hsiu

| |
|---|
| DEBUG_LOGGING_PARAMETER, DEFAULT_UI_LOGGING_CATEGORY, ERROR_LOGGING_PARAMETER, INFO_LOGGING_PARAMETER, LOGGING_CATEGORY_PARAMETER, WARNING_LOGGING_PARAMETER |

| | |
|---|---|
| IDMLPreprocessor() | |

| | |
|---|---|
| com.spde.ui.processors.ProcessorResult | process(java.lang.String input_to_parse, com.spde.ui.IDMLRenderInfo render_info) Processes the IDML markup and performs 1) recursed IDML unraveling and 2) Resolution of primitive paths, copy text and rendering resource paths The output returned from this processing call is then contained in a processor result whose processed status is true. |

| |
|---|
| getProcessorProperties, process, setProcessorProperties, validate |

| |
|---|
| getLoggingDomain, logDebug, logDebug, logDebug, logError, logError, logError, logInfo, logInfo, logInfo, logWarning, logWarning, logWarning, setLoggingDomain |

| |
|---|
| clone, equals, finalize, getClass, hashCode, notify, notifyAll, toString, wait, wait, wait | i. IDMLPreprocessor public IDMLPreprocessor()

ii. process public com.spde.ui.processors.ProcessorResult process(java.lang.String input_to_parse,
　　　　　　　　com.spde.ui.IDMLRenderInfo render_info)

Processes the IDML markup and performs 1) recursed IDML unraveling and 2) Resolution of primitive paths, copy text and rendering resource paths The output returned from this processing call is then contained in a processor result whose processed status is true.

Specified by:
process in interface IUIProcessor
Specified by:
process in class IDMLProcessorContainer
Parameters:
input_to_parse - The input IDML markup to parse.
render_info - The client render information (i.e. such as language and renderer type)
Returns:
The payload results of the processing. If any errors occur in the creation of the parser handlers the return value will be null.

c. com.spde.ui.processors
Class IDMLProcessor java.lang.Object
　|
　+--com.spde.component.BaseComponent
　　　|
　　　+--com.spde.ui.processors.IDMLProcessorContainer
　　　　　|

+--com.spde.ui.processors.IDMLProcessor

All Implemented Interfaces:
IUIProcessor

--- public class IDMLProcessor
extends IDMLProcessorContainer

The IDML Processor parses IDML markup and resolves the dynamic content markup tags contained within the IDML. This is relevant when using JSP tags within the IDML. This processor is a fundamental to displaying dynamically generated pages filled with content.

Version:
1.0
Author:
Galvin Hsiu

| |
|---|
| DEBUG_LOGGING_PARAMETER, DEFAULT_UI_LOGGING_CATEGORY, ERROR_LOGGING_PARAMETER, INFO_LOGGING_PARAMETER, LOGGING_CATEGORY_PARAMETER, WARNING_LOGGING_PARAMETER |

| | |
|---|---|
| IDMLProcessor() | |

| | |
|---|---|
| com.spde.ui.processors.ProcessorResult | process(java.lang.String input_to_parse, com.spde.ui.IDMLRenderInfo render_info) Processes the IDML markup and resolves dynamic JSP tag references (i.e. |

| |
|---|
| getProcessorProperties, process, setProcessorProperties, validate |

| |
|---|
| getLoggingDomain, logDebug, logDebug, logDebug, logError, logError, logError, logInfo, logInfo, logInfo, logWarning, logWarning, logWarning, setLoggingDomain | clone, equals, finalize, getClass, hashCode, notify, notifyAll, toString, wait, wait, wait i. IDMLProcessor public IDMLProcessor()

ii. process public com.spde.ui.processors.ProcessorResult process(java.lang.String input_to_parse,
                com.spde.ui.IDMLRenderInfo render_info)

Processes the IDML markup and resolves dynamic JSP tag references (i.e. blocks of code) with its corresponding content. The output returned from this processing call is then contained in a processor result whose processed status is true.

Specified by:
process in interface IUIProcessor

Specified by:
process in class IDMLProcessorContainer

Parameters:
input_to_parse - The input IDML markup to parse.
render_info - The client render information (i.e. such as language and renderer type)

Returns:
The payload results of the processing. If any errors occur in the creation of the parser handlers the return value will be null.

d.      com.spde.ui.processors
Class IDMLReferenceProcessor

```
java.lang.Object
  |
  +--com.spde.component.BaseComponent
      |
      +--com.spde.ui.processors.IDMLProcessorContainer
          |
          +--com.spde.ui.processors.IDMLReferenceProcessor
```

All Implemented Interfaces:
    IUIProcessor public class IDMLReferenceProcessor
extends IDMLProcessorContainer The IDML Reference processor parses IDML markup and recurses / resolves nested IDML references from the source IDML document. The end output should be a fully recursed IDML document without any references to other UI pieces of IDML.

Version:
   1.0
Author:
   Galvin Hsiu

| DEBUG_LOGGING_PARAMETER, DEFAULT_UI_LOGGING_CATEGORY, ERROR_LOGGING_PARAMETER, INFO_LOGGING_PARAMETER, LOGGING_CATEGORY_PARAMETER, WARNING_LOGGING_PARAMETER |
|---|

| IDMLReferenceProcessor() | |
|---|---|

| com.spde.ui.processors.ProcessorResult | process(java.lang.String input_to_parse, com.spde.ui.IDMLRenderInfo render_info) Processes the IDML markup and resolves referenced IDML with its corresponding content. |
|---|---|

| getProcessorProperties, process, setProcessorProperties, validate |
|---|

| getLoggingDomain, logDebug, logDebug, logDebug, logError, logError, logError, logInfo, logInfo, logInfo, logWarning, logWarning, logWarning, setLoggingDomain |
|---|

| clone, equals, finalize, getClass, hashCode, notify, notifyAll, toString, wait, wait, wait |
|---| i. IDMLReferenceProcessor public IDMLReferenceProcessor()

ii. process public com.spde.ui.processors.ProcessorResult process(java.lang.String input_to_parse,
 com.spde.ui.IDMLRenderInfo render_info)

Processes the IDML markup and resolves referenced IDML with its corresponding content. The output returned from this processing call is then contained in a processor result whose processed status is true.

Specified by:
process in interface IUIProcessor

Specified by:
process in class IDMLProcessorContainer

Parameters:
input_to_parse - The input IDML markup to parse.
render_info - The client render information (i.e. such as language and renderer type)

Returns:
The payload results of the processing. If any errors occur in the creation of the parser handlers the return value will be null.

e. com.spde.ui.processors

Class IDMLXSLTProcessor java.lang.Object
 |
 +--com.spde.component.BaseComponent
    |
    +--com.spde.ui.processors.IDMLProcessorContainer
       |
       +--com.spde.ui.processors.IDMLXSLTProcessor

All Implemented Interfaces:
 IUIProcessor

--- public class IDMLXSLTProcessor
extends IDMLProcessorContainer

The IDML XSLT processor parses IDML markup and transforms the IDML input into a client specific markup language based on the supplied renderer type. The handler of this processor generates an XSLT stylesheet when applied to the input renders the valid HTML. This xslt processor is the bridge for bringing the IDML to a client specific markup language such as HTML or WAP.

Version:
 1.0
Author:

Galvin Hsiu

| static java.lang.String | DEFAULT_TRANSFORM_ENCODING |

| DEBUG_LOGGING_PARAMETER, DEFAULT_UI_LOGGING_CATEGORY, ERROR_LOGGING_PARAMETER, INFO_LOGGING_PARAMETER, LOGGING_CATEGORY_PARAMETER, WARNING_LOGGING_PARAMETER |

| IDMLXSLTProcessor(java.util.Properties processor_properties) |

| com.spde.ui.processors.ProcessorResult | process(java.lang.String input_to_parse, com.spde.ui.IDMLRenderInfo render_info)<br>Processes the IDML markup and transform the IDML markup to the corresponding rendering target type, such as HTML or WAP. |

| getProcessorProperties, process, setProcessorProperties, validate |

| getLoggingDomain, logDebug, logDebug, logDebug, logError, logError, logError, logInfo, logInfo, logInfo, logWarning, logWarning, logWarning, setLoggingDomain |

| clone, equals, finalize, getClass, hashCode, notify, notifyAll, toString, wait, wait, wait | i. DEFAULT_TRANSFORM_ENCODING public static final java.lang.String DEFAULT_TRANSFORM_ENCODING

See Also:
    Constant Field Values ii.    IDMLXSLTProcessor public IDMLXSLTProcessor(java.util.Properties processor_properties)

iii.    process public com.spde.ui.processors.ProcessorResult process(java.lang.String input_to_parse,
                          com.spde.ui.IDMLRenderInfo render_info)

Processes the IDML markup and transform the IDML markup to the corresponding rendering target type, such as HTML or WAP. Ideally, the transformation templates should be cached. The output returned from this processing call is then contained in a processor result whose processed status is true.

Specified by:
process in interface IUIProcessor

Specified by:
process in class IDMLProcessorContainer

Parameters:
input_to_parse - The input IDML markup to parse.
render_info - The client render information (i.e. such as language and renderer type)

Returns:
The payload results of the processing. If any errors occur in the creation of the parser handlers the return value will be null.

Appendix B

Valid IO / Expected Behavior for IDMLActionProcessor

Tags involved: <link target="url"></link>

Function call: process() – valid output returns back a UI link (index.idml)

- Case #1: Valid Input with well formed XML IDML string with link tag
    - Input:
        - A well formed XML IDML string with a link tag present
    - Output:
        - A ProcessorResult with error_status = false
        - A ProcessorResult with processed data string is not empty

- Case #2: Valid Input with well formed XML IDML string without link tag
    - Input:
        - A well formed XML IDML string without a link tag present
    - Output:
        - A ProcessorResult with error_status = false
        - A ProcessorResult with processed data string is empty

- Case #3: Valid Input with well formed XML string
    - Input:
        A well formed XML IDML string without a link tag present
    - Output:
        - A ProcessorResult with error_status = false
        - A ProcessorResult with processed data string is empty

- Case #4: Valid Input with non-well formed XML string with/without a link tag present
    - Input:
        A non-well formed XML IDML string with or without a link tag present
    - Output:
        - A ProcessorResult with error_status = true
        - A ProcessorResult with processed data string is empty Function call: validate() – valid output returns true

- Case #1: Valid Input with well formed XML IDML string
    - Input:
        - A well formed XML IDML string
    - Output:
        - Validate() function return true

- Case #2: Valid Input with non-well formed XML string or non-well formed IDML XML
    - Input:
        - A non-well formed XML IDML string or non-well formed IDML XML
    - Output:
        - Validate() function returns false

Appendix C

Valid IO / Expected Behavior for IDMLPreProcessor

Function call: process() – valid output returns back a recursed and processed IDML Tags involved:  <resource name="x"></resource>
<primitive name="x"></primitive>
<collection name="x"></collection>
<text name="x"></text>
<idml>
<ui>

- Case #1: Valid Input with well formed XML IDML string
    - Input:
        - A well formed XML IDML string
    - Output:
        - A ProcessorResult with error_status = false
        - A ProcessorResult with processed data string is not empty (recursed and preprocessed IDML with relevant paths)

- Case #2: Valid Input with well formed XML string
    - Input:
        A well formed XML IDML string
    - Output:
        - A ProcessorResult with error_status = false
        - A ProcessorResult with processed data string is empty

- Case #3: Valid Input with non-well formed XML string
    - Input:
        A non-well formed XML IDML string
    - Output:
        - A ProcessorResult with error_status = true
        - A ProcessorResult with processed data string is empty Function call: validate() – valid output returns true

- Case #1: Valid Input with well formed XML IDML string
    - Input:
        - A well formed XML IDML string
    - Output:
        - Validate() function return true

- Case #2: Valid Input with non-well formed XML string or non-well formed IDML XML
    - Input:
        - A non-well formed XML IDML string or non-well formed IDML XML
    - Output:
        - Validate() function returns false

Appendix D

Valid IO / Expected Behavior for IDMLReferenceProcessor

Function call: process() – valid output returns back a recursed IDML

Tags involved:    <primitive name="x"></primitive>
<collection name="x"></collection>
<idml>
<ui>

- Case #1: Valid Input with well formed XML IDML string
  - Input:
    - A well formed XML IDML string
  - Output:
    - A ProcessorResult with error_status = false
    - A ProcessorResult with processed data string is not empty (recursed IDML)

- Case #2: Valid Input with well formed XML string
  - Input:
    A well formed XML IDML string
  - Output:
    - A ProcessorResult with error_status = false
    - A ProcessorResult with processed data string is empty

- Case #3: Valid Input with non-well formed XML string
  - Input:
    A non-well formed XML IDML string
  - Output:
    - A ProcessorResult with error_status = true
    - A ProcessorResult with processed data string is empty Function call: validate() – valid output returns true

- Case #1: Valid Input with well formed XML IDML string
  - Input:
    - A well formed XML IDML string
  - Output:
    - Validate() function return true

- Case #2: Valid Input with non-well formed XML string or non-well formed IDML XML
  - Input:
    - A non-well formed XML IDML string or non-well formed IDML XML
  - Output:
    - Validate() function returns false

Appendix E

Valid IO / Expected Behavior for IDMLProcessor

Function call: process() – valid output returns back IDML with embedded JSP tags Tags involved: <scriptlet name="x"></scriptlet >

- Case #1: Valid Input with well formed XML IDML string
    - Input:
        - A well formed XML IDML string
    - Output:
        - A ProcessorResult with error_status = false
        - A ProcessorResult with processed data string is not empty (IDML with JSP tags)

- Case #2: Valid Input with well formed XML string
    - Input:
        A well formed XML IDML string
    - Output:
        - A ProcessorResult with error_status = false
        - A ProcessorResult with processed data string is empty

- Case #3: Valid Input with non-well formed XML string
    - Input:
        A non-well formed XML IDML string
    - Output:
        - A ProcessorResult with error_status = true
        - A ProcessorResult with processed data string is empty Function call: validate() – valid output returns true

- Case #1: Valid Input with well formed XML IDML string
    - Input:
        - A well formed XML IDML string
    - Output:
        - Validate() function return true

- Case #2: Valid Input with non-well formed XML string or non-well formed IDML XML
    - Input:
        - A non-well formed XML IDML string or non-well formed IDML XML
    - Output:
        - Validate() function returns false

Appendix F

Valid IO / Expected Behavior for IDMLXSLTProcessor

Function call: process() – valid output returns back client markup language via XSLT transformation Tags involved: <primitive name="x"></primitive>
                      <collection name="x"></collection>

- Case #1: Valid Input with well formed XML IDML string
  - Input:
    - A well formed XML IDML string
  - Output:
    - A ProcessorResult with error_status = false
    - A ProcessorResult with processed data string is not empty (client-side markup)

- Case #2: Valid Input with well formed XML string
  - Input:
    A well formed XML IDML string
  - Output:
    - A ProcessorResult with error_status = false
    - A ProcessorResult with processed data string is empty

- Case #3: Valid Input with non-well formed XML string
  - Input:
    A non-well formed XML IDML string
  - Output:
    - A ProcessorResult with error_status = true
    - A ProcessorResult with processed data string is empty Function call: validate() – valid output returns true

- Case #1: Valid Input with well formed XML IDML string
  - Input:
    - A well formed XML IDML string
  - Output:
    - Validate() function return true

- Case #2: Valid Input with non-well formed XML string or non-well formed IDML XML
  - Input:
    - A non-well formed XML IDML string or non-well formed IDML XML
  - Output:
    - Validate() function returns false

Appendix G f.   com.spde.ejb
Class CountryManagerEJB java.lang.Object
 |
 +--com.spde.ejb.base.SessionEJB
    |
    +--com.spde.ejb.base.BaseManager
       |
       +--com.spde.ejb.CountryManagerEJB

All Implemented Interfaces:
 javax.ejb.EnterpriseBean, IManager, java.io.Serializable, javax.ejb.SessionBean

--- public abstract class CountryManagerEJB
extends BaseManager
implements javax.ejb.SessionBean The Country Manager EJB interface is responsible for managing countries used by the Platform Services runtime. Specifically, the country manager can create, remove, retrieve, query and update countries within the data service layer.

Version:
 1.0
Author:
 Galvin Hsiu
See Also:
 Serialized Form

| |
|---|
| CountryManagerEJB() |

| | |
|---|---|
| com.spde.dsl.dbo.Country | createItem(com.spde.dsl.dbo.Country new_country) Creates a new country item in the data service layer if and only if the name of the country is valid. |
| void | ejbActivate() |
| void | ejbPassivate() |
| void | ejbRemove() |
| com.spde.dsl.dbo.Country | findItemByCode(java.lang.String country_code) Query and retrieve an existing country item in the |

| | |
|---|---|
| | data service layer given a country code. |
| com.spde.dsl.dbo.Country | findItemByName(java.lang.String country_name)<br>    Query and retrieve an existing country item in the data service layer given a country name. |
| com.spde.dsl.dbo.Country[] | getAllItems()<br>    Retrieve all country items in the data service layer. |
| com.spde.dsl.dbo.Country | getItem(java.lang.Integer country_id)<br>    Retrieves an existing country item in the data service layer given a country identifier. |
| void | removeItem(com.spde.dsl.dbo.Country remove_country)<br>    Removes an existing country item in the data service layer if and only if the country is valid. |
| void | setSessionContext(javax.ejb.SessionContext ctx) |
| com.spde.dsl.dbo.Country | updateItem(com.spde.dsl.dbo.Country update_country)<br>    Updates an existing country item in the data service layer if and only if the country is valid. | beginTransaction, commit, createItem, getItems, getItems, getObjectQuery, removeItem, rollback, saveItem, updateItem getPersistenceManager, getSessionContext, initLoggingDomain, logDebug, logDebug, logDebug, logError, logError, logError, logInfo, logInfo, logInfo, logWarning, logWarning, logWarning clone, equals, finalize, getClass, hashCode, notify, notifyAll, toString, wait, wait, wait i.    CountryManagerEJB public CountryManagerEJB()

ii.    createItem public com.spde.dsl.dbo.Country createItem(com.spde.dsl.dbo.Country new_country)
    Creates a new country item in the data service layer if and only if the name of the country is valid.
    Parameters:
    new_country - The target country to create and process..

Returns:
The new country item. If creation is unsuccessful, return value is null.

---
iii. updateItem public com.spde.dsl.dbo.Country updateItem(com.spde.dsl.dbo.Country update_country)

Updates an existing country item in the data service layer if and only if the country is valid.

Parameters:
update_country - The target country to update, it must have a valid identifier.

Returns:
The updated country item. If updation is unsuccessful, return value is null.

---
iv. removeItem public void removeItem(com.spde.dsl.dbo.Country remove_country)

Removes an existing country item in the data service layer if and only if the country is valid.

Parameters:
remove_country - The target country to remove, it must have a valid identifier.

---
v. getItem public com.spde.dsl.dbo.Country getItem(java.lang.Integer country_id)

Retrieves an existing country item in the data service layer given a country identifier.

Parameters:
country_id - The identifier for the specific country to retrieve.

Returns:
The country if found. If not, the return value is null.

---
vi. findItemByName public com.spde.dsl.dbo.Country findItemByName(java.lang.String country_name)

Query and retrieve an existing country item in the data service layer given a country name.

Parameters:
country_name - The name for the specific country to retrieve.

Returns:
The country if found. If not, the return value is null.

---
vii. findItemByCode public com.spde.dsl.dbo.Country findItemByCode(java.lang.String country_code)

Query and retrieve an existing country item in the data service layer given a country code.

Parameters:
country_code - The specified country code for the country to retrieve.

Returns:

The country if found. If not, the return value is null.

--- viii. getAllItems public com.spde.dsl.dbo.Country[] getAllItems()
Retrieve all country items in the data service layer.
Returns:
All the countries in the data service layer. If no countries are found, the return value will be null.

--- ix. ejbActivate public void ejbActivate()
   Specified by:
   ejbActivate in interface javax.ejb.SessionBean

--- x. ejbPassivate public void ejbPassivate()
   Specified by:
   ejbPassivate in interface javax.ejb.SessionBean

--- xi. setSessionContext public void setSessionContext(javax.ejb.SessionContext ctx)
   Specified by:
   setSessionContext in interface javax.ejb.SessionBean
   Overrides:
   setSessionContext in class SessionEJB

--- xii. ejbRemove public void ejbRemove()
   Specified by:
   ejbRemove in interface javax.ejb.SessionBean

--- g. com.spde.ejb
Class FileManagerEJB java.lang.Object
 |
 +--com.spde.ejb.base.SessionEJB
     |
     +--com.spde.ejb.base.BaseManager
         |
         +--com.spde.ejb.FileManagerEJB

All Implemented Interfaces:
   javax.ejb.EnterpriseBean, IManager, java.io.Serializable, javax.ejb.SessionBean public abstract class FileManagerEJB
extends BaseManager
implements javax.ejb.SessionBean The File Manager EJB interface is responsible for managing files used by the Platform Services runtime. Specifically, the file manager can create, remove, retrieve, query and update soft file references (with pointers to the actual file content) within the data service layer.

Version:
    1.0
Author:
    Galvin Hsiu
See Also:
    Serialized Form

| | |
|---|---|
| FileManagerEJB() | |

| | |
|---|---|
| com.spde.dsl.dbo.File | createItem(com.spde.dsl.dbo.File new_File)<br>Creates a new file item if and only if the file path is valid. |
| void | ejbActivate() |
| void | ejbPassivate() |
| void | ejbRemove() |
| com.spde.dsl.dbo.File[] | findItemByName(java.lang.String File_name)<br>Query and retrieve existing file items in the data service layer given a filename. |
| com.spde.dsl.dbo.File | findItemByNameAndPath(java.lang.String File_name, java.lang.String File_path)<br>Query and retrieve an existing file item in the data service layer given a unique pairing of a filename and a filepath. |
| com.spde.dsl.dbo.File[] | findItemByPath(java.lang.String File_path)<br>Query and retrieve existing file items in the data service layer given a filepath. |
| com.spde.dsl.dbo.File[] | findItemByType(com.spde.dsl.dbo.FileType File_type)<br>Query and retrieve existing file items in the data service layer given a valid and registered file type. |
| com.spde.dsl.dbo.File[] | getAllItems() |

| | Retrieve all file items in the data service layer. |
|---|---|
| protected com.spde.dsl.dbo.FileType | getFileTypeItem(java.lang.Integer FileType_id) |
| com.spde.dsl.dbo.File | getItem(java.lang.Integer File_id)<br>Retrieves an existing file item in the data service layer given a file identifier. |
| void | removeItem(com.spde.dsl.dbo.File remove_File)<br>Removes an existing file item if and only if the file identifier is valid. |
| void | setSessionContext(javax.ejb.SessionContext ctx) |
| com.spde.dsl.dbo.File | updateItem(com.spde.dsl.dbo.File existing_File)<br>Updates an existing file item if and only if the file identifier is valid. | beginTransaction, commit, createItem, getItems, getItems, getObjectQuery, removeItem, rollback, saveItem, updateItem getPersistenceManager, getSessionContext, initLoggingDomain, logDebug, logDebug, logDebug, logError, logError, logError, logInfo, logInfo, logInfo, logWarning, logWarning, logWarning clone, equals, finalize, getClass, hashCode, notify, notifyAll, toString, wait, wait, wait i.    FileManagerEJB public FileManagerEJB()

ii.    createItem public com.spde.dsl.dbo.File createItem(com.spde.dsl.dbo.File new_File)
Creates a new file item if and only if the file path is valid.
Parameters:
new_File - The target file to create and process.
Returns:
The newly created file item. If unsuccessful, the return value is null.

iii. updateItem public com.spde.dsl.dbo.File updateItem(com.spde.dsl.dbo.File existing_File)
Updates an existing file item if and only if the file identifier is valid.
Returns:
The updated file item. If unsuccessful, the return value is null.

--- iv. removeItem public void removeItem(com.spde.dsl.dbo.File remove_File)
Removes an existing file item if and only if the file identifier is valid.

--- v. getItem public com.spde.dsl.dbo.File getItem(java.lang.Integer File_id)
Retrieves an existing file item in the data service layer given a file identifier.
Parameters:
File_id - The identifier for the specific file to retrieve.
Returns:
The file if found. If not, the return value is null.

--- vi. findItemByNameAndPath public com.spde.dsl.dbo.File findItemByNameAndPath(java.lang.String File_name,
                               java.lang.String File_path)
Query and retrieve an existing file item in the data service layer given a unique pairing of a filename and a filepath.
Parameters:
File_name - The filename for the specific file to retrieve.
File_path - The file reference (path) for the specific file content to retrieve.
Returns:
The retrieved file if found. If unsuccessful, the return value is null.

--- vii. findItemByName public com.spde.dsl.dbo.File[] findItemByName(java.lang.String File_name)
Query and retrieve existing file items in the data service layer given a filename.
Parameters:
File_name - The filename for the specific file to retrieve.
Returns:
The retrieved file(s) if found. If unsuccessful, the return value is null.

--- viii. findItemByPath public com.spde.dsl.dbo.File[] findItemByPath(java.lang.String File_path)
Query and retrieve existing file items in the data service layer given a filepath.
Parameters:
File_path - The filepath for the specific file to retrieve.

Returns:
The retrieved file(s) if found. If unsuccessful, the return value is null.

ix. findItemByType public com.spde.dsl.dbo.File[] findItemByType(com.spde.dsl.dbo.FileType File_type)
Query and retrieve existing file items in the data service layer given a valid and registered file type.
Parameters:
File_type - A valid file type present in the data service layer.
Returns:
The retrieved file(s) if found. If unsuccessful, the return value is null.

x. getAllItems public com.spde.dsl.dbo.File[] getAllItems()
Retrieve all file items in the data service layer.
Returns:
All the files in the data service layer. If no files are found, the return value will be null.

xi. ejbActivate public void ejbActivate()
    Specified by:
    ejbActivate in interface javax.ejb.SessionBean xii. ejbPassivate public void ejbPassivate()
    Specified by:
    ejbPassivate in interface javax.ejb.SessionBean xiii. setSessionContext public void setSessionContext(javax.ejb.SessionContext ctx)
    Specified by:
    setSessionContext in interface javax.ejb.SessionBean
    Overrides:
    setSessionContext in class SessionEJB xiv. ejbRemove public void ejbRemove()
    Specified by:
    ejbRemove in interface javax.ejb.SessionBean xv. getFileTypeItem protected com.spde.dsl.dbo.FileType getFileTypeItem(java.lang.Integer FileType_id)

Author:
    Galvin Hsiu
See Also:
    Serialized Form

| | |
|---|---|
| FileTypeManagerEJB() | |

| | |
|---|---|
| com.spde.dsl.dbo.FileType | addFileExtension(com.spde.dsl.dbo.FileType file_type, java.lang.String file_extension)<br>    Adds a file extension to a registered file type. |
| com.spde.dsl.dbo.FileType | addFileExtensions(com.spde.dsl.dbo.FileType file_type, java.lang.String[] file_extension)<br>    Add multiple file extensions to a registered file type. |
| com.spde.dsl.dbo.FileType | createItem(com.spde.dsl.dbo.FileType new_FileType)<br>    Creates a new file type item given a registered file type name and extension. |
| void | ejbActivate() |
| void | ejbPassivate() |
| void | ejbRemove() |
| com.spde.dsl.dbo.FileType | findItemByName(java.lang.String FileType_name)<br>    Retrieves an existing file type item given a unique file type name. |
| com.spde.dsl.dbo.FileType[] | findItemsByFileExtension(java.lang.String File_Extension)<br>    Retrieves an existing file type items given a unique file extension. |
| com.spde.dsl.dbo.FileType[] | getAllItems()<br>    Retrieves all existing items from the data service layer. |
| protected com.spde.dsl.dbo.FileExtension | getFileExtensionItem(java.lang.Integer FileExtension_id) |
| com.spde.dsl.dbo.FileExtension[] | getFileExtensions(com.spde.dsl.dbo.FileType file_type)<br>    Retrieves all file extensions of a given registered file type. |
| com.spde.dsl.dbo.FileType | getItem(java.lang.Integer FileType_id)<br>    Retrieves an existing file type item given a |

|  |  |
|---|---|
|  | file type identifier. |
| com.spde.dsl.dbo.FileType | removeFileExtension(com.spde.dsl.dbo.FileType file_type, java.lang.String file_extension)<br>    Removes a file extension for a given registered file type. |
| com.spde.dsl.dbo.FileType | removeFileExtensions(com.spde.dsl.dbo.FileType file_type, java.lang.String[] file_extension)<br>    Removes multiple file extensions for a given registered file type. |
| void | removeItem(com.spde.dsl.dbo.FileType remove_FileType)<br>    Removes an existing file type item given a registered file type. |
| void | setSessionContext(javax.ejb.SessionContext ctx) |
| protected com.spde.dsl.dbo.FileExtension[] | updateFileExtension(com.spde.dsl.dbo.FileExtension[] old_fileextension, com.spde.dsl.dbo.FileExtension[] new_fileextension) |
| com.spde.dsl.dbo.FileType | updateItem(com.spde.dsl.dbo.FileType existing_FileType)<br>    Updates an existing file type item given a registered file type. | beginTransaction, commit, createItem, getItems, getItems, getObjectQuery, removeItem, rollback, saveItem, updateItem getPersistenceManager, getSessionContext, initLoggingDomain, logDebug, logDebug, logDebug, logError, logError, logError, logInfo, logInfo, logInfo, logWarning, logWarning, logWarning clone, equals, finalize, getClass, hashCode, notify, notifyAll, toString, wait, wait, wait xvi.    FileTypeManagerEJB public FileTypeManagerEJB()

xvii.    createItem public com.spde.dsl.dbo.FileType createItem(com.spde.dsl.dbo.FileType new_FileType)
    Creates a new file type item given a registered file type name and extension.

Parameters:
new_FileType - The target file type to create and process.
Returns:
The newly created file type item. If unsuccessful, the return value is null.

xviii. updateItem public com.spde.dsl.dbo.FileType updateItem(com.spde.dsl.dbo.FileType existing_FileType)
Updates an existing file type item given a registered file type.
Returns:
The newly updated file type item. If unsuccessful, the return value is null.

xix. removeItem public void removeItem(com.spde.dsl.dbo.FileType remove_FileType)
Removes an existing file type item given a registered file type.
Parameters:
remove_FileType - The target file type to remove.

xx. getItem public com.spde.dsl.dbo.FileType getItem(java.lang.Integer FileType_id)
Retrieves an existing file type item given a file type identifier.
Parameters:
FileType_id - The identifier of an existing file type.
Returns:
The target file type if it exists. If unsuccessful, the return value is null.

xxi. findItemByName public com.spde.dsl.dbo.FileType findItemByName(java.lang.String FileType_name)
Retrieves an existing file type item given a unique file type name.
Parameters:
FileType_name - The name of an existing file type.
Returns:
The target file type if it exists. If unsuccessful, the return value is null.

xxii. findItemsByFileExtension public com.spde.dsl.dbo.FileType[] findItemsByFileExtension(java.lang.String File_Extension)
Retrieves an existing file type items given a unique file extension.
Parameters:
File_Extension - A file extension. This does not need to have "." prefix.
Returns:
The target file types if it exists. If unsuccessful, the return value is null.

xxiii. getAllItems public com.spde.dsl.dbo.FileType[] getAllItems()

Retrieves all existing items from the data service layer.
Returns:
All file types. If there are no file types present, the return value is null.

xxiv. addFileExtension public com.spde.dsl.dbo.FileType addFileExtension(com.spde.dsl.dbo.FileType file_type,
java.lang.String file_extension)
Adds a file extension to a registered file type.
Parameters:
file_type - The target file type to update.
file_extension - The file extension to add to the target file type.
Returns:
The updated file type item. If unsuccessful, the return value is null.

xxv. addFileExtensions public com.spde.dsl.dbo.FileType addFileExtensions(com.spde.dsl.dbo.FileType file_type,
java.lang.String[] file_extension)
Add multiple file extensions to a registered file type.
Parameters:
file_type - The target file type to update.
file_extension - The file extensions to add to the target file type.
Returns:
The updated file type item. If unsuccessful, the return value is null.

xxvi. getFileExtensions public com.spde.dsl.dbo.FileExtension[] getFileExtensions(com.spde.dsl.dbo.FileType file_type)
Retrieves all file extensions of a given registered file type.
Parameters:
file_type - The target file type to query.
Returns:
All associated file extension of a registered file type. If unsuccessful, the return value is null.

xxvii. removeFileExtension public com.spde.dsl.dbo.FileType removeFileExtension(com.spde.dsl.dbo.FileType file_type,
java.lang.String file_extension)
Removes a file extension for a given registered file type.
Parameters:
file_type - The target file type to update.
file_extension - The file extension to remove from the target file type.
Returns:
The updated file type item. If unsuccessful, the return value is null.

xxviii. removeFileExtensions public com.spde.dsl.dbo.FileType removeFileExtensions(com.spde.dsl.dbo.FileType file_type,
java.lang.String[] file_extension)

Removes multiple file extensions for a given registered file type.

Parameters:

file_type - The target file type to update.

file_extension - The file extension to remove from the target file type.

Returns:

The updated file type item. If unsuccessful, the return value is null.

xxix. updateFileExtension protected com.spde.dsl.dbo.FileExtension[]
updateFileExtension(com.spde.dsl.dbo.FileExtension[] old_fileextension,
com.spde.dsl.dbo.FileExtension[] new_fileextension)

xxx. getFileExtensionItem protected com.spde.dsl.dbo.FileExtension getFileExtensionItem(java.lang.Integer FileExtension_id)

xxxi. ejbActivate public void ejbActivate()

Specified by:

ejbActivate in interface javax.ejb.SessionBean xxxii. ejbPassivate public void ejbPassivate()

Specified by:

ejbPassivate in interface javax.ejb.SessionBean xxxiii. setSessionContext public void setSessionContext(javax.ejb.SessionContext ctx)

Specified by:

setSessionContext in interface javax.ejb.SessionBean

Overrides:

setSessionContext in class SessionEJB xxxiv. ejbRemove public void ejbRemove()

Specified by:

ejbRemove in interface javax.ejb.SessionBean h. com.spde.ejb

Class IDMLActionManagerEJB java.lang.Object
|

+--com.spde.ejb.base.SessionEJB
   |
   +--com.spde.ejb.base.BaseManager
      |
      +--com.spde.ejb.IDMLActionManagerEJB

All Implemented Interfaces:
> javax.ejb.EnterpriseBean, IManager, java.io.Serializable, javax.ejb.SessionBean

--- public abstract class IDMLActionManagerEJB
extends BaseManager
implements javax.ejb.SessionBean The Action Manager EJB interface is responsible for managing CORE UI action items used by the Platform Services runtime. Specifically, the action manager can create, remove, retrieve, query and update IDML action snippets for handling links within the presentation layer.

Version:
> 1.0

Author:
> Galvin Hsiu

See Also:
> Serialized Form

| | |
|---|---|
| IDMLActionManagerEJB() | |

| | |
|---|---|
| com.spde.dsl.dbo.IDMLAction | createItem(com.spde.dsl.dbo.IDMLAction new_IDMLAction)<br>Creates a new IDML action item given a valid action name. |
| void | ejbActivate() |
| void | ejbPassivate() |
| void | ejbRemove() |
| com.spde.dsl.dbo.IDMLAction | findItemByName(java.lang.String IDMLAction_name)<br>Queries and retrieves an existing IDML action item given a unique action name. |
| com.spde.dsl.dbo.IDMLAction[] | getAllItems()<br>Retrieves all existing IDML action items from the data service layer. |
| com.spde.dsl.dbo.IDMLAction | getItem(java.lang.Integer IDMLAction_id) |

| | | Retrieves an existing IDML action item given a valid action identifier. |
|---|---|---|
| | void | removeItem(com.spde.dsl.dbo.IDMLAction remove_IDMLAction) Removes an existing IDML action item from the data service layer. |
| | void | setSessionContext(javax.ejb.SessionContext ctx) |
| com.spde.dsl.dbo.IDMLAction | | updateItem(com.spde.dsl.dbo.IDMLAction existing_IDMLAction) Updates an existing IDML action item given a valid action name. | beginTransaction, commit, createItem, getItems, getItems, getObjectQuery, removeItem, rollback, saveItem, updateItem getPersistenceManager, getSessionContext, initLoggingDomain, logDebug, logDebug, logDebug, logError, logError, logError, logInfo, logInfo, logInfo, logWarning, logWarning, logWarning clone, equals, finalize, getClass, hashCode, notify, notifyAll, toString, wait, wait, wait i. IDMLActionManagerEJB public IDMLActionManagerEJB()

ii. createItem public com.spde.dsl.dbo.IDMLAction createItem(com.spde.dsl.dbo.IDMLAction new_IDMLAction)
Creates a new IDML action item given a valid action name.
Parameters:
new_IDMLAction - The new IDML action item to create.
Returns:
The newly created IDML action item. If unsuccessful, return value is null.

iii. updateItem public com.spde.dsl.dbo.IDMLAction updateItem(com.spde.dsl.dbo.IDMLAction existing_IDMLAction)
Updates an existing IDML action item given a valid action name.
Parameters:
existing_IDMLAction - The new IDML action item to update.

iv. removeItem public void removeItem(com.spde.dsl.dbo.IDMLAction remove_IDMLAction)
    Removes an existing IDML action item from the data service layer.
    Parameters:
    remove_IDMLAction - The existing IDML action item to remove.

v. getItem public com.spde.dsl.dbo.IDMLAction getItem(java.lang.Integer IDMLAction_id)
    Retrieves an existing IDML action item given a valid action identifier.
    Parameters:
    IDMLAction_id - The target IDML action identifier.
    Returns:
    The retrieved IDML action item. If unsuccessful, return value is null.

vi. getAllItems public com.spde.dsl.dbo.IDMLAction[] getAllItems()
    Retrieves all existing IDML action items from the data service layer.
    Returns:
    The retrieved IDML action items. If unsuccessful, return value is null.

vii. findItemByName public com.spde.dsl.dbo.IDMLAction findItemByName(java.lang.String IDMLAction_name)
    Queries and retrieves an existing IDML action item given a unique action name.
    Parameters:
    IDMLAction_name - The target unique IDML action name.
    Returns:
    The retrieved IDML action item. If unsuccessful, return value is null.

viii. ejbActivate public void ejbActivate()
    Specified by:
    ejbActivate in interface javax.ejb.SessionBean ix. ejbPassivate public void ejbPassivate()
    Specified by:
    ejbPassivate in interface javax.ejb.SessionBean x. setSessionContext public void setSessionContext(javax.ejb.SessionContext ctx)
> Specified by:
> setSessionContext in interface javax.ejb.SessionBean
> Overrides:
> setSessionContext in class SessionEJB xi. ejbRemove public void ejbRemove()
> Specified by:
> ejbRemove in interface javax.ejb.SessionBean i. com.spde.ejb
Class IDMLUIManagerEJB java.lang.Object
 |
 +--com.spde.ejb.base.SessionEJB
     |
     +--com.spde.ejb.base.BaseManager
         |
         +--com.spde.ejb.IDMLUIManagerEJB

All Implemented Interfaces:
> javax.ejb.EnterpriseBean, IManager, java.io.Serializable,
> javax.ejb.SessionBean

--- public abstract class IDMLUIManagerEJB
extends BaseManager
implements javax.ejb.SessionBean The UI Manager EJB interface is responsible for managing CORE UI page items used by the Platform Services runtime. Specifically, the UI manager can create, remove, retrieve, query and update IDML ui page snippets for rendering pages within the presentation layer.

Version:
> 1.0

Author:
> Galvin Hsiu

See Also:
> Serialized Form

IDMLUIManagerEJB()

| com.spde.dsl.dbo.IDMLUI | createItem(com.spde.dsl.dbo.IDMLUI new_IDMLUI)<br>Creates a new IDML UI item. |
|---|---|
| void | ejbActivate() |
| void | ejbPassivate() |
| void | ejbRemove() |
| com.spde.dsl.dbo.IDMLUI | findItemByName(java.lang.String IDMLUI_name)<br>Queries and retrieves an existing IDML UI item given a unique ui name. |
| com.spde.dsl.dbo.IDMLUI[] | getAllItems()<br>Retrieves all existing IDML UI items from the data service layer. |
| com.spde.dsl.dbo.IDMLUI | getItem(java.lang.Integer IDMLUI_id)<br>Retrieves an existing IDML UI item given a valid UI identifier. |
| void | removeItem(com.spde.dsl.dbo.IDMLUI remove_IDMLUI)<br>Remove an existing IDML UI item. |
| void | setSessionContext(javax.ejb.SessionContext ctx) |
| com.spde.dsl.dbo.IDMLUI | updateItem(com.spde.dsl.dbo.IDMLUI existing_IDMLUI)<br>Updates an existing IDML UI item. | beginTransaction, commit, createItem, getItems, getItems, getObjectQuery, removeItem, rollback, saveItem, updateItem getPersistenceManager, getSessionContext, initLoggingDomain, logDebug, logDebug, logDebug, logError, logError, logError, logInfo, logInfo, logInfo, logWarning, logWarning, logWarning clone, equals, finalize, getClass, hashCode, notify, notifyAll, toString, wait, wait, wait i.    IDMLUIManagerEJB public IDMLUIManagerEJB()

ii.    createItem public com.spde.dsl.dbo.IDMLUI createItem(com.spde.dsl.dbo.IDMLUI new_IDMLUI)
Creates a new IDML UI item.
Parameters:
new_IDMLUI - The new IDML UI item to create.
Returns:
The newly created IDML UI item. If unsuccessful, return value is null.

iii. updateItem public com.spde.dsl.dbo.IDMLUI updateItem(com.spde.dsl.dbo.IDMLUI existing_IDMLUI)
Updates an existing IDML UI item.
Parameters:
existing_IDMLUI - The new IDML UI item to update.
Returns:
The newly updated IDML UI item. If unsuccessful, return value is null.

iv. removeItem public void removeItem(com.spde.dsl.dbo.IDMLUI remove_IDMLUI)
Remove an existing IDML UI item.
Parameters:
remove_IDMLUI - The new IDML UI item to remove.

v. getItem public com.spde.dsl.dbo.IDMLUI getItem(java.lang.Integer IDMLUI_id)
Retrieves an existing IDML UI item given a valid UI identifier.
Parameters:
IDMLUI_id - The target IDML UI identifier.
Returns:
The retrieved IDML UI item. If unsuccessful, return value is null.

vi. getAllItems public com.spde.dsl.dbo.IDMLUI[] getAllItems()
Retrieves all existing IDML UI items from the data service layer.
Returns:
The retrieved IDML UI items. If unsuccessful, return value is null.

vii. findItemByName public com.spde.dsl.dbo.IDMLUI findItemByName(java.lang.String IDMLUI_name)
Queries and retrieves an existing IDML UI item given a unique ui name.
Returns:
The retrieved IDML UI item. If unsuccessful, return value is null.

viii. ejbActivate public void ejbActivate()

Specified by:
ejbActivate in interface javax.ejb.SessionBean

--- ix. ejbPassivate public void ejbPassivate()
    Specified by:
    ejbPassivate in interface javax.ejb.SessionBean

--- x. setSessionContext public void setSessionContext(javax.ejb.SessionContext ctx)
    Specified by:
    setSessionContext in interface javax.ejb.SessionBean
    Overrides:
    setSessionContext in class SessionEJB

--- xi. ejbRemove public void ejbRemove()
    Specified by:
    ejbRemove in interface javax.ejb.SessionBean j. com.spde.ejb
Class LanguageManagerEJB

```
java.lang.Object
  |
  +--com.spde.ejb.base.SessionEJB
     |
     +--com.spde.ejb.base.BaseManager
        |
        +--com.spde.ejb.LanguageManagerEJB
```

All Implemented Interfaces:
    javax.ejb.EnterpriseBean, IManager, java.io.Serializable,
    javax.ejb.SessionBean

--- public abstract class LanguageManagerEJB
extends BaseManager
implements javax.ejb.SessionBean The Language EJB interface is responsible for managing languages used by the Platform Services runtime. Specifically, the UI manager can create, remove, retrieve, query and update registered languages for rendering pages in the presentation layer or perhaps setting user preferences.

Version:
    1.0
Author:
    Galvin Hsiu
See Also:

Serialized Form

| | |
|---|---|
| LanguageManagerEJB() | |

| | |
|---|---|
| com.spde.dsl.dbo.Language | createItem(com.spde.dsl.dbo.Language new_language)<br>Create a new language in the data service layer. |
| void | ejbActivate() |
| void | ejbPassivate() |
| void | ejbRemove() |
| com.spde.dsl.dbo.Language | findItemByName(java.lang.String language_name)<br>Finds and retrieves an existing language in the data service layer given a language name. |
| com.spde.dsl.dbo.Language[] | getAllItems()<br>Retrieves all existing languages in the data service layer. |
| com.spde.dsl.dbo.Language | getItem(java.lang.Integer language_id)<br>Retrieves an existing language in the data service layer given a valid language identifier. |
| void | removeItem(com.spde.dsl.dbo.Language remove_language)<br>Removes an existing language in the data service layer. |
| void | setSessionContext(javax.ejb.SessionContext ctx) |
| com.spde.dsl.dbo.Language | updateItem(com.spde.dsl.dbo.Language existing_language)<br>Updates an existing language in the data service layer. |

| |
|---|
| beginTransaction, commit, createItem, getItems, getItems, getObjectQuery, removeItem, rollback, saveItem, updateItem |

| |
|---|
| getPersistenceManager, getSessionContext, initLoggingDomain, logDebug, logDebug, logDebug, logError, logError, logError, logInfo, logInfo, logInfo, logWarning, logWarning, logWarning | clone, equals, finalize, getClass, hashCode, notify, notifyAll, toString, wait, wait, wait i. LanguageManagerEJB public LanguageManagerEJB()

ii. createItem public com.spde.dsl.dbo.Language createItem(com.spde.dsl.dbo.Language new_language)
Create a new language in the data service layer.
Parameters:
new_language - The target language to create.
Returns:
The newly created language item. If unsuccessful, the return value is null.

iii. updateItem public com.spde.dsl.dbo.Language updateItem(com.spde.dsl.dbo.Language existing_language)
Updates an existing language in the data service layer.
Parameters:
existing_language - The target language to update.
Returns:
The newly updated language item. If unsuccessful, the return value is null.

iv. removeItem public void removeItem(com.spde.dsl.dbo.Language remove_language)
Removes an existing language in the data service layer.
Parameters:
remove_language - The target language to remove.

v. getItem public com.spde.dsl.dbo.Language getItem(java.lang.Integer language_id)
Retrieves an existing language in the data service layer given a valid language identifier.
Parameters:
language_id - A valid language identifier.
Returns:
The target retrieved language item. If unsuccessful, the return value is null.

vi. findItemByName public com.spde.dsl.dbo.Language findItemByName(java.lang.String language_name)

Finds and retrieves an existing language in the data service layer given a language name.
Returns:
The target retrieved language item. If unsuccessful, the return value is null.

vii. getAllItems public com.spde.dsl.dbo.Language[] getAllItems()
Retrieves all existing languages in the data service layer.
Returns:
All language items. If there are no registered languages, the return value is null.

viii. ejbActivate public void ejbActivate()
Specified by:
ejbActivate in interface javax.ejb.SessionBean ix. ejbPassivate public void ejbPassivate()
Specified by:
ejbPassivate in interface javax.ejb.SessionBean x. setSessionContext public void setSessionContext(javax.ejb.SessionContext ctx)
Specified by:
setSessionContext in interface javax.ejb.SessionBean
Overrides:
setSessionContext in class SessionEJB xi. ejbRemove public void ejbRemove()
Specified by:
ejbRemove in interface javax.ejb.SessionBean k. com.spde.ejb
Class RendererTypeManagerEJB java.lang.Object
 |
 +--com.spde.ejb.base.SessionEJB
     |
     +--com.spde.ejb.base.BaseManager
         |
         +--com.spde.ejb.RendererTypeManagerEJB

All Implemented Interfaces:

javax.ejb.EnterpriseBean, IManager, java.io.Serializable, javax.ejb.SessionBean public abstract class RendererTypeManagerEJB
extends BaseManager
implements javax.ejb.SessionBean The Renderer Type EJB interface is responsible for managing target renderer types used to define the different rendering views used by the Platform Services runtime. Specifically, the renderer type manager can create, remove, retrieve, query and update registered renderer types for defining the possible views via the presentation layer.

Version:
 1.0
Author:
 Galvin Hsiu
See Also:
 Serialized Form

| |
|---|
| RendererTypeManagerEJB() |

| | |
|---|---|
| com.spde.dsl.dbo.RendererType | createItem(com.spde.dsl.dbo.RendererType new_RendererType) Creates a new renderer type item given a valid renderer type name. |
| void | ejbActivate() |
| void | ejbPassivate() |
| void | ejbRemove() |
| com.spde.dsl.dbo.RendererType | findItemByName(java.lang.String RendererType_name) Queries and retrieves an existing renderer type from the data service layer. |
| com.spde.dsl.dbo.RendererType[] | getAllItems() Retrieve all existing renderer types from the data service layer. |
| com.spde.dsl.dbo.RendererType | getItem(java.lang.Integer RendererType_id) Retrieves an existing renderer type from the data service layer. |
| void | removeItem(com.spde.dsl.dbo.RendererType remove_rendererType) Removes a new renderer type from the data service layer. |

| | |
|---|---|
| void | setSessionContext(javax.ejb.SessionContext ctx) |
| com.spde.dsl.dbo.RendererType | updateItem(com.spde.dsl.dbo.RendererType existing_rendererType) Updates a new renderer type. | beginTransaction, commit, createItem, getItems, getItems, getObjectQuery, removeItem, rollback, saveItem, updateItem getPersistenceManager, getSessionContext, initLoggingDomain, logDebug, logDebug, logDebug, logError, logError, logError, logInfo, logInfo, logInfo, logWarning, logWarning, logWarning clone, equals, finalize, getClass, hashCode, notify, notifyAll, toString, wait, wait, wait i. RendererTypeManagerEJB public RendererTypeManagerEJB()

ii. createItem public com.spde.dsl.dbo.RendererType
createItem(com.spde.dsl.dbo.RendererType new_RendererType)
    Creates a new renderer type item given a valid renderer type name.
    Parameters:
    new_RendererType - The new renderer type item to create.
    Returns:
    The newly created renderer type item. If unsuccessful, return value is null.

iii. updateItem public com.spde.dsl.dbo.RendererType
updateItem(com.spde.dsl.dbo.RendererType existing_rendererType)
    Updates a new renderer type.
    Parameters:
    existing_rendererType - An existing renderer type to update.
    Returns:
    The newly updated renderer type item. If unsuccessful, return value is null.

iv. removeItem public void removeItem(com.spde.dsl.dbo.RendererType remove_rendererType)
    Removes a new renderer type from the data service layer.
    Parameters:
    remove_rendererType - An existing renderer type to remove.

v. getItem public com.spde.dsl.dbo.RendererType getItem(java.lang.Integer RendererType_id)
    Retrieves an existing renderer type from the data service layer.
    Returns:
    The target renderer type found. If unsuccessful, the return value is null.

vi. findItemByName public com.spde.dsl.dbo.RendererType findItemByName(java.lang.String RendererType_name)
    Queries and retrieves an existing renderer type from the data service layer.
    Parameters:
    RendererType_name - The unique renderer type name to search for.
    Returns:
    The target renderer type found. If unsuccessful, the return value is null.

vii. getAllItems public com.spde.dsl.dbo.RendererType[] getAllItems()
    Retrieve all existing renderer types from the data service layer.
    Returns:
    The target renderer types found. If there are no registered renderer types, the return value is null.

viii. ejbActivate public void ejbActivate()
    Specified by:
    ejbActivate in interface javax.ejb.SessionBean ix. ejbPassivate public void ejbPassivate()
    Specified by:
    ejbPassivate in interface javax.ejb.SessionBean x. setSessionContext public void setSessionContext(javax.ejb.SessionContext ctx)
    Specified by:
    setSessionContext in interface javax.ejb.SessionBean
    Overrides:
    setSessionContext in class SessionEJB xi. ejbRemove public void ejbRemove()
> Specified by:
>> ejbRemove in interface javax.ejb.SessionBean l. com.spde.ejb Class RenderingPrimitiveManagerEJB java.lang.Object
|
+--<u>com.spde.ejb.base.SessionEJB</u>
    |
    +--<u>com.spde.ejb.base.BaseManager</u>
        |
        +--com.spde.ejb.RenderingPrimitiveManagerEJB

All Implemented Interfaces:
> javax.ejb.EnterpriseBean, <u>IManager</u>, java.io.Serializable, javax.ejb.SessionBean

--- public abstract class RenderingPrimitiveManagerEJB
extends <u>BaseManager</u>
implements javax.ejb.SessionBean The Renderer Primitive EJB interface is responsible for managing IDML primitives used to composite pages used by the IDML UI for the Platform Services runtime. Specifically, the renderer primitive manager can create, remove, retrieve, query and update registered renderer primitives that are used to implicitly render pages for the presentation layer.

Version:
> 1.0

Author:
> Galvin Hsiu

See Also:
> Serialized Form

| |
|---|
| RenderingPrimitiveManagerEJB() |

| | |
|---|---|
| com.spde.dsl.dbo.RenderingPrimitive | createItem(com.spde.dsl.dbo.RenderingPrimitive new_RenderingPrimitive)<br>Creates a new rendering primitive item given a valid renderer primitive name - if the primitive file is not found, it will attempt to create another automatically.. |

| | |
|---:|:---|
| void | ejbActivate() |
| void | ejbPassivate() |
| void | ejbRemove() |
| com.spde.dsl.dbo.RenderingPrimitive | findItemByName(java.lang.String RenderingPrimitive_name)<br>Queries and retrieves a target rendering primitive using a specified primitive name. |
| com.spde.dsl.dbo.RenderingPrimitiveFile | findPrimitiveFileItemByNameAndRendererType(java.lang.String RenderingPrimitive_name, com.spde.dsl.dbo.RendererType RenderingPrimitive_renderer)<br>Queries and retrieves a target rendering primitive file using a specified primitive name and a registered renderer type. |
| com.spde.dsl.dbo.RenderingPrimitive[] | getAllItems()<br>Retrieves all rendering primitives in the data service layer. |
| com.spde.dsl.dbo.RenderingPrimitive | getItem(java.lang.Integer RenderingPrimitive_id)<br>Retrieves a target rendering primitive given a rendering primitive identifier. |
| protected com.spde.dsl.dbo.RenderingPrimitiveFile | getPrimitiveFileItem(java.lang.Integer PrimitiveFile_id) |
| void | removeItem(com.spde.dsl.dbo.RenderingPrimitive remove_RenderingPrimitive)<br>Removes an existing rendering primitive from the data service layer. |
| void | setSessionContext(javax.ejb.SessionContext context) |
| com.spde.dsl.dbo.RenderingPrimitive | updateItem(com.spde.dsl.dbo.RenderingPrimitive existing_RenderingPrimitive)<br>Updates an existing rendering primitive item - if the existing primitive file is not found, it will attempt to create one automatically.. |

| |
|:---|
| beginTransaction, commit, createItem, getItems, getItems, getObjectQuery, removeItem, rollback, saveItem, updateItem |

| |
|:---|
| getPersistenceManager, getSessionContext, initLoggingDomain, logDebug, logDebug, logDebug, logError, logError, logError, logInfo, logInfo, logInfo, logWarning, logWarning, logWarning |

| clone, equals, finalize, getClass, hashCode, notify, notifyAll, toString, wait, wait, wait | i. RenderingPrimitiveManagerEJB public RenderingPrimitiveManagerEJB()

ii. createItem public com.spde.dsl.dbo.RenderingPrimitive
createItem(com.spde.dsl.dbo.RenderingPrimitive new_RenderingPrimitive)
  Creates a new rendering primitive item given a valid renderer primitive name - if the primitive file is not found, it will attempt to create another automatically..
  Returns:
  The newly created rendering primitive item. If unsuccessful, return value is null.

iii. updateItem public com.spde.dsl.dbo.RenderingPrimitive
updateItem(com.spde.dsl.dbo.RenderingPrimitive existing_RenderingPrimitive)
  Updates an existing rendering primitive item - if the existing primitive file is not found, it will attempt to create one automatically..
  Returns:
  The newly updated rendering primitive item. If unsuccessful, return value is null.

iv. removeItem public void removeItem(com.spde.dsl.dbo.RenderingPrimitive remove_RenderingPrimitive)
  Removes an existing rendering primitive from the data service layer.
  Returns:
  The newly updated rendering primitive item. If unsuccessful, return value is null.

v. getItem public com.spde.dsl.dbo.RenderingPrimitive getItem(java.lang.Integer RenderingPrimitive_id)
  Retrieves a target rendering primitive given a rendering primitive identifier.
  Parameters:
  RenderingPrimitive_id - A valid rendering primitive identifier.
  Returns:
  The target existing rendering primitive item. If unsuccessful, return value is null.

vi. findItemByName public com.spde.dsl.dbo.RenderingPrimitive
findItemByName(java.lang.String RenderingPrimitive_name)

Queries and retrieves a target rendering primitive using a specified primitive name.

Parameters:

RenderingPrimitive_name - A valid rendering primitive name.

Returns:

The target found existing rendering primitive item. If unsuccessful, return value is null.

vii. findPrimitiveFileItemByNameAndRendererType public com.spde.dsl.dbo.RenderingPrimitiveFile
findPrimitiveFileItemByNameAndRendererType(java.lang.String RenderingPrimitive_name, com.spde.dsl.dbo.RendererType RenderingPrimitive_renderer)

Queries and retrieves a target rendering primitive file using a specified primitive name and a registered renderer type.

Parameters:

RenderingPrimitive_name - A valid rendering primitive name.
RenderingPrimitive_renderer - A valid rendering primitive renderer.

Returns:

The target found existing rendering primitive file item. If unsuccessful, return value is null.

viii. getAllItems public com.spde.dsl.dbo.RenderingPrimitive[] getAllItems()

Retrieves all rendering primitives in the data service layer.

Returns:

All rendering primitive items. If there are no rendering primitive items, return value is null.

ix. ejbActivate public void ejbActivate()

Specified by:

ejbActivate in interface javax.ejb.SessionBean x. ejbPassivate public void ejbPassivate()

Specified by:

ejbPassivate in interface javax.ejb.SessionBean xi. setSessionContext public void setSessionContext(javax.ejb.SessionContext context)

Specified by:
setSessionContext in interface javax.ejb.SessionBean
Overrides:
setSessionContext in class SessionEJB xii. ejbRemove public void ejbRemove()
Specified by:
ejbRemove in interface javax.ejb.SessionBean xiii. getPrimitiveFileItem protected com.spde.dsl.dbo.RenderingPrimitiveFile
getPrimitiveFileItem(java.lang.Integer PrimitiveFile_id)

m. com.spde.ejb
Class RenderingResourceManagerEJB java.lang.Object
 |
 +--com.spde.ejb.base.SessionEJB
       |
       +--com.spde.ejb.base.BaseManager
             |
             +--com.spde.ejb.RenderingResourceManagerEJB

All Implemented Interfaces:
javax.ejb.EnterpriseBean, IManager, java.io.Serializable, javax.ejb.SessionBean

--- public abstract class RenderingResourceManagerEJB
extends BaseManager
implements javax.ejb.SessionBean The Renderer Resource EJB interface is responsible for managing IDML resources used to composite pages (i.e. gifs, audio files etc) used by the IDML UI for the Platform Services runtime. Specifically, the renderer resource manager can create, remove, retrieve, query and update registered renderer resources that are used to implicitly display external resources for pages for the presentation layer.

Version:
1.0
Author:
Galvin Hsiu
See Also:
Serialized Form

---

RenderingResourceManagorEJB()

| | |
|---|---|
| com.spde.dsl.dbo.RenderingResource | createItem(com.spde.dsl.dbo.RenderingResource new_RenderingResource)<br>Creates a new rendering resource item given a valid renderer resource name - if the resource file is not found, it will attempt to create another automatically.. |
| void | ejbActivate() |
| void | ejbPassivate() |
| void | ejbRemove() |
| com.spde.dsl.dbo.RenderingResource | findItemByName(java.lang.String RenderingResource_name)<br>Query and retrieve an existing rendering resource item given an resource item name. |
| com.spde.dsl.dbo.RenderingResourceFile | findResourceFileItemByNameAndRendererTypeAndLanguage(java.lang.String RenderingResource_name, com.spde.dsl.dbo.RendererType RenderingResource_renderer, com.spde.dsl.dbo.Language RenderingResource_language)<br>Query and retrieve an existing rendering resource file item given name, renderer type and language. |
| com.spde.dsl.dbo.RenderingResource[] | getAllItems()<br>Retrieve all existing rendering resources file item. |
| com.spde.dsl.dbo.RenderingResource | getItem(java.lang.Integer RenderingResource_id)<br>Retrieve an existing rendering resource item given an resource item identifier. |
| protected com.spde.dsl.dbo.RenderingResourceFile | getResourceFileItem(java.lang.Integer RendererFile_id) |
| void | removeItem(com.spde.dsl.dbo.RenderingResource remove_RenderingResource)<br>Remove an existing rendering resource item. |
| void | setSessionContext(javax.ejb.SessionContext context) |
| com.spde.dsl.dbo.RenderingResource | updateItem(com.spde.dsl.dbo.RenderingResource existing_RenderingResource)<br>Update an existing rendering resource item given a valid renderer resource name - if the resource file is not found, it will attempt to create another automatically.. |

| beginTransaction, commit, createItem, getItems, getItems, getObjectQuery, removeItem, rollback, saveItem, updateItem |
|---|

| getPersistenceManager, getSessionContext, initLoggingDomain, logDebug, logDebug, logDebug, logError, logError, logError, logInfo, logInfo, logInfo, logWarning, logWarning, logWarning |
|---|

| clone, equals, finalize, getClass, hashCode, notify, notifyAll, toString, wait, wait, wait |
|---| i. RenderingResourceManagerEJB public RenderingResourceManagerEJB()

ii. createItem public com.spde.dsl.dbo.RenderingResource
createItem(com.spde.dsl.dbo.RenderingResource new_RenderingResource)
> Creates a new rendering resource item given a valid renderer resource name - if the resource file is not found, it will attempt to create another automatically..
> Returns:
> The newly created rendering resource item. If unsuccessful, return value is null.

iii. updateItem public com.spde.dsl.dbo.RenderingResource
updateItem(com.spde.dsl.dbo.RenderingResource existing_RenderingResource)
> Update an existing rendering resource item given a valid renderer resource name - if the resource file is not found, it will attempt to create another automatically..
> Returns:
> The newly updated rendering resource item. If unsuccessful, return value is null.

iv. removeItem public void removeItem(com.spde.dsl.dbo.RenderingResource remove_RenderingResource)
> Remove an existing rendering resource item.

v. getItem public com.spde.dsl.dbo.RenderingResource getItem(java.lang.Integer RenderingResource_id)
: Retrieve an existing rendering resource item given an resource item identifier.
Parameters:
RenderingResource_id - The target rendering resource identifier to retrieve.
Returns:
The target rendering resource discovered. If unsuccessful, the return value is null.

vi. findItemByName public com.spde.dsl.dbo.RenderingResource
findItemByName(java.lang.String RenderingResource_name)
: Query and retrieve an existing rendering resource item given an resource item name.
Parameters:
RenderingResource_name - The target rendering resource name to retrieve.
Returns:
The target rendering resource discovered. If unsuccessful, the return value is null.

vii. findResourceFileItemByNameAndRendererTypeAndLanguage public com.spde.dsl.dbo.RenderingResourceFile
findResourceFileItemByNameAndRendererTypeAndLanguage(java.lang.String RenderingResource_name, com.spde.dsl.dbo.RendererType RenderingResource_renderer, com.spde.dsl.dbo.Language RenderingResource_language)
: Query and retrieve an existing rendering resource file item given name, renderer type and language.
Parameters:
RenderingResource_name - The target rendering resource name for retrieval.
RenderingResource_renderer - The target rendering resource renderer type for retrieval.
RenderingResource_language - The target rendering resource language for retrieval.
Returns:
The target rendering resource file discovered. If unsuccessful, the return value is null.

viii. getAllItems public com.spde.dsl.dbo.RenderingResource[] getAllItems()
: Retrieve all existing rendering resources file item.
Returns:
All rendering resources discovered. If unsuccessful, the return value is null.

ix. ejbActivate public void ejbActivate()
> Specified by:
> ejbActivate in interface javax.ejb.SessionBean x. ejbPassivate public void ejbPassivate()
> Specified by:
> ejbPassivate in interface javax.ejb.SessionBean xi. setSessionContext public void setSessionContext(javax.ejb.SessionContext context)
> Specified by:
> setSessionContext in interface javax.ejb.SessionBean
> Overrides:
> setSessionContext in class SessionEJB xii. ejbRemove public void ejbRemove()
> Specified by:
> ejbRemove in interface javax.ejb.SessionBean xiii. getResourceFileItem protected com.spde.dsl.dbo.RenderingResourceFile getResourceFileItem(java.lang.Integer RendererFile_id)

n. com.spde.ejb
Class UICopyManagerEJB java.lang.Object
|
+--com.spde.ejb.base.SessionEJB
   |
   +--com.spde.ejb.base.BaseManager
      |
      +--com.spde.ejb.UICopyManagerEJB

All Implemented Interfaces:
> javax.ejb.EnterpriseBean, IManager, java.io.Serializable, javax.ejb.SessionBean

--- public abstract class UICopyManagerEJB
extends BaseManager
implements javax.ejb.SessionBean The UICopy Manager EJB interface is responsible for managing text copy used in compositing pages (i.e. written text for the language) used by the IDML UI for the Platform Services runtime. Specifically, the ui copy manager can create, remove, retrieve, query and update registered ui copy text that are used to display written content for pages for the presentation layer.

See Also:
Serialized Form

| UICopyManagerEJB() |
| --- |

| | |
| --- | --- |
| com.spde.dsl.dbo.UICopy | createItem(com.spde.dsl.dbo.UICopy new_UICopy)<br>    Creates a new UI copy item given a valid UI copy name - if the UI copy text is not found, it will attempt to create another automatically.. |
| void | ejbActivate() |
| void | ejbPassivate() |
| void | ejbRemove() |
| com.spde.dsl.dbo.UICopy | findItemByName(java.lang.String UICopy_name)<br>    Queries and retrieves an existing target UI copy item given a valid UI copy name. |
| com.spde.dsl.dbo.UICopyText | findUICopyTextItemByNameAndRendererTypeAndLanguage(java.lang.String UICopy_name, com.spde.dsl.dbo.RendererType UICopy_renderer, com.spde.dsl.dbo.Language UICopy_language)<br>    Queries and retrieves an existing target UI copy text item given a valid UI copy name, renderer type and language. |
| protected java.lang.String | generateHash(java.lang.String contents) |
| com.spde.dsl.dbo.UICopy[] | getAllItems()<br>    Retrieve all ui copy items in the data service layer. |
| com.spde.dsl.dbo.UICopy | getItem(java.lang.Integer UICopy_id)<br>    Retrieves an existing target UI copy item given a valid UI copy identifier. |
| protected com.spde.dsl.dbo.UICopyText | getUICopyTextItem(java.lang.String UICopy_name) |
| void | removeItem(com.spde.dsl.dbo.UICopy remove_UICopy)<br>    Removes an existing UI copy item given a valid UI copy identifier. |

|  | void setSessionContext(javax.ejb.SessionContext ctx) |
|---|---|
| com.spde.dsl.dbo.UICopy | updateItem(com.spde.dsl.dbo.UICopy existing_UICopy)<br>Updates an existing UI copy item given a valid UI copy identifier - if the UI copy text is not found, it will attempt to create another automatically.. | beginTransaction, commit, createItem, getItems, getItems, getObjectQuery, removeItem, rollback, saveItem, updateItem getPersistenceManager, getSessionContext, initLoggingDomain, logDebug, logDebug, logDebug, logError, logError, logError, logInfo, logInfo, logInfo, logWarning, logWarning, logWarning clone, equals, finalize, getClass, hashCode, notify, notifyAll, toString, wait, wait, wait i. UICopyManagerEJB public UICopyManagerEJB()

ii. createItem public com.spde.dsl.dbo.UICopy createItem(com.spde.dsl.dbo.UICopy new_UICopy)
Creates a new UI copy item given a valid UI copy name - if the UI copy text is not found, it will attempt to create another automatically..
Parameters:
new_UICopy - The new UI copy item to create.
Returns:
The newly created UI copy item. If unsuccessful, return value is null.

iii. updateItem public com.spde.dsl.dbo.UICopy updateItem(com.spde.dsl.dbo.UICopy existing_UICopy)
Updates an existing UI copy item given a valid UI copy identifier - if the UI copy text is not found, it will attempt to create another automatically..
Parameters:
existing_UICopy - The existing UI copy item to update.
Returns:
The newly updated UI copy item. If unsuccessful, return value is null.

iv. removeItem public void removeItem(com.spde.dsl.dbo.UICopy remove_UICopy)
    Removes an existing UI copy item given a valid UI copy identifier.
    Parameters:
    remove_UICopy - The existing UI copy item to remove.

v. getItem public com.spde.dsl.dbo.UICopy getItem(java.lang.Integer UICopy_id)
    Retrieves an existing target UI copy item given a valid UI copy identifier.
    Parameters:
    UICopy_id - The target UI copy identifier.
    Returns:
    The retrieved UI copy. If unsuccessful, the return value is null.

vi. findItemByName public com.spde.dsl.dbo.UICopy findItemByName(java.lang.String UICopy_name)
    Queries and retrieves an existing target UI copy item given a valid UI copy name.
    Parameters:
    UICopy_name - The target UI copy name to find for.
    Returns:
    The retrieved UI copy. If unsuccessful, the return value is null.

vii. findUICopyTextItemByNameAndRendererTypeAndLanguage public com.spde.dsl.dbo.UICopyText
findUICopyTextItemByNameAndRendererTypeAndLanguage(java.lang.String UICopy_name, com.spde.dsl.dbo.RendererType UICopy_renderer, com.spde.dsl.dbo.Language UICopy_language)
    Queries and retrieves an existing target UI copy text item given a valid UI copy name, renderer type and language.
    Parameters:
    UICopy_name - The target UI copy name to search for.
    UICopy_renderer - The target UI copy renderer to search for.
    UICopy_language - The target UI copy language to search for.
    Returns:
    The retrieved UI copy text item. If unsuccessful, the return value is null.

viii. getAllItems public com.spde.dsl.dbo.UICopy[] getAllItems()
    Retrieve all ui copy items in the data service layer.
    Returns:

All ui copy items present in the data service layer. If there are none, return value is null.

ix. ejbActivate public void ejbActivate()
Specified by:
ejbActivate in interface javax.ejb.SessionBean x. ejbPassivate public void ejbPassivate()
Specified by:
ejbPassivate in interface javax.ejb.SessionBean xi. setSessionContext public void setSessionContext(javax.ejb.SessionContext ctx)
Specified by:
setSessionContext in interface javax.ejb.SessionBean
Overrides:
setSessionContext in class SessionEJB xii. ejbRemove public void ejbRemove()
Specified by:
ejbRemove in interface javax.ejb.SessionBean xiii. generateHash protected java.lang.String generateHash(java.lang.String contents)

xiv. getUICopyTextItem protected com.spde.dsl.dbo.UICopyText getUICopyTextItem(java.lang.String UICopy_name)

Appendix H

1) Screenblast v2.0 Publishing Environment

This document is broken into two major sections and describes the Screenblast v2.0 publishing pipeline. The first section details the specific requirements for the various production environments that make up the publishing pipeline. The second section of this document details the primary use flows for the publishing pipeline. This document describes the steps to creating and publishing new content.

This document does not define the following:
- Functionality of the Site Management Tool
- Hardware recommendations or Network Diagrams
    - These elements will be developed with SPDE systems during the technical specification a)

b) Production Development Environment

The *Production Development Environment* is the primary working environment for the site producers. All new development will occur on this environment. Additionally this is the place where the site producers can build an test new interfaces and try out new functional elements and really push the system. The *Production Development Environment* is also the only way to load new content elements into the system. This loading is accomplished through a networked filer that is available to all the production team.

i) Available Tasks

This environment enables the following functionality
1. Ingestion of content though a workstation mounted file server (i.e. Sl_nas2/sb_projects)
2. Creation and/or editing of pages/components through use of the Site Management Tool
3. Ability to publish to Staging, Beta and Digital Island environments
4. Ability to receive elements published from Staging, Beta and Live environments
5. Ability to preview pages through a web browser at a SPDE internal, login_required url (develop.screenblast.com)

ii) Accessibility

The *Production Development Environment* is accessible by either the Site Management tool to edit/develop or through a web browser to preview/test the pages
1. Site Management Tool Accessibility
    a. The environment is login required and accessible through the installed SMT on the producers' machines
    b. Remote access is available to PC's with installed SMT clients through SPDE VPN accounts
2. Internet Browser Accessibility
    a. Pages can be accessed through a web browser at a SPDE internal login_required url (develop.sonypictures.com)

b. Remote access to this environment can be enabled through SPDE VPN accounts
3. Traffic Requirement – This environment can support 20 concurrent users
 iii) Local Hardware Environment The hardware environment for *Production Development Environment* requires the following components. The final network diagram for all hardware environments will be created by SPDE systems group.
1. Load Balancer
2. Redundant Web Servers
3. Redundant Application Servers
4. Oracle Database
5. Filer – This content store will be accessed as a relative path stored in the database and must also be available as a shared drive to the production team.
6. Backup System
  a. A full backup occurs once a week with incremental backups every night c) Production Staging Environment The Staging environment's primary uses are: content QA, legal and executive approval. Content is created on the *Production Development Environment* and then is published to the *Production Staging Environment* for functional testing and approvals. The *Production Staging Environment* is more robust than the development environment to support the potential load of many users accessing at the same time to speed the approval process.
 i) Available Tasks This environment allows the following functionality
1. Creation and/or editing of pages/components through use of the Site Management Tool
2. Ability to publish to Production Development, Beta and Digital Island environments
3. Ability to receive elements published from Production Development, Beta and Live environments
4. Ability to preview pages through a web browser at a SPDE internal, login_required url (staging.sonypictures.com)
  a. Executive, Legal and Content QA approvals occur on this environment
 ii) Accessibility The production staging environment is accessible using either the site management tool, to edit/develop pages, or through a web browser, used to preview/test the pages.
1. Site Management Tool Accessibility
  a. The environment is login required and accessible through the installed SMT on the producers' machines
  b. Remote access is available to installed SMT clients through a SPDE VPN
2. Internet Browser Accessibility
  a. Pages can be accessed through a web browser at a SPDE internal login_required url (staging.screenblast.com)
  b. Remote access to this environment can be enabled through the SPDE VPN
3. Traffic Requirement – This environment can support 75 concurrent users iii) Local Hardware Environment The hardware environment for *Staging Development Environment* requires the following components. The final network diagram for all hardware environments will be created by SPDE systems group.
1. Load Balancer
2. Redundant Web Servers
3. Redundant Application Servers
4. Oracle Database
5. Filer – This content store is only available as a relative path stored in the database, and through the publishing option in the Site Management Tool
6. Backup System
    a. A full backup occurs once a week with incremental backups every night d) Beta Environment The Beta Environment is last step in the publishing process before making content live. Beta is designed to show new content and edits live on the Live hardware, but with password restricted access. Beta is also the step in production where content that will be hosted on the Digital Island network will be uploaded to DI and integrated into the pages. Access to the previous environments was only available to SPDE through a VPN, but Beta is live to anyone who has the correct password.

i) Available Tasks

This environment allows the following functionality
1. Creation and/or editing of pages/components through use of the Site Management Tool
2. Ability to publish to Production Development, Staging, Digital Island and Live environments
3. Ability to receive elements published from Production Development, Staging, Live environments
4. Ability to preview pages through a web browser on the production hardware at a login_required url (beta.screenblast.com)

ii) Accessibility

The Beta environment is accessible using either the site management tool, to edit/develop pages, or through a web browser, used to preview/test the pages.
1. Site Management Tool Accessibility
    a. The environment is login required and accessible through the installed SMT on the producers' machines
    b. Remote access is available to installed SMT clients through a SPDE VPN
2. Internet Browser Accessibility
    a. Pages can be accessed through a web browser at a login_required url (beta.screenblast.com)
3. Traffic Requirement – This environment can support 150 concurrent users iii) Local Hardware Environment The hardware environment for Beta is password protected partition of the live environment, and is made up of at least the following functional components. The final network diagram for all hardware environments will be created by SPDE systems group.
1. Load Balancer
2. Redundant Web Servers
3. Redundant Application Servers
4. Oracle Database
5. Filer – This content store is only available as a relative path stored in the database, and through the publishing option in the Site Management Tool
6. Backup System
    a. A full backup occurs once a week with incremental backups every night e) Live Environment The Live Environment is the public facing Screenblast. It is accessible at www.screenblast.com. Content can only get to the Live Environment from Beta. The Live Environment referenced in this document makes reference to but does not include the hardware requirements for the Digital Island Network.
   i) Available Tasks This Live Environment allows the following functionality
1. Ability to publish to Production Development, Staging, Digital Island and Beta environments
2. Ability to receive elements published from the Beta Environment
   ii) Accessibility The production staging environment is accessible using either the site management tool, to edit/develop pages, or through a web browser, used to preview/test the pages.
1. Site Management Tool Accessibility
   a. The environment is login required and accessible through the installed SMT on the producers' machines
   b. Remote access is available to installed SMT clients through a SPDE VPN
2. Internet Browser Accessibility
   a. Pages can be accessed through a web browser at (www.screenblast.com)
3. Traffic Requirement – The Live Environment's concurrent user capacity will be determined during technical specification and diligence.
   iii) Local Hardware Environment The Live environment is designed and managed by SPDE systems. The final network diagram for all hardware environments will be created by SPDE systems group, but the minimal functional components required are:
1. Load Balancer
2. Redundant Web Servers
3. Redundant Application Servers
4. Oracle Database
5. Filer – This content store is only available as a relative path stored in the database, and through the publishing option in the Site Management Tool
6. Backup System
   a. A full backup occurs once a week with incremental backups every night f) Site Publishing Use Cases Here are the primary use cases for the site publishing system. These use cases are based on the functional components and provide sample use flows for the most common uses of the site publishing process.

i) Site Producer builds and performs unit testing on a new page with "custom" content 1. Site Producer builds page
   a. Site Producer creates a new folder on SB_projects and copies in any content elements he/she may need into that folder
   b. Site Producer launches the Site Management Tool (SMT)
   c. Site Producer checks to make sure they are logged into the *Production Development Environment*
   d. Site Producer builds a new element by editing the IDML or creates a new layout from scratch
   e. Site Producer adds a reference to the new element
   f. Site Producer saves the Page
      i. The SMT updates the last touched by field
2. Site Producer unit tests the page
   a. Site Producer accesses the page through an internal Screenblast login required url (develop.sonypictures.com)
   b. Site Producer tests functionality
      i. If the page fails to function as expected go to 1b to make appropriate edit/fix
      ii. If Page functions as expected then continue ii) Site Producer publishes content from Production Development to Production Staging 1. Site Producer launches the Site Management Tool (SMT)
2. Site Producer checks to make sure they are logged into production development
3. Site Producer selects elements to publish to the production staging environment
4. Site Producer selects production staging as the target publish to environment
5. Site Producer clicks publish
6. Selected elements are replicated to the production staging environment
   a. The SMT updates the last touched by field
7. Site Producer validates that the publish function was successful by either
   a. Site Producer accesses the development staging environment through internal Screenblast login required url (staging.sonypictures.com) to see the files copied successfully – or –
   b. Site Producer logs into production staging environment in the SMT to validate that the elements were published successfully iii) Site Producer gets executive, legal and QA approval on production staging for a new page 1. Site Producer creates and publishes a new page to production staging
2. Site Producer notifies appropriate people of the url of the page 3. Executives, Legal and QA review occur through internal Screenblast login required url (staging.sonypictures.com)
    a. If changes are needed the Site producer makes the appropriate changes/fixes and asks for another round of review
    b. If no changes are needed Executive, Legal or QA approval is sent via email iv) Site Producer publishes the content from Staging to Beta 1. Site Producer launches the Site Management Tool (SMT)
2. Site Producer checks to make sure they are logged into production staging environment
3. Site Producer selects elements to publish to Beta
    a. If some of the elements need to be sent to Digital Island (DI) then DI is selected as a destination by the producer on the publish tab for the DI elements
        1. After publishing the file to DI the publish interface indicates that the file is pending, and the producer returns to click "verify" (files can take up to 24hrs. to propagate)
        2. The url for the DI file is accessed to test its availability
            1. if fail then the file continues to indicate pending and the Site Producer can return later check status again
            2. if success then the file is removed from the publish list
            3. Site Producer edits references to this file to point at the DI network location
    b. If elements do not need to go to DI then continue
4. Site Producer selects Beta as the target publish to environment
5. Site Producer clicks publish
6. Selected elements are replicated to Beta environment
    a. The SMT updates the last touched by field
7. Site Producer logs into Beta environment using accepted internet browser at login_required url (beta.screenblast.com) with Screenblast login and performs functional testing on the new "content"

v) Site Producer publishes content from Beta to Live

1. Senior Site Producer launches the Site Management Tool (SMT)
2. Senior Site Producer checks to make sure they are logged into Beta
3. Senior Site Producer selects new elements to publish
4. Senior Site Producer selects Live as the publish to target environment
5. Senior Site Producer clicks publish
6. User sees a Yes/No dialog box that says "you are about to publish to the live environment. Are you sure you want to make these elements live?
    a. If user selects No then the publish is cancelled
    b. If user selects Yes then continue
7. Selected elements are replicated to the Live environment
    a. The SMT updates the last touched by field
8. Site Producer accesses the Live environment using accepted browser at url www.screenblast.com to perform final live validation of the new "content".

vi) Site Producer performs an emergency fix to the live environment

1. Site Producer makes fixes
    a. Site Producer launches the Site Management Tool (SMT)
    b. Site Producer checks to make sure they are logged into production development environment
    c. Site Producer makes the required edits/fixes
2. Site Producer Unit Tests changes with appropriate browsers
    a. If changes fail testing then goto 1a
    b. If changes pass unit tests then continue
3. Site Producer selects elements to publish from the production development environment
4. Site Producer selects Beta as the publishing target environment
5. Site Producer clicks publish
6. Selected elements are replicated to Beta
    a. The SMT updates the last touched by field
7. Site Producer validates that the publish function was successful by logging into Beta environment using accepted internet browser(s) at url (beta.screenblast.com) with Screenblast login and performs functional testing on the new "content"
    a. If new content fails testing then goto 1a
    b. If new content passes test(s) then continue
8. Site Producer logs the SMT into Beta
9. Site Producer selects "new content" to publish
10. Site Producer selects Live as the publish to target environment
11. Site Producer clicks publish
12. Selected elements are replicated to the Live environment
    a. The SMT updates the last touched by field
13. Site Producer accesses the Live environment using accepted browser at url www.screenblast.com to perform final live validation of the new "content".

vii) Site Producer retrieves content from Live to Production Development

1. Site Producer launches the Site Management Tool (SMT)
2. Site Producer logs the SMT into the live environment
3. Site Producer selects elements to publish to production development
4. Site Producer selects production development as the target publish to environment
5. Site Producer clicks publish
6. Selected elements are replicated to the production development environment
    a. The SMT updates the last touched by field
7. Site Producer logs the SMT into production development and validates that the content was copied successfully.

What is claimed is:

1. A non-transitory tangible storage medium residing on a server and storing a computer program for communicating page-based content among a server and a plurality of client devices via a network, the computer program comprising executable instructions that cause a computer to:
define the page-based content to the plurality of client devices, the page-based content including user interface (UI) elements in a platform and language independent format, some of the UI elements organized into logical assets including data tables;
relate the logical assets to objects that act as external interface for processing and validating the page-based content using a data service layer;
accept requests for the page-based content from the plurality of client devices;
determine platform formats and human languages used by the plurality of client devices to display the content on each of the plurality of client devices;
transform the UI elements in the platform and language independent format into multiple platform formats in multiple human languages;
render the UI elements using a pipeline with multiple stages to retrieve at least one action through the data service layer and to perform the at least one action on the transformed UI elements using the data tables; and
outputting the rendered UI elements to the plurality of client devices.

2. The storage medium recited in claim 1, wherein the UI elements include at least one of user interface UI components, actions, copy, and rendering elements.

3. The storage medium recited in claim 1, further comprising at least one data source for providing the UI elements.

4. The storage medium recited in claim 3, wherein the at least one data source is a database.

5. A computer program product, comprising:
a non transitory storage medium; and
program instructions stored on the storage medium for:
defining page-based content to a plurality of network enabled devices, the page-based content including user interface (UI) elements of a user interface in a relatively abstract format, some of the UI elements organized into logical assets including data tables;
relating the logical assets to objects that act as external interface for processing and validating the page-based content using a data service layer;
accepting requests for the page-based content from the plurality of network enabled devices for display on associated user interfaces;
determining platform formats and human languages for displaying the content on the associated user interfaces;
rendering the UI elements using a pipeline with multiple stages to retrieve at least one action through the data service layer and to perform the at least one action on the UI elements using the data tables; and
outputting the rendered UI elements to the plurality of network enabled devices for display on the associated user interfaces based on the determined platform formats and human languages.

6. A method for communicating page-based content among at least one server and a plurality of client network enabled devices, the method comprising:
defining the page-based content to the plurality of client network enabled devices, the page-based content including user interface (UI) elements of the user interface in a relatively abstract format, some of the UI elements organized into logical assets including data tables;
relating the logical assets to objects that act as external interface for processing and validating the page-based content using a data service layer;
accepting requests for the page-based content from the plurality of client network enabled devices for display on associated user interfaces;
determining platform formats and human languages for displaying the content on the associated user interfaces;
rendering the UI elements using a pipeline with multiple stages to retrieve at least one action through the data service layer and to perform the at least one action on the UI elements using the data tables; and
outputting the rendered UI elements to the plurality of client network enabled devices for display on the user interface based on the determined platform formats and human languages.

7. The method recited in claim 6, further comprising storing the defined UI elements in at least one data source.

8. The method recited in claim 6, wherein the UI elements include at least one of UI components, actions, copy, and rendering elements.

9. The method recited in claim 6, wherein the relatively abstract format is an interface definition mark-up language (IDML) which is based on a generalized markup language.

10. The method recited in claim 9, wherein the generalized markup language is at least one of eXstensible Mark-up Language (XML) and Standard Generalized Markup Language (SGML).

11. The method recited in claim 9, wherein the interface definition mark-up language (IDML) comprises a primitive tag for parameterizing primitives to be displayed in the user interface.

12. The method recited in claim 11, wherein the primitive tag contains at least one of rendering resources and text.

13. The method recited in claim 11, wherein the primitive tag comprises attributes including at least one of a business name, a render location, and an IDML element identification (ID).

14. The method recited in claim 11, wherein the primitive tag comprises nested tags including at least one of a copy text tag and a resource tag.

15. The method recited in claim 9, wherein the interface definition mark-up language (IDML) comprises a resource tag for specifying rendering resources to be displayed in the user interface.

16. The method recited in claim 9, wherein the resource tag comprises attributes including at least one of a business name and a render location.

17. The method recited in claim 9, wherein the interface definition mark-up language (IDML) comprises a text tag for specifying copy text to be displayed in the user interface.

18. The method recited in claim 17, wherein the text tag comprises attributes including at least one of a business name and a render location.

19. The method recited in claim 9, wherein the interface definition mark-up language (IDML) comprises a collection tag for parameterizing collections to be displayed in the user interface.

20. The method recited in claim 19, wherein the collection tag contains at least one of primitives, other collections, rendering resources and text.

21. The method recited in claim 19, wherein the collection tag comprises attributes including at least one of a business name, a render location, an IDML element identification (ID) and a action identification (ID).

22. The method recited in claim 19, wherein the collection tag comprises nested tags including a copy text tag, a resource tag, another collection tag, and a primitive tag.

23. The method recited in claim 9, wherein the interface definition mark-up language (IDML) comprises a primitive list tag for parameterizing iterative collections.

24. The method recited in claim 23, wherein the primitive list tag comprises a nested item tag.

25. The method recited in claim 23, wherein the interface definition mark-up language (IDML) further comprises a list wrapper tag for wrapping the primitive list tag.

26. The method recited in claim 23, wherein the primitive list tag comprises a type="array" attribute for Flash compatibility.

27. The method recited in claim 9, wherein the interface definition mark-up language (IDML) comprises an item tag for wrapping individual items in a primitive list.

28. The method recited in claim 27, wherein the item tag comprises nested tags including at least one of a primitive tag, a collection tag, a list wrapper tag, and a primitive list tag.

\* \* \* \* \*